(12) United States Patent
Maki et al.

(10) Patent No.: US 8,023,145 B2
(45) Date of Patent: Sep. 20, 2011

(54) IMAGE PROCESSING SYSTEM AND IMAGE PROCESSING METHOD

(75) Inventors: Yoichiro Maki, Nagano-ken (JP); Hideyuki Narusawa, Nagano-ken (JP); Goro Ishida, Nagano-ken (JP); Shoji Kojima, Nagano-ken (JP); Makoto Oyanagi, Nagano-ken (JP); Masaya Kobayashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1111 days.

(21) Appl. No.: 11/393,854

(22) Filed: Mar. 31, 2006

(65) Prior Publication Data

US 2006/0170968 A1 Aug. 3, 2006

Related U.S. Application Data

(63) Continuation-in-part of application No. 11/066,565, filed on Feb. 28, 2005, now abandoned.

(30) Foreign Application Priority Data

| Feb. 27, 2004 | (JP) | 2004-053487 |
| Aug. 6, 2004 | (JP) | 2004-230412 |
| Aug. 12, 2004 | (JP) | 2004-235151 |
| Sep. 27, 2004 | (JP) | 2004-280260 |
| Mar. 31, 2005 | (JP) | 2005-101848 |
| Mar. 31, 2005 | (JP) | 2005-102091 |
| Jun. 16, 2005 | (JP) | 2005-176110 |

(51) Int. Cl.
*G06K 15/00* (2006.01)
*G06K 1/00* (2006.01)
*G06K 9/00* (2006.01)
*G06F 3/12* (2006.01)
*H04N 1/46* (2006.01)

(52) U.S. Cl. ....... 358/1.18; 358/1.9; 358/1.15; 358/538; 358/518; 382/167

(58) Field of Classification Search ........ 358/1.13–1.18, 358/540, 1.1–1.9, 518, 538; 345/590, 619; 382/151, 176, 167
See application file for complete search history.

(56) References Cited

U.S. PATENT DOCUMENTS

| 5,199,081 A | 3/1993 | Saito et al. |
| 5,438,430 A | 8/1995 | Mackinlay et al. |
| 5,841,898 A | 11/1998 | Liguori |
| 5,881,214 A | 3/1999 | Morisawa et al. |

(Continued)

FOREIGN PATENT DOCUMENTS

JP 3-97369 A 4/1991

(Continued)

*Primary Examiner* — James A Thompson
*Assistant Examiner* — Satwant Singh
(74) *Attorney, Agent, or Firm* — Sughrue Mion, PLLC

(57) ABSTRACT

An image processing system is provided and includes a first receiving unit, a print control unit, a second receiving unit, a read control unit, and a composition unit. The first receiving unit receives an order-sheet request, and the print control unit causes a printer unit to print an area notation indicating a free rendering area on paper in accordance with the order-sheet request. The second receiving unit receives a scan request, and the read control unit causes an scan unit to read the paper on which a subject is recorded in the free rendering area in accordance with the scan request. Also, the composition unit composites an image of the free rendering area read by the scan unit in accordance with the scan request and the other image or images. A method that the system performs is also provided.

35 Claims, 63 Drawing Sheets

U.S. PATENT DOCUMENTS

| | | | |
|---|---|---|---|
| 5,943,049 A | 8/1999 | Matsubara et al. | |
| 5,956,044 A * | 9/1999 | Giorgianni et al. | 345/590 |
| 6,005,972 A * | 12/1999 | Fredlund et al. | 382/176 |
| 6,483,609 B1 | 11/2002 | Ueno et al. | |
| 6,492,994 B2 * | 12/2002 | Yokouchi | 345/619 |
| 6,519,046 B1 | 2/2003 | Kinjo | |
| 6,806,974 B1 * | 10/2004 | Ueda et al. | 358/1.13 |
| 7,265,851 B2 | 9/2007 | Kinjo | |
| 7,283,274 B2 * | 10/2007 | Sharma | 358/1.18 |
| 7,315,391 B2 * | 1/2008 | Nakano et al. | 358/1.15 |
| 7,317,563 B2 | 1/2008 | Kinjo | |
| 7,712,983 B2 * | 5/2010 | Matsuzaka et al. | 400/62 |
| 2001/0040685 A1 | 11/2001 | Winter et al. | |
| 2002/0141005 A1 * | 10/2002 | Okisu et al. | 358/540 |
| 2003/0063295 A1 | 4/2003 | Kinjo | |
| 2003/0067631 A1 | 4/2003 | Kinjo | |
| 2003/0086706 A1 * | 5/2003 | Kinjo | 396/420 |
| 2003/0159045 A1 | 8/2003 | Nishimoto et al. | |
| 2005/0031190 A1 * | 2/2005 | Gann | 382/151 |
| 2005/0110877 A1 | 5/2005 | Shirakawa et al. | |
| 2005/0185204 A1 * | 8/2005 | Shelton et al. | 358/1.13 |
| 2007/0035755 A1 * | 2/2007 | Maki et al. | 358/1.9 |

FOREIGN PATENT DOCUMENTS

| | | |
|---|---|---|
| JP | 03-223987 | 10/1991 |
| JP | 4-106682 A | 4/1992 |
| JP | 04-142879 A | 5/1992 |
| JP | 4-213179 A | 8/1992 |
| JP | 5328065 A | 12/1993 |
| JP | 6-44265 A | 2/1994 |
| JP | 06-235978 A | 8/1994 |
| JP | 07-184036 A | 7/1995 |
| JP | 08-149275 A | 6/1996 |
| JP | 08-191385 A | 7/1996 |
| JP | 08-287238 | 11/1996 |
| JP | 8-305893 A | 11/1996 |
| JP | 08-331494 A | 12/1996 |
| JP | 09-186851 A | 7/1997 |
| JP | 10-16453 A | 1/1998 |
| JP | 10-108000 A | 4/1998 |
| JP | 10-162159 A | 6/1998 |
| JP | 10-228505 A | 8/1998 |
| JP | 10-260482 A | 9/1998 |
| JP | 10-268440 A | 10/1998 |
| JP | 10-294854 A | 11/1998 |
| JP | 11-150654 A | 6/1999 |
| JP | 2000-138814 A | 5/2000 |
| JP | 2000-332991 A | 11/2000 |
| JP | 2001-268342 A | 9/2001 |
| JP | 2001-268486 A | 9/2001 |
| JP | 2001-320571 A | 11/2001 |
| JP | 2001306556 A | 11/2001 |
| JP | 2002-051283 A | 2/2002 |
| JP | 2002-51283 A | 2/2002 |
| JP | 2003-8913 A | 1/2003 |
| JP | 2003-22269 A | 1/2003 |
| JP | 2003-60885 A | 2/2003 |
| JP | 2003-80789 A | 3/2003 |
| JP | 2003-080789 A | 3/2003 |
| JP | 2003-087549 A | 3/2003 |
| JP | 2003-134375 A | 5/2003 |
| JP | 2003244138 A | 8/2003 |
| WO | 03/088651 A1 | 10/2003 |

* cited by examiner

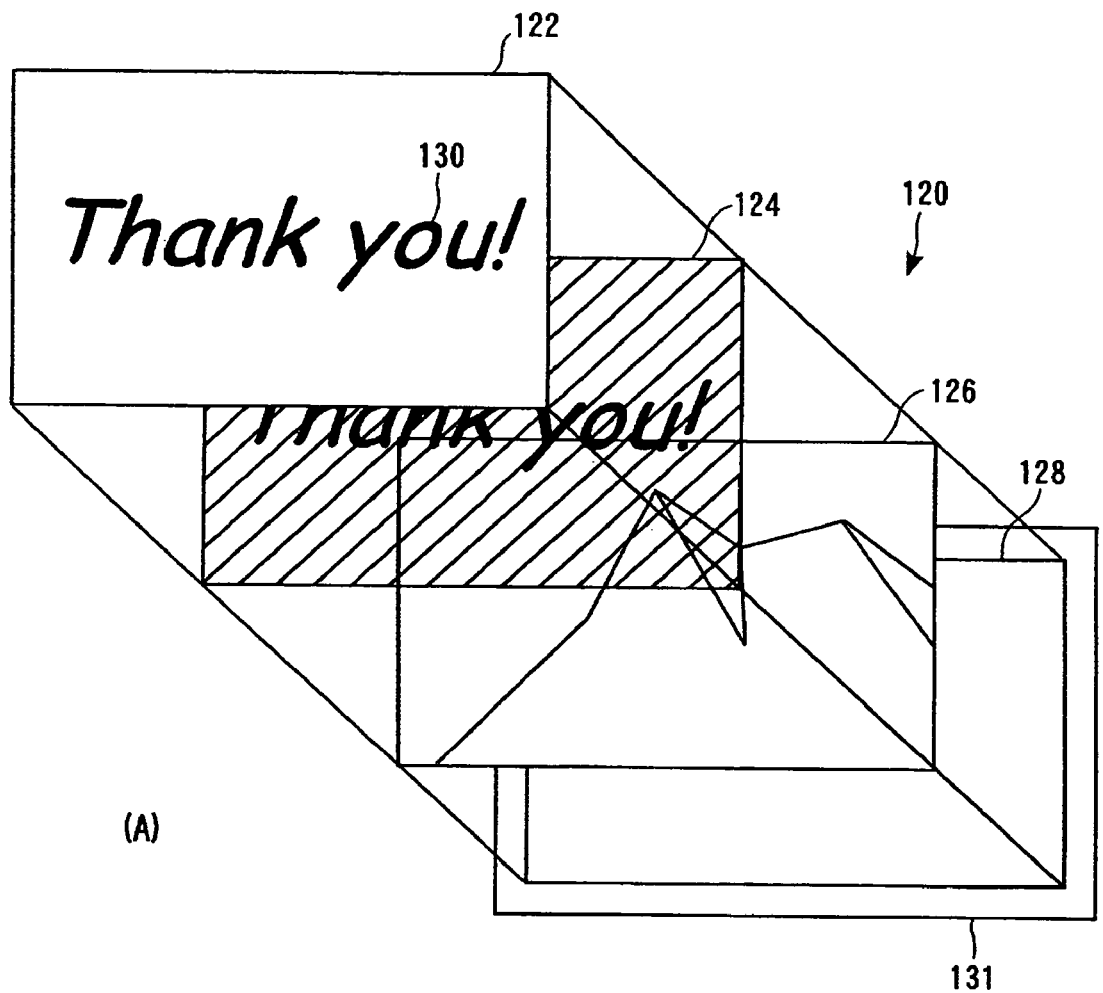
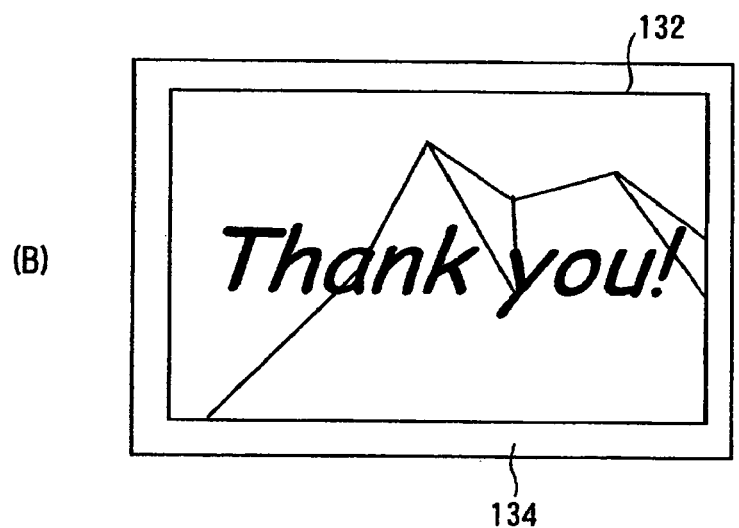
FIG. 7

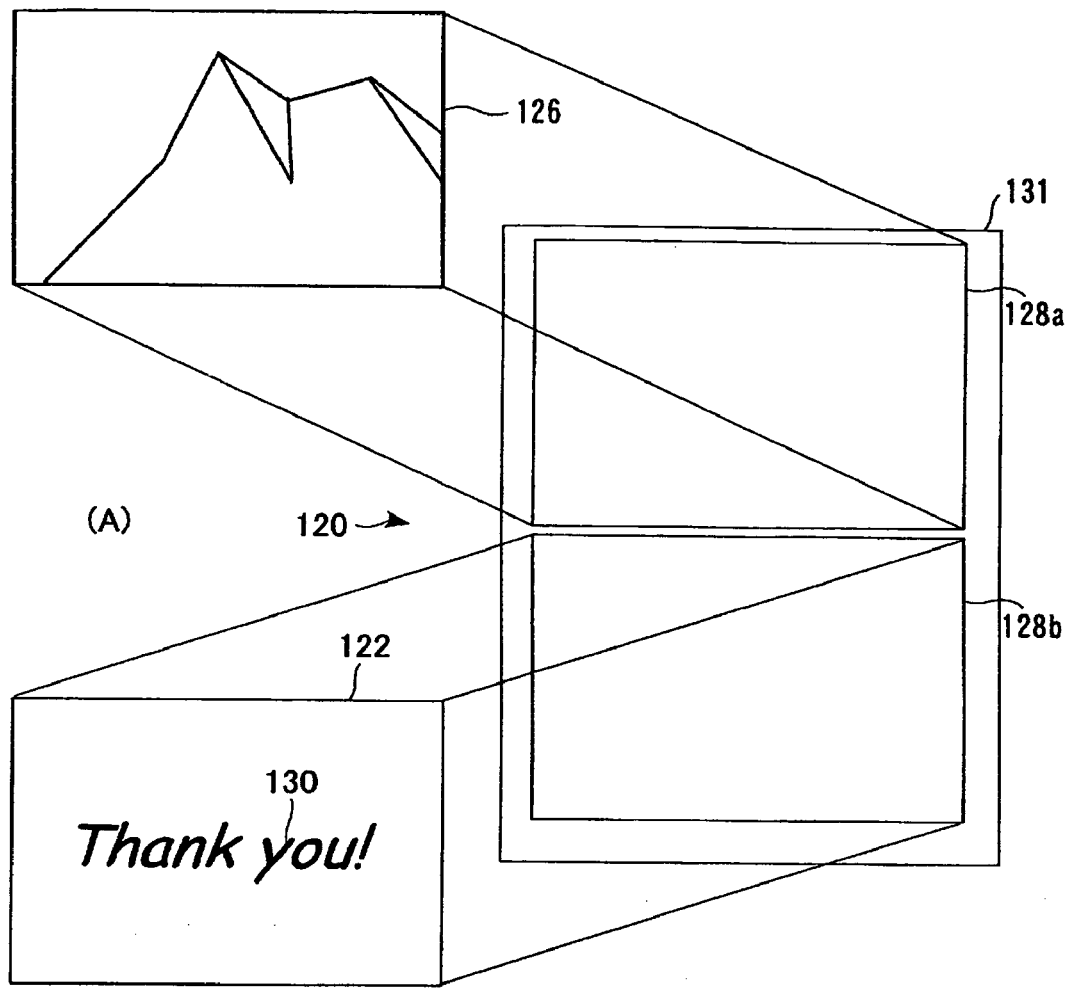
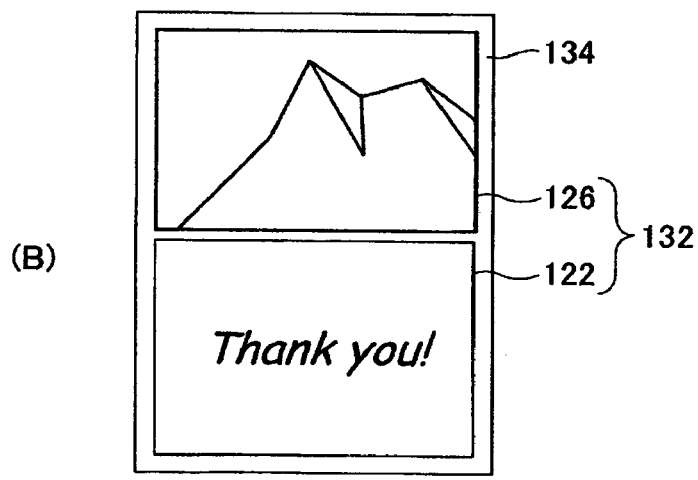
FIG. 18

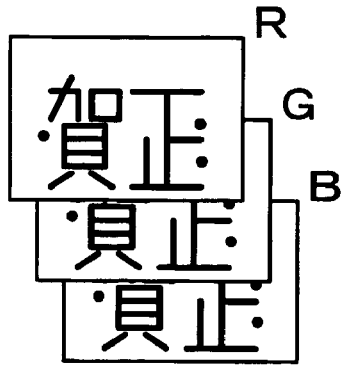
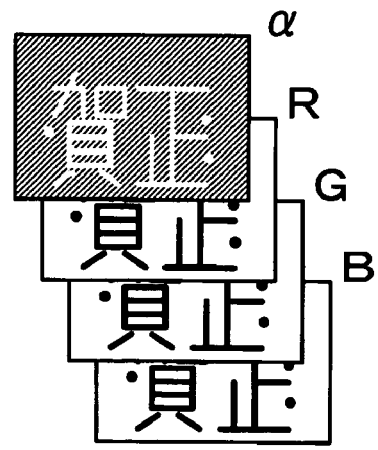
FIG. 36A
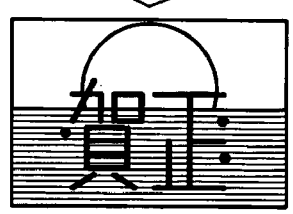
FIG. 36B
NOISE REMOVED
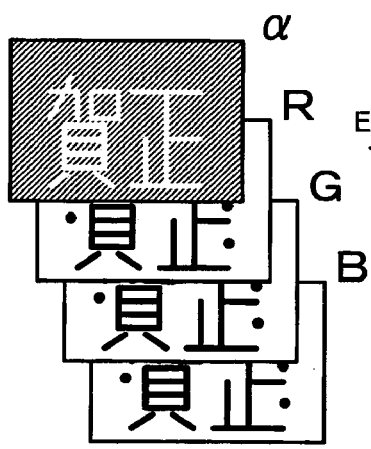
EXPANDED
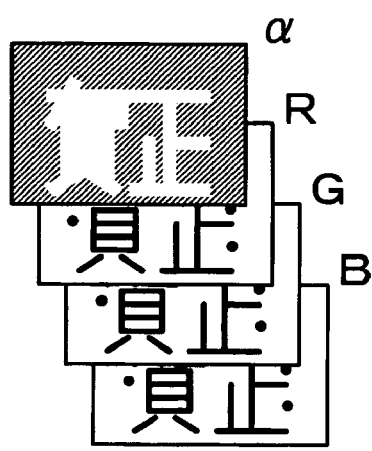
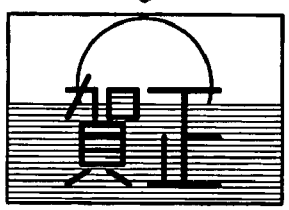
FIG. 36C
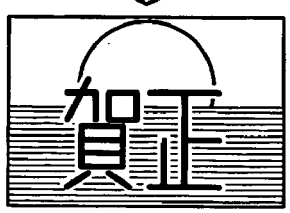
FIG. 36D

| | PHOTO IMAGE | FREE RENDERING AREA | COMPOSITE LAYOUT (SAMPLES, ETC.) | LIGHT-COLORED PHOTO IMAGE IN FREE RENDERING AREA | CHECK BOX FOR WRITING IMAGE SELECTION COMMAND | FOR COMPOSITE CONDITION COMMAND OF OTHER THAN LAYOUT | CHECK BOX FOR COMPOSITE CONDITION COMMAND OF LAYOUT |
|---|---|---|---|---|---|---|---|
| 1st example of the invention | | O | | | | | |
| 3rd example of the invention | O | O | | | | | |
| 4th example of the invention | | O | | O | | | |
| 5th example of the invention | O | O | O | | | | |
| 6th example of the invention | O | O | O | | | | |
| 7th example of the invention | O | O | O | | | | |
| 9th example of the invention | O | O | O | | O | O | O |
| 10th example of the invention | O | | | | O | O | O |
| 14th example of the invention | O | | O | | O | O | O |

FIG. 48

IMAGE PROCESSING SYSTEM AND IMAGE PROCESSING METHOD

CROSS-REFERENCE TO RELATED APPLICATIONS

This is a continuation-in-part of application Ser. No. 11/066,565, filed 2005 Feb. 28 now abandoned. The disclosure of Japanese Patent Application No. 2004-053487 (filed on Feb. 27, 2004), Japanese Patent Application No. 2004-230412 (filed on Aug. 6, 2004), Japanese Patent Application No. 2004-235151 (filed on Aug. 12, 2004), Japanese Patent Application No. 2004-280260 (filed on Sep. 27, 2004), Japanese Patent Application No. 2005-101848 (filed on Mar. 31, 2005), Japanese Patent Application No. 2005-102091 (filed on Mar. 31, 2005), Japanese Patent Application No. 2005-176110 (filed on Jun. 16, 2005), including the specification, drawings and abstract is incorporated herein by reference.

BACKGROUND OF THE INVENTION

1. Field of the Invention

The present invention relates to an image processing system and an image processing method and, more particularly to, a technology for composing a hand-written character and an image stored in a recording medium.

2. Description of the Related Art

Hitherto, a printing system has been known which itself reads and prints image data stored in a removable memory, for example, without connecting to a personal computer (PC). The printing system, however, has a deep menu hierarchy, which makes operations complicated when a selection of image data to be printed and other manipulations on settings for a number of pages to print and/or a layout, for example, are attempted to receive on a menu displayed on a small screen, which is a problem. On the other hand, the production costs may disadvantageously increase to display a menu on a large screen.

JP-A-2002-51283 discloses an image processing system that receives a manipulation for setting various printing conditions by printing a mark sheet on which a list of thumbnail images of image files stored in a removable memory, for example, and available printing conditions and optically recognizing a mark written on the mark sheet.

However, in an operation for creating a greeting card, for example, the image processing system disclosed in JP-A-2002-51283 has a following problem. In general, not only an image recorded by a digital camera, for example, but also a sender's message are written on a greeting card. However, repetitively handwriting the same message on every card having only an image printed by the image processing system disclosed in JP-A-2002-51283 is time consuming.

SUMMARY OF THE INVENTION

An advantage of the invention is to provide an image processing system and an image processing method that can compose an image of a hand-written message etc. into any other image and display it.

(1) According to one aspect of the invention, in order to achieve the above-described advantage, there is provided an image processing system, including a first receiving unit that receives an order-sheet request, a print control unit that causes a printer unit to print an area notation indicating a free rendering area on paper in accordance with the order-sheet request, a second receiving unit that receives a scan request, a read control unit that causes a scan unit to read the paper on which a subject is recorded in the free rendering area in accordance with the scan request, and a composition unit that composites an image of the free rendering area read by the scan unit in accordance with the scan request and the other image or images.

According to this aspect, printing an area notation allows a user to recognize a free rendering area, which is an area in which a subject such as a hand-written character is to be recorded and is locatable in reading. Thus, an image of the free rendering area is read in accordance with a scan request, and the image of the free rendering area and the other image or images are composited. In other words, a user is prompted to record a subject such as a hand-written character in a predetermined free rendering area so that the image of the subject such as the hand-written character recorded in the free rendering area and the other image or images can be composited and displayed.

(2) The print control unit may cause the printer unit to print an identifier notation on the paper. The composition unit may composite an image of the free rendering area read by the scan unit and the other image or images based on the identifier notation read by the scan unit.

Thus, printing an identifier notation along with an area notation on paper allows the composite between the image of a free rendering area and the other image or images based on the image read from the paper and in accordance with the predetermined free rendering area. In other words, based on the image read from the identifier notation, a predetermined free rendering area can be located, and a subject recorded in the free rendering area can be read, for example. Furthermore, based on the image read from the identifier notation, a predetermined composite condition in accordance with the free rendering area can be recognized for the subject recorded in the free rendering area and the other image or images.

(3) The image processing system further includes an image selection command receiving unit that receives a command for selecting one or more of accessible images. The other image may be the selected image.

Thus, a user may select an arbitrary image prestored in an accessible area through a control panel so that an image resulting from composition of the selected image and a hand-written message, for example, can be expressed.

(4) The print control unit may cause the printer unit to print the image selected by the image selection command receiving unit on the paper.

Thus, an image selected from accessible images and an area notation indicating a free rendering area can be printed on one piece of paper. Therefore, a user can record a subject to be composited with the selected image in the free rendering area by checking the selected image. That is, a user can record a subject such as a hand-written character in the free rendering area by imaging the composite result.

(5) An image showing the selected image data may be an image showing a composite result of composition of an image showing the selected image data and a sample image of the image of the free rendering area under a first composite condition. The composition unit composites the image of the selected image data and the image of the free rendering area under a second composite condition corresponding to the first composite condition.

The composition unit composites the image showing selected image data and a sample image of the image showing a subject under a composite condition corresponding to the composite condition for the image showing the composite result. That is, the image showing the composite result shows a composite result under a composite condition corresponding to the composite condition in the composition unit. Therefore, in recording a subject such as a hand-written character in the free rendering area, a user can easily image the composite result.

(6) The image processing system may further include a composite condition command receiving unit that receives a command for selecting, as the first composite condition, one of multiple different composite conditions for compositing the selected image and the image of the free rendering area. The print control unit may cause the printer unit to print, on the paper, multiple images showing the multiple composite results of composite under different composite conditions receivable by the composite condition command receiving unit.

A user can recognize a composite condition receivable by the composite condition command receiving unit based on multiple images showing composite results of composite under different composite conditions printed on the paper. Furthermore, a user can record a subject in the free rendering area by imaging a composite result of composite under a composite condition actually selected with the images showing the composite results.

(9) The print control unit may cause the printer unit to print the other image, the area notation and the image showing a composite result in one page.

(8) The print control unit may cause the printer unit to print, on the paper, an image notation indicating an accessible image. The image processing system may further include an image selection mark recognizing unit that recognizes the image indicated by the image notation pointed by an image selection mark recorded on the paper based on the image read by the scan unit. The other image or images is or are an image or images each indicated by the image notation pointed by the image selection mark.

Thus, a user may record, on the paper, an image selection mark for commanding arbitrary image data prestored in an accessible area so that image data to be composited can be selected. Therefore, the operation through a control panel, for example, can be simplified.

(9) The image selection mark recognizing unit may recognize the images indicated by the multiple image notations commanded by the image selection mark. The composition unit may composite the image of the free rendering area and the other multiple images.

Thus, a user can select two or more images to be composited with a hand-written message, for example.

(10) The read control unit may cause the scan unit to read the image selection mark at a lower resolution than that for the free rendering area.

Thus, the amount of processing for obtaining a composited image can be reduced without deteriorating quality of the composited image.

(11) The image processing system may further include a composite condition command receiving unit that receives a command for a composite condition for compositing the image of the free rendering area and the other image or images. In this case, the print control unit may cause the printer unit to print, on the paper, the area notation indicating the free rendering area in a form in accordance with the commanded composite condition. The composition unit may composite the subject image and the other image or images in accordance with the commanded composite condition.

Thus, a command for a composite condition is received before an area notation is printed, and an area notation indicating a free rendering area in a form in accordance with the command is printed. Then, the image recorded in the free rendering area is composited therewith. Therefore, a user can record a subject such as a hand-written character in the free rendering area in the form desired by the user and composite the subject with the other image.

(12) The print control unit may cause the printer unit to print, on the paper, multiple composite condition notations indicating different composite conditions for compositing the image of the free rendering area and the other image or images. The image processing system may further include a composite condition recognizing unit that recognizes the composite condition indicated by the composite condition notation pointed by the composite condition mark recorded on the paper based on the image read by the scan unit. The composition unit may composite the image of the free rendering area read by the scan unit and the other image or images in accordance with the composite condition indicated by the composite condition notation pointed by the composite condition mark.

Thus, since a user can specify a composite condition by recording a composite condition mark thereof along with a hand-written message on paper, the user's operation on a control panel, for example, required for composite and display thereof can be simplified. Notably, a composite condition may specifically include the layout, size and form of the area in which an image is to be recorded and a transmittance of a layer in which an image is recorded.

(13) The read control unit may cause the scan unit to read the composite condition mark at a first resolution and cause the scan unit to read the free rendering area at a higher second resolution than the first resolution.

Thus, the amount of processing for obtaining a composited image can be reduced without deteriorating quality of the composited image.

(14) The composite condition may include an overlap composite condition.

(15) The overlap composite condition may include a border processing condition for two images to be composited one over another.

(16) The overlap composite condition may include transparencies of two images to be composited one over another.

(17) The print control unit may cause the printer unit to print a reference mark on the paper. The read control unit may recognize the free rendering area based on the reference mark.

Thus, since the position of the free rendering area can be relatively located based on a reference mark printed on paper, the image recorded in the free rendering area and the other image can be accurately composited.

(18) The image processing system may further include an area extracting unit that extracts an area of a subject recorded in the free rendering area from the image of the free rendering area read by the scan unit. The composition unit may compositely superimpose the area of the subject of the image of the free rendering area and the other image or images.

Thus, a composited image in a design in which a message is directly hand-written on a photograph, for example, can be displayed.

(19) The area extracting unit may recognize the base color of the paper based on an image of a margin area excluding the free rendering area read by the scan unit and recognize the area of the subject based on the base color of the paper.

Thus, the area of the subject such as a hand-written character can be precisely extracted from the image of the free rendering area since the area of the subject is recognized based on the base color of the paper in the margin area excluding the free rendering area.

(20) The image processing system may further include the printer unit and the scan unit.

(21) The image processing system may further include an interface that connects the printer unit and the scan unit.

(22) The print control unit may cause the printer unit to print the other image and the area notation in one page in such a manner that a composite layout of these can be recognized.

(23) The print control unit may cause the printer unit to print the other image and the area notation in such a manner that they may be adjacent to each other.

(24) The print control unit causes the printer unit to print a character or an image in the free rendering area.

It is to be noted that functions of a plurality of units of the present invention are realized by hardware resources whose functions are specified by a configuration itself, hardware resources whose functions are specified by a program, or a combination of these. Further, the functions of this plurality of units are not limited to those realized by the hardware resources that are physically independent of each other. Further, the present invention cannot only be specified as an invention of an apparatus but also can be specified as an invention of a method and a recording medium in which a program is recorded.

BEST MODE FOR CARRYING OUT THE INVENTION

An embodiment of the present invention will be described below with reference to multiple examples. Identical reference numerals are given to identical components in examples, and repetitive description on the identical components will be omitted.

First Example

FIG. 2 is a front view showing an appearance of a multifunction machine 1 according to a first example of an image processing system of the invention. FIG. 3 is a block diagram showing the multifunction machine 1 according to the first example of the invention. The multifunction machine 1 has functions of outputting image data read from an original to a personal computer (PC), not shown, copying an original, printing data output from the PC and printing image data input from a removable memory 3.

A scan unit 20 of the multifunction machine 1 includes an image sensor 21, an optical system 22, a sensor driver portion 23, a sensor carriage driver portion 24, an Analog Front End (AFE) portion 25, and a digital image processing portion 26.

The image sensor 21 to be driven by the sensor driver portion 23 is a linear image sensor including a photoreceptive device having three channels for R, G and B and is mounted in a sensor carriage 27, which moves in parallel with an original table, not shown. The image sensor 21 outputs an electric signal correlating with a shade of an optical image of an original placed on the original table, the image of which is formed on a photoreceptive plane by the optical system 22 including a lens and mirror, not shown.

The sensor carriage driver portion 24 includes a motor, a driving belt and a driver circuit. The sensor carriage driver portion 24 moves the sensor carriage 27 back and forth along a guide rod vertically across scanning lines. The image sensor 21 travels vertically with respect to the scanning lines so as to scan a two-dimensional image.

The AFE portion 25 includes an analog signal processing portion and an A/D converter.

The digital image processing portion 26 creates a digital image by performing processing such as a shading correction on a signal output from the AFE portion 25.

A printer unit 30 of the multifunction machine 1 includes a record head 31, head driver portion 32, head carriage driver portion 33 and paper feeder portion 34 for forming an image on paper by inkjet printing. The printer unit 30 may be compliant with other printing methods such as laser printing.

The record head 31 is included in the head carriage 37 having an ink cartridge, not shown, and includes a nozzle, a piezo actuator and an ink path.

The head carriage driver portion 33 includes, a motor, driving belt and driver circuit, not shown. The head carriage driver portion 33 moves the record head 31 back and forth and vertically with respect to a direction of paper conveyance.

The paper feeder portion 34 includes a paper conveying roller, motor and driver circuit, not shown. The paper feeder portion 34 rotates the paper conveying roller to convey paper vertically with respect to an axial line in the direction of movement of the record head 31.

A card reader/writer portion 41 includes a card slot, not shown, for inserting the removable memory 3, and a memory controller.

An operating portion 42 includes an LCD 14 for displaying a menu and buttons including an OK button 10 and cross button 12 for manipulating the menu (see FIG. 2).

A control portion 50 includes a CPU 51, a ROM 52 and a RAM 53. The CPU 51 controls each component of the multifunction machine 1 by executing a control program stored in the ROM 52. The ROM 52 is a non-volatile memory that stores the control program. The RAM 53 is a volatile memory that temporarily stores a program such as an image processing program and data such as image data. The control program may be stored in the ROM 52 from a predetermined server via a network or may be loaded from a computer-readable storage medium such as the removable memory 3 and stored in the ROM 52.

FIG. 4 is a functional block diagram showing a construction of the control program for the multifunction machine 1.

A composite command receiving module 61 serving as a first receiving unit and a second receiving unit is a program component that receives an order-sheet request and a scan request. The order-sheet request is a command to be used by a user for requesting the multifunction machine 1 processing for printing an order sheet on which a hand-written character are to be written. The scan request is a command to be used by a user for requesting the multifunction machine 1 processing including a series of steps for reading the order sheet and compositing a hand-written character with the other photo image or images.

An image selection command receiving module 60 serving as an image selection command receiving unit is a program component that receives a command for selecting an arbitrary image file from an accessible image file (that is, an image selection mark). More specifically, the accessible image file is an image file stored in a predetermined folder in the removable memory 3. The image selection command receiving module 60 may allow a user to select image data stored in, for example, the ROM 52 or RAM 53, which is an internal memory, a memory of a mobile electronic machine such as a digital camera and a mobile telephone with a camera function connecting to the multifunction machine 1, a hard disk device of a PC connecting to the multifunction machine 1 or a file server connecting to the multifunction machine 1 through a communication circuit.

A print control module 62 serving as a print control unit is a program component that loads a template (order-sheet template) 103 (see FIG. 5) from the ROM 52 for printing an order sheet and causes the printer unit 30 to print an order sheet based on the order-sheet template 113.

The order-sheet template 113 shown in FIG. 5 includes object information and layout information for printing reference marks 82 and 107, a verification mark 81 and a rectangular frame 110 on paper. The frame 112 indicates a print paper size defined by the order-sheet template 113. The rectangular frame 110 serving as an area notation defined by the order-sheet template 113 is a rectangular frame indicating the outer edge of a free rendering area 72 on paper of the order sheet 70 (see FIG. 6). The free rendering area 72 may be a rectangular frame having a different aspect ratio from that of print paper for printing a composited image or may be a non-rectangular frame such as a circular frame. The area notation may include four marks (such as a cross and an L-shape) indicating four corners of the free rendering area 72, for example. The reference marks 82 and 107 defined by the order-sheet template 113 are marks for locating the free rendering area 72 and verification mark 81 in reading the order sheet 70. The frame 108 defined by the order-sheet template 113 is an area to which the verification mark 81 is to be laid. The verification mark 81 is a mark for verifying the identity between the removable memory 3 connecting to the multifunction machine 1 while processing for printing the order sheet 70 is being performed and the removable memory 3 connecting to the multifunction machine 1 while processing for printing a composited image is being performed. More specifically, the verification mark 81 carries information from which a check thumb is locatable. The check thumb is calculated based on file names, the number of files and so on of all image files in a predetermined format stored in a predetermined folder in the removable memory 3.

A read control module 64 serving as a read control unit is a program component having following functions. That is, first of all, a pre-scan image is obtained by causing the scan unit 20 to read an entire area (pre-scan area) of the original table at a low resolution. Second, the free rendering area 72 of the order sheet 70 is located based on the pre-scan image. Third, the verification mark 81 is verified based on the pre-scan image. Fourth, a high-resolution scan image is obtained by causing the scan unit 20 to read the free rendering area 72 at a high resolution.

A composition module 66 serving as a composition unit and an area extracting unit is a program component that obtains an image of the free rendering area 72 read by the scan unit 20 and composites the image of the free rendering area 72 with the photo image or images. More specifically, the composition module 66 may extract an area of a subject 116 (see FIG. 6) such as a hand-written character from the image of the free rendering area 72 and may composite the image of the subject 116 with a photo image selected by a user based on a composition template, which will be described later, for example.

Partial functions of the control portion 50 implemented by executing the above-described composite command receiving module 61, print control module 62, read control module 64 and composition module 66 can be implemented by a special circuit such as an DSP and an ASIC (Application Specific Integrated Circuit).

FIG. 7 is a schematic diagram for explaining a composition template.

A composition template 120 includes layout information required for printing a composited image 132 on paper 134. A frame 131 indicates a size of print paper defined by the composition template 120. A frame 128 defined by the composition template 120 is an area in which an image 122 of the free rendering area 72 and a photo image 126 are to be laid out. While, in the shown example, the image 122 of the free rendering area 72 agrees with an area to which the photo image 126 is to be laid out, the images may apparently be laid out to different frames. The frame 128 defined by the composition template 120 and the rectangular frame 110 defined by the order-sheet template 113 have an equal aspect ratio. An alpha channel 124 is information defining a transmittance of a layer of the image 122 of the free rendering area 72 for each pixel. The alpha channel 124 is created by performing processing in which the composition module 66 locates an area 130 of the subject 116 such as a hand-written character by performing area dividing processing on the image 122 of the free rendering area 72, defines the transmittance of the area 130 of the subject 116 to an opaque state, and defines the transmittance of the other area to a transparent state. The composited image 132 is created by weighting with the alpha channel 124 for each pixel and adding the image 122 of the free rendering area 72 and the photo image 126.

FIG. 8 is a flowchart showing an image processing method according to the first example of the invention. The control portion 50 executes the control program so that processing shown in FIG. 8 can be executed.

First of all, the control portion 50 receives an order-sheet request (step S100). More specifically, for example, the composite command receiving module 61 causes the LCD 14 to display a menu screen 1000 shown in FIG. 9 and then receives a signal output from the operating portion 42 as an order-sheet request in response to "COMPOSITE AND PRINT HAND-WRITTEN CHARACTERS" selected and the OK button 10 pressed by a user through a manipulation on the cross button 12. In the drawings, a hatch pattern is provided to an item selected in response to a manipulation on the cross button 12 among items displayed on the LCD 14.

In response to the order-sheet request, the control portion 50 specifies an order-sheet template and a composition template (step S102). More specifically, the composite command receiving module 61 loads an order-sheet template and a composition template from the ROM 52 to the RAM 53. The processing specifies the free rendering area 72 of the order sheet 70 in accordance with the order-sheet request. The processing also specifies a layout, a hierarchy of layers and transmittances of the layers, a size of print paper and so on in accordance with the order-sheet request for the image 122 of the free rendering area 72 and the photo image 126. In step S100, the control portion 50 may selectively receive an order-sheet request corresponding to each different order-sheet template and specify an order-sheet template in accordance with the received order-sheet request.

In step S104, the multifunction machine 1 receives a command for selecting an arbitrary image file from image files accessible by a user. More specifically, for example, the image selection command receiving module 60 may cause the LCD 14 to display a SELECT IMAGE screen 1020 shown in FIG. 9 and then select an image file in a predetermined format stored in a predetermined folder of the removable memory 3 in accordance with a signal output from the operating portion 42 in response to the cross button 12 and the OK button 10 pressed by a user.

In step S106, the multifunction machine 1 prints the order sheet 70. More specifically, the print control module 62 creates data of a page in which the reference marks 82 and 107, verification mark 81 and rectangular frame 110 are laid based on the order-sheet template loaded to the RAM 53. Next, the print control module 62 creates print data by performing binarizing processing and interlace processing on the page data. Next, the print control module 62 outputs the print data to the printer unit 30 and causes the printer unit 30 to print the order sheet 70. Here, the print control module 62 calculates a check thumb based on image files stored under a predetermined directory of the removable memory 3 and lays out an image showing the verification mark 81 corresponding to the check thumb in the frame 108. The print control module 62 may further display the screen 1040 shown in FIG. 9 on the LCD 14 until the printer unit 30 completes printing of the order sheet 70.

A user records the subject 116 such as hand-written characters as shown in FIG. 6 on the free rendering area 72 of the order sheet 70 printed in step S106. The outer edge of the free rendering area 72 is clearly indicated by the rectangular frame 110. In addition to such a hand-written character, a magazine scrap may be pasted or a character and/or an image may be printed on the free rendering area 72.

In step S108, the control portion 50 may receive a scan request. More specifically, for example, the composite command receiving module 61 causes the LCD 14 to display a menu screen 1060 shown in FIG. 9 and receives, as a scan request, a signal output from the operating portion 42 in response to the OK button 10 pressed by a user. After receiving the scan request, the control portion 50 may display the screen 1080 shown in FIG. 9 on the LCD 14, whereby a user can be informed of a progress thereof.

In step S109, the multifunction machine 1 reads the pre-scan area. More specifically, the read control module 64 causes the scan unit 20 to read the pre-scan area, whereby the pre-scan image can be obtained.

In step S110, the control portion 50 locates the free rendering area 72 of the order sheet 70. More specifically, the read control module 64 locates the positions of the reference marks 82 and 107 within the pre-scan image by pattern matching, for example. Next, the read control module 64 locates the range of the free rendering area 72 based on the positions of the reference marks 82 and 107. Here, the read control module 64 locates the range of the free rendering area 72 in accordance with the relative positional relationship between the reference marks 82 and 107 and the rectangular frame 110 defined by the order-sheet template 113 specified in step S102. In other words, since the order-sheet template 113 is specified in response to an order-sheet request, the control portion 50 locates the range of the free rendering area 72 in accordance with the order-sheet request.

In step S110, the control portion 50 locates the range of the verification mark 81 based on the pre-scan image, identifies the verification mark 81, and verifies the identity between the check thumb corresponding to the verification mark 81 and the check thumb calculated based on the image files in the predetermined format stored in the predetermined folder of the removable memory 3. If the two check thumbs do not agree as a result, the control portion 50 performs error processing. Apparently, the error determination and error processing may be skipped.

In step S112, the multifunction machine 1 reads the free rendering area 72 at a high resolution. More specifically, the read control module 64 causes the scan unit 20 to read the free rendering area 72 at a higher resolution than that for pre-scanning and store the image of the free rendering area 72 in the RAM 53.

In S114, the control portion 50 extracts the area 130 corresponding to the subject 116 recorded in the free rendering area 72 from the image 122 (see FIG. 7) of the free rendering area 72. More specifically, the composition module 66 locates the area 130 corresponding to the subject 116 by performing area dividing processing on the image 122 of the free rendering area 72 by using a predetermined threshold value. Notably, the composition module 66 may use the pre-scan image to locate the area corresponding to the subject 116. Next, the composition module 66 creates an alpha channel 124 having the opaque area 130 corresponding to the subject 116 and the other transparent area.

In step S116, the control portion 50 composites the image 122 (see FIG. 7) of the free rendering area 72 and the photo image 126. More specifically, the composition module 66 weights with the alpha channel 124 for each pixel and adds the image 122 of the free rendering area 72 and the image 126 indicated by the image file selected in step S104 based on the composition template 120 and lays out the resulting composited image 132 in the frame 128. The composition template 120 used here is the one loaded by the control portion 50 from the ROM 52 to the RAM 53 in response to the order-sheet request. In other words, since the image 122 of the free rendering area and the photo image 126 are composited based on the composition template 120, the control portion 50 composites the image 122 of the free rendering area 72 and the photo image 126 in accordance with the order-sheet request.

In step S118, the multifunction machine 1 prints the composited image. More specifically, the control portion 50 creates data of the page on which the composited image 132 is laid out in the frame 128 based on the composition template 120, creates print data by performing binarizing processing, interlace processing and so on the data, outputs the print data to the printer unit 30 and causes the composited image 132 to be printed on the paper 134.

According to the first example of the present invention described above, a user may cause the multifunction machine 1 to read the order sheet 70 including a hand-written character in the free rendering area 72 so that the multifunction machine 1 can be caused to print the image resulting from the composition of the hand-written character with the photo image. Thus, a large number of printed matters including the resulting composited image can be easily produced. According to this example, a user can easily produce a printed matter looking as if a hand-written characteristic is neatly written over a photo image printed on calendered paper though neatly writing a hand-written character over a photo image printed on calendered paper is difficult due to characteristics of paper and ink.

Second Example

In a second example of the invention, the verification mark 81 (see FIG. 5) is equivalent to the claimed identifier notation and carries information for specifying a composition template, which will be described more specifically below.

The pattern of the verification mark 81 depends on a composition template. One or multiple composition template/templates may be selectable by the multifunction machine 1 based on the verification mark 81. In other words, the ability to determine whether hand-written characters, for example, can be recorded on a given order sheet or not based on the verification mark 81 is only required at least. The ability to determine whether a given order sheet is one of multiple kinds of order sheet on which hand-written characters can be recorded or not in accordance with different composition templates is not required from the verification mark 81. The verification mark 81 corresponds to a composition template and also corresponds to the order-sheet template 113. This is because the frame 128 (see FIG. 7) in which the image of the free rendering area 72 defined by a composition template is laid out and the rectangular frame 110 defined by the order-sheet template 113 correspond to each other. In other words, the verification mark 81 carries information with which a given order sheet itself is identifiable.

FIG. 10 is a flowchart showing an image processing method according to the second example of the invention.

In step S103, the control portion 50 specifies an order-sheet template. Here, a composition template is not specified here unlike the first example.

In step S106, the multifunction machine 1 prints the order sheet 70. Here, the print control module 62 loads from the ROM 53 the verification mark 81 of the pattern carrying information for specifying the composition template in accordance with an order-sheet request and lays out the verification mark 81 in the frame 108 (see FIG. 5).

In step S110, the control portion 50 locates the free rendering area 72 of the order sheet 70. Here, the control portion 50 locates the free rendering area 72 based on the verification mark 81. More specifically, the read control module 64 locates the positions of the reference marks 82 and 107 within the pre-scan image by pattern matching, for example. Next, the read control module 64 locates the range of the verification mark 81 based on the positions of the reference marks 82 and 107, identifies the verification mark 81 indicated by the pre-scan image, and locates the range of the free rendering area 72 corresponding to the verification mark 81. Here, the read control module 64 locates the range of the free rendering area 72 in accordance with the relative positional relationship between the reference marks 82 and 107 and the rectangular frame 110 defined by the order-sheet template 113 corresponding to the verification mark 81. That is, the control portion 50 locates the range of the free rendering area 72 based on the image of the verification mark 81.

In step S111, the control portion 50 specifies the composition template corresponding to the verification mark 81. More specifically, the composition module 66 loads the composition template corresponding to the verification mark 81 from the ROM 52 to the RAM 53. That is, according to the second example, the composition template is not fixed until the order sheet 70 is read.

In response to composite and print commands, the control portion 50 performs the processing in step S104 (that is, image selecting processing) in the first example, immediately before the composite processing (S116), for example.

In the above-described second example, the processing in and after step S108 and the processing in and before step S106 do not require continuity therebetween since specifying a composition template and selecting an image are performed in response to composite and print commands. That is, completely different processes may be performed between steps S106 and S108, or the multifunction machine 1 may be powered off.

Notably, instead of the processing of specifying a composition template based on the verification mark 81 in step S111, a command for selecting a composition template may be received from a user upon receipt of a scan request in step S108, and the integrity may be checked between the composition template selected in accordance with the select command and the composition template corresponding to the order sheet 70 in step S111. The integrity check may be skipped if the multifunction machine 1 accepts only one kind of order sheet.

Third Example

FIG. 11 is a functional block diagram of the multifunction machine 1 according to a third example of the invention.

In step S106, the print control module 62 also prints the image selected by the image selection command receiving module 60 on an order sheet based on the order-sheet template 113 shown in FIG. 12. A frame 200 defined by the order-sheet template 113 shown in FIG. 12 is a frame in which an image 202 indicated by the file selected by the image selection command receiving module 60 is to be laid out. The order sheet template 113 accommodates the composite template 120 shown in FIG. 7. That is, an allocation position and size of the image 202 selected by the user and that of the image 122 read from the free rendering area 72 agree with each other on the composite template 120, so that an aspect ratio of the frame 200 and that of the frame 110 agree with each other. The order-sheet template 113 may be defined such that a frame indicating the outer edge of paper can be printed outside of the frame 200 and a frame 100. Thus, a user can check how the image 126 (see FIG. 7) of the selected file and the image 122 read from the free rendering area 72 are to be laid out on print paper before printing. Notably, the print control module 62 may lay out, in the frame 200, a reduced image created based on the image 126 of the image file selected by a user. The print control module 62 may lay out a thumbnail image in the frame 200 as far as the selected image file is an image file storing the thumbnail data such as Exif file.

As shown in FIG. 13, according to the above-described third example of the invention, the multifunction machine 1 prints the image 202 indicating the selected image data and the rectangular frame 110 indicating the free rendering area 72 on one order sheet 70. Thus, a user can record, in the free rendering area 72, a subject 116, such as a hand-written character, to be composited to the selected image by checking the selected image on the order sheet 70. That is, the user can record a subject in the free rendering area 72 in contemplation of the composite result.

Fourth Example

The multifunction machine 1 according to a fourth example of the invention prints an image indicated by a selected image file lightly in the free rendering area.

In step S106 above, the print control module 62 prints an image selected by the image selection command receiving module 60 on an order sheet based on the order-sheet template 113 shown in FIG. 14. The frame 200 defined by the order-sheet template 113 shown in FIG. 12 is a frame in which an image 202 indicated by the file selected by the image selection command receiving module 60 and the rectangular frame 110 indicating a free rendering area are to be laid out. It is to be noted that an outer edge of the free rendering area is shown clearly by lightly printing the image 202 over the entire free rendering area, so that the rectangular frame 110 need not necessarily be printed. The image 202 indicating the file selected by the image selection command receiving module 60 is a monochrome image resulting from the binarizing processing by the print control module 62 on the intensity value of the selected file. The binarized threshold value is specified lower enough for preventing the image 202 indicating the selected file from being extracted by the processing for extracting the area of a subject in step S114. Notably, the image 200 to be printed on the free rendering area 72 may be a light color image. In the process of printing the color image in the free rendering area 72, the print control module 62 performs processing for reducing the shade level on each channel of the image of the selected file instead of the binarizing processing.

According to the above-described fourth example of the invention, the multifunction machine 1 prints the image 202 showing the selected image data within the free rendering area 72 as shown in FIG. 15. Thus, a user can record, in the free rendering area 72, the subject 116 such as a hand-written character to be composited with the selected image by correctly realizing the layout with respect to the selected image at the same time.

Fifth Example

The multifunction machine 1 according to a fifth example of the invention prints, on an order sheet 70, a sample 111 of a result of composite of the image indicated by a selected image file and the image of a subject such as a hand-written character (see FIG. 16).

In the fifth example of the invention, a composite command receiving module 61 is also equivalent to a composite condition command receiving unit. That is, the composite command receiving module 61 receives a command for selecting a composite condition for compositing the image 122 showing a subject recorded in a free rendering area 72 and the photo image 126. The composite condition may be an image layout, a layer top-bottom relationship and/or a layer transmittance, and may be specifically a detail of a composition template, for example. The composite command receiving module 61 specifies a composition template and order-sheet template in accordance with a command for selecting a composite condition.

FIG. 17 is a schematic diagram showing an order-sheet template 113 for printing the order sheet 70. FIG. 18 is a schematic diagram for explaining a composition template corresponding to the order-sheet template 113 shown in FIG. 17. That is, the order-sheet template 113 shown in FIG. 17 and the composition template 120 shown in FIG. 18 are templates to be loaded from the ROM 52 in accordance with a command for selecting an identical composite condition.

The order-sheet template 113 defines a frame 206 in which an image 208 showing a sample of the free rendering area 72 having a hand-written character recorded, for example, is to be laid out. The frames 200 and 206 in which the image 202 indicated by a file selected by the image selection command receiving module 60 are to be laid out are defined inside of a rectangular frame 204 indicating the outer edge of print paper for printing a composited image. The aspect ratio of the rectangular frame 204 agrees with the aspect ratio of print paper for printing a composited image. When the frame 206 in which the image 208 showing a sample of the free rendering area 72 is to be laid out and the frame 200 in which the image 202 indicated by a file selected by the image selection command receiving module 60 is to be laid out are displayed one over another, the order-sheet template 113 defines an alpha channel for defining transmittances of the two images.

A frame 128a defined by the composition template 120 is an area in which the photo image 126 is to be laid out. The photo image 126 is an image of a file selected by the image selection command receiving module 60. A frame 128b defined by the composition template 120 is an area in which the image 122 of the free rendering area 72 is to be laid out. The relative size and relative positional relationship among the frames 131, 128a and 128b corresponding to the size of print paper defined by the composition template 120 are equal to the relative size and relative positional relationship among the rectangular frames 204, 200 and 206 defined by the order-sheet template 113. That is, two figures are geometrically similar where one figure includes the frames 128a, 128b and 131 and the other figure includes the rectangular frames 204, 200 and 206. Therefore, a user can estimate the composite result from the sample 111 (see FIG. 16) printed on the order sheet 70 based on the rectangular frames 204, 200 and 206. It is to be noted that the image 202 to be allocated to the frame 200 of the order sheet template 113 may be an image selected by the user or a sample image stored beforehand in the ROM 52. Further, instead of composing the frame 204, the image 202, and the image 208 and displaying a composition-resultant sample, one sample image corresponding to the composition-resultant sample may be stored in the ROM 52 beforehand and allocated.

FIG. 19 is a flowchart showing an image processing method according to the fifth example of the invention.

In step S101, the multifunction machine 1 receives a command for each different composite condition for compositing an image 122 of a subject and the photo image 126. More specifically, the composite command receiving module 61 causes the LCD 14 to display a menu screen 1100 shown in FIG. 20 and then receives, as a composite condition command, a signal output from the operating portion 42 resulting from selecting one composite condition by manipulating the cross button 12 and pressing the OK button 10 by a user. The composite command receiving module 61 may guide a user to selectable composite conditions by displaying a sample 111 specifically showing the composite result on the screen or may guide a user to selectable composite conditions by displaying strings such as "Two Rows" and "Overlay" on the screen.

In step S102, the composite command receiving module 61 loads the order-sheet template 113 and composition template 120 from the ROM 52 to the RAM 53 in accordance with the composite condition command received in step S101. The processing specifies the free rendering area 72 of the order sheet 70 in accordance with a composite condition command and specifies the layout, layer top-bottom relationship, layer transmittances, size of print paper in accordance with the composite condition command for the image 122 of the free rendering area 72 and the photo image 126.

According to the fifth example of the invention described above, a user can record a subject in the free rendering area 72 by estimating the composite result specifically since the sample 111 of the result of the composition between the image selected by a user and a subject such as a hand-written character is printed on the order sheet 70.

Sixth Example

FIG. 21 is a schematic diagram showing a state in which a subject is recorded on an order sheet 70 to be printed by the multifunction machine 1 according to a sixth example of the invention. The multifunction machine 1 according to the sixth example of the invention prints multiple samples 111 on the order sheet 70 and receives a composite condition command through an identifier 136 of each of the samples 111. The template for printing the order sheet 70 is substantially identical to that of the fifth example except that multiple pieces of definition information for printing the samples 111 are provided, and the description will be omitted here.

FIG. 22 is a flowchart showing an image processing method according to the sixth example of the invention.

The multifunction machine 1 receives a composite condition command by performing step S101 after a scan request is received in step S108. More specifically, the composite command receiving module 61 causes the LCD 14 to display a menu screen 1110 shown in FIG. 23. On the menu screen 1110, one of the identifiers 136 given to the samples 111 on the order sheet 70 can be selected by pressing the cross button 12 and OK button 10. The composite command receiving module 61 receives a kind of composite condition command in accordance with a signal output from the operating portion 42 in response to the cross button 12 and OK button 10 pressed by a user.

In step S111, the control portion 50 specifies a composition template in accordance with the composite condition command received in step S110. More specifically, the composition module 66 loads the composition template from the ROM 52 to the RAM 53 in accordance with the identifier selected by a user in step S110.

According to the sixth example of the invention described above, the multiple samples 111 in accordance with composite conditions selectable by a user can be printed on the order sheet 70. Thus, the user can specifically recognize the selectable composite conditions even when the LCD 14 has a low resolution and a small screen size.

Seventh Example

FIG. 1 is a schematic diagram showing a state in which a subject 116 is recorded on an order sheet 70 to be printed by the multifunction machine 1 according to a seventh example of the invention. The multifunction machine 1 according to the seventh example of the invention prints, on the order sheet 70, multiple check boxes 88 to be used for selecting a composite condition and optically recognizes a hand-writing 88m filling the check box 88, based on which a composite condition or conditions is or are specified. The template for printing the order sheet 70 has the check boxes 88 immediately below the multiple samples 111 showing composite results. The samples 111 are equivalent to claimed composite condition notations. A user may fill one of the check boxes 88 so that the user can select a composite condition corresponding to the sample 111 located directly above the check box 88. The hand-writing 88m filling the check box 88 is equivalent to a composite condition mark.

FIG. 24 is a flowchart showing an image processing method according to the seventh example of the invention.

In step S111, the control portion 50 specifies a composition template corresponding to the filled check box 88. More specifically, the composition module 66 serving as a composite condition recognizing unit determines whether any of the check boxes 88 is filled or not based on a pre-scan image thereof and loads the composition template corresponding to the filled check box 88 from the ROM 52 to the RAM 53. As a result, the control portion 50 recognizes the composite condition indicated by the sample 111 pointed by the composite condition mark recorded on the order sheet 70.

According to the seventh example of the invention described above, a user can easily specify a composite condition since the composite condition can be commanded by filling the check box 88 before or after a hand-written character, for example, is recorded on the free rendering area 72.

Eighth Example

FIG. 25 is a schematic diagram showing an order sheet 70 to be printed by the multifunction machine 1 according to an eighth example of the invention. The multifunction machine 1 according to the eighth example of the invention prints, on the order sheet 70, check boxes 91 and 76 to be used for selecting printing conditions and optically recognizes hand-writings 91m and 76m filling the check boxes 91 and 76, based on which a printing condition or conditions is or are specified. A user can select one of multiple kinds of print paper by filling one of the multiple check boxes 91. A user can also select a number of pages by filling one of the multiple check boxes 76.

According to the eighth example of the invention, a user can easily specify a printing condition or conditions since the printing condition or conditions can be commanded by filling the check boxes 91 and 76 before or after a hand-written character, for example, is recorded on the free rendering area 72.

Ninth Example

FIG. 26 is a functional block diagram of a multifunction machine 1 according to a ninth example of the invention.

A third operating unit 304 includes an operating portion 42 and a control portion 50 for implementing a composite command receiving module and receives a predetermined button manipulation for selecting a layout of the image selected by an image select area 71, which will be described later, and the free rendering area 72.

A first operating unit 300 includes the control portion 50 for implementing the composite command receiving module and the operating portion 42 and receives a predetermined button manipulation as an order-sheet request.

A first output unit 310 includes the control portion 50 for implementing a print control module, a card reader/writer portion 41 and a printer unit 30. When the first operating unit 300 receives an order-sheet request, the first output unit 310 loads and prints on an order sheet, which will be described later, image data stored in the removable memory 3 and a template stored in the ROM 52.

A second operating unit 302 includes the control portion 50 for implementing the composite command receiving module and the operating portion 42 and receives a predetermined button manipulation as a request for printing a composited image.

An order reading unit 306 includes the control portion 50 for implementing a read control module and an image selection mark recognizing module and a scan unit 20 and, when the second operating unit 302 receives a request for printing a composited image, reads an order sheet 70, optically recognizes the verification mark 81, reference mark 82, filled check boxes 74m, 76m, 79m, 86m and 87m, and outputs an image of the free rendering area 72. The image selection mark recognizing module serving as an image selection mark recognizing unit is a program component that recognizes an image file selected by a user based on the image read from the check box 74.

A second output unit 308 includes the control portion 50 for implementing a composition module and a printer unit 30 and prints a composited image of the image selected by the image select area 71 and the image showing the free rendering area 72. The second output unit 308 displays a preview, which will be described later, on the LCD 14 without printing the composited image.

FIG. 27 is a schematic diagram showing an example of the order sheet 70 to be printed by the multifunction machine 1 connecting to the removable memory 3 in a directory structure shown in FIG. 28. The layout of the order sheet 70 is defined by an order sheet template stored in the ROM 52. FIG. 31 is a schematic diagram showing another example of the order sheet 70 on which requirements are written by a user. The layout of elements notated on the order sheet 70 is defined with reference to a reference mark 82.

The reference mark 82 is laid out at the upper left corner of the order sheet 70. The order reading unit 306 locates the position of the reference mark 82 so that the positions of the elements notated on the order sheet 70 can be relatively located.

The image select area 71 has a layout of thumbnail image 73 stored in an image file (such as tree.jpg, face.jpg, flower.jpg, sea.jpg, maples.jpg, sunrize.jpg, mountain.jpg and person.jpg) stored in a DCIM folder 90 of the removable memory 3 and check boxes 74. The check box 74 is filled so that the original image of an image file corresponding to a thumbnail image 73m (such as the thumbnail image in the sunrise.jpg) laid out immediately above the check box 74m can be selected as a composite target. The thumbnail image 73 is equivalent to the claimed image notation. The hand-writing filling the check box 74m is equivalent to the claimed image selection mark. The image file stored in the DCIM folder 90 of the removable memory 3 may be notated with the original image thereof or may be notated with a printed file name or internal identifier thereof.

The free rendering area 72 is a blank area on which a hand-written character (such as "HAPPY NEW YEAR") is to be rendered or a magazine scrap is to be pasted and is provided within the rectangular frame. The hand-written character or characters, a figure of a hand-writing to be hand-written on the free rendering area 72, a printed matter to be pasted on the free rendering area 72, or a character or characters and/or a figure or figures to be printed on the free rendering area 72 are equivalent to the claimed subject.

An area 75 for selecting a number of pages to print has a check box 76 corresponding to a number of each digit of a number of pages to print from 0 to 99 and a check box 84 for selecting a preview. The check box 76 laid out in the left column is filled to select a number of the ten place of the number of pages to print. The check box 76 laid out in the right column is filled to select a number of the one place of the number of pages to print.

A layout select area 77 has images 78 schematically showing layouts and check boxes 79. The check box 79 is filled to select a layout corresponding to an image 78 laid out immediately above the filled check box 79 thereof. The hand-writing (79m: see FIG. 31) filling the check box 79 is equivalent to the claimed composite condition mark.

An overlap composite condition select area 85 displays a check box 86 and check boxes 87. The check box 86 is filled to select a border processing condition regarding whether a white border is given to a hand-written character composited over an image selected in the image select area 71 or not. The check box 87 is filled to select a transparency (such as 0%) of the layer having a hand-written character. Notably, the width of a white border may be specified as a border processing condition, and a different transparency may be selected as an overlap composite condition.

FIG. 29 is a flowchart showing processing for printing a composited image by the multifunction machine 1 according to the ninth example of the invention. FIG. 30 is a schematic diagram showing a screen transition of the LCD 14.

When the removable memory 3 is connected to the multifunction machine 1 and after a user selects "PRINT ORDER SHEET" with the cross button 12 on the menu screen 100 and presses the OK button 10, the LCD 14 displays a screen 102 for selecting a template of an order sheet 70. After a user selects a template (such as a NEW YEAR CARD) with the cross button 12 and presses the OK button 10 on the screen 102, the first operating unit 300 receives the order sheet request. If the first operating unit 300 receives the order sheet request (step S10), the processing moves to step S12.

In step S12, the LCD 14 displays a screen 104 indicating that the order sheet 70 is in printing, and the first output unit 310 prints the order sheet 70.

In step S14, a user fills the check boxes 74, 76, 79, 86 and 87 on the printed order sheet 70 based on image processing conditions to be defined and renders a hand-written character on the free rendering area 72 (see FIG. 31).

Next, the user places the order sheet 70 at a predetermined position of an original table, not shown, selects "PRINT COMPOSITED IMAGE" with the cross button 12 and presses the OK button 10 on the menu screen 100. Then, the second operating unit 302 receives the scan request. If the second operating unit 302 receives the scan request (step S16), the processing moves to step S18.

In step S18, the LCD 14 displays a screen 106 indicating that the composited image is in printing, and the second output unit 308 prints the composited image. Upon completion of the printing of the composited image, the LCD 14 displays the menu screen 100.

FIG. 32 is a flowchart showing details of the processing (step S12) for printing an order sheet 70.

After the first operating unit 300 receives an order-sheet request, the first output unit 310 gives an identifier to an image file stored in the DCIM folder 90 of the removable memory 3 (step S200). Here, serial numbers serving as identifiers are given to image files in ASCII code order of the file names of the image files.

Next, a check thumb is defined (step S201). The check thumb is calculated based on contents of data stored in the DCIM folder 90 of the removable memory 3 and is stored in a predetermined area of the RAM 53.

Next, the template selected in step S10 is loaded from the ROM 52 to the RAM 53 (step S202), and the first output unit 310 lays out the thumbnail image of the image file and the verification mark 81 in the layout frame defined by the template and prints the order sheet 70 (step S203).

FIG. 33 is a flowchart showing details of the processing (step S18) for printing a composited image.

In step S300, the order reading unit 306 reads the order sheet 70 as a monochrome binarized image at a low resolution, locates, on the image, the positions of the verification mark 81 and check boxes 74, 76, 79, 86 and 87 based on the reference mark 82 and then optically recognizes the verification mark 81 and the processing conditions selected with the filled check boxes (see FIG. 1) 74m, 76m, 79m, 86m and 87m.

In step S302, the check thumb corresponding to the verification mark 81 recognized in step S300 and the check thumb defined in step S201 are compared, whereby whether the image file notated on the order sheet 70 agrees with the image file stored in the removable memory 3 or not is determined. If so, the processing moves to step S304. If not, a screen for warning the fact that the image notated on the order sheet 70 is different from the image stored in the removable memory 3 is displayed on the LCD 14 (step S306).

In step S304, whether two or more image files are selected in the image select area 71 or not is determined. If only one image file is selected, the processing moves to step S308. If two or more image files are selected, a screen for warning the fact is displayed on the LCD 14 (step S310).

Next, the range of the free rendering area 72 is recognized based on the reference mark 82 recognized in step S300 (step S308). The reference mark 82 is used to locate the range of the free rendering area 72 so that the position of the free rendering area 72 can be accurately located even when the order sheet 70 is not placed at a predetermined position on the original table.

Next, the order reading unit 306 reads the free rendering area 72 and a margin area 83 (see FIG. 27) near the free rendering area 72 at a high resolution (step S312).

Next, the area of a subject such as a hand-written character is extracted from the image showing the free rendering area 72 (step S314). An image resulting from the composition of the image showing the free rendering area 72 and the margin thereof with the image selected in the image select area 71 may be created by compositing the image showing the free rendering area 72 and the image selected in the image select area 71 directly with the step S314 skipped.

In step S316, a subject such as a hand-written character in the area extracted in step S314 and the image to be composited, which is selected in the image select area 71, are composited in accordance with the layout selected in the layout select area 77.

Next, the composited image is repeatedly printed by the second output unit 308 until the composited image is printed the number of pages to print, which is selected in the area 75 for selecting a number of pages to print, is printed (steps S318 and 320).

FIG. 34 is a flowchart showing details of the processing (step S314) for extracting a hand-written character area from the image showing the free rendering area 72 and compositing the extracted area over the image selected in the image select area 71.

In step S400, a threshold value is determined for distinguishing the margin area 83 showing the base color of the order sheet 70 and a hand-written character. More specifically, an intensity histogram is first created for the margin area 83. The intensity histogram has an intensive distribution of the intensity values corresponding to the base color of the order sheet 70 as shown in FIG. 35. Thus, a threshold value for extracting an area of a subject from the image showing the free rendering area 72 is next defined near the range having the intensive distribution. Therefore, a proper value can be defined based on the base color of the print sheet used for the order sheet 70.

In step S402, the area of the hand-written character is extracted from the image showing the free rendering are 72 based on the defined threshold value. Then, the value of the alpha channel of the area is defined to the transparency selected at the check box 87 of the overlap composite condition select area 85, and the value of the alpha channel of the other area is defined completely transparent. The alpha channel is a channel indicating the transparency of a layer of the image for each pixel.

In step S403, noise is removed from the area extracted as a hand-written character. More specifically, the transparency of the land-shaped area including a predetermined or lower number of pixels of the extracted area is defined completely transparent. Here, FIG. 36B is a schematic diagram showing overlap composite processing to be performed when the transparency of the area corresponding to the noise in the alpha channel is not changed, that is, when noise is not removed. FIG. 36C is a schematic diagram showing overlap composite processing to be performed when the transparency of the area corresponding to noise in the alpha channel is defined completely transparent, that is, when noise is removed.

Next, when the white border is selected as an overlap composite condition, the opaque area of the alpha channel is expanded (step S404). As a result, in step S316, a composited image having a hand-written character with a border can be formed (see FIG. 36D) since the base color of the order sheet 70 around the hand-written character is composited over the image selected in the image select area 71. Up to this point, the details of the step S314 have been described.

With the multifunction machine 1 according to the ninth example of the invention described above, a user can easily recognize an image processing condition such as accessible image data, a selectable layout, a number of pages to print and a border processing condition. Moreover, a user can easily select an image to be composited from accessible image data, select an image processing condition and input a hand-written message, for example, to be composited with an image to be composited. Therefore, a user can easily cause even a system having simple hardware proving HMI to composite and display a desired image and a hand-written message, for example.

Further, the image 78 that schematically shows a layout and an image of the thumbnail image 73 etc. that represents a photo image to be composed have been printed together with a rectangular frame that encloses the free rendering area 72, so that the user can record a subject such as a handwritten character in the free rendering area 72 by accurately predicting how the photo image and the handwritten character etc. are composed.

Furthermore, since the order sheet 70 has the reference mark 82, the position of the free rendering area 72 having a hand-written message, for example, can be relatively located on the image showing the order sheet 70. Thus, the real free rendering area 72 can be located accurately.

Furthermore, since overlap composite can be selected as an image processing condition, a printed matter can be created having a design in which a message is directly hand written on a photograph, for example.

Furthermore, since the margin area 83 is read to recognize the base color of the order sheet 70, the area of a hand-written character can be precisely extracted from the image showing the free rendering area 72.

Furthermore, the order sheet 70 is read at a low resolution, and the free-rendering area 72 and the margin area 83 in the vicinity are read at a high resolution. Thus, the time for reading the order sheet 70 can be reduced without deteriorating the quality of the composited image.

Furthermore, the image processing system of the invention may include a printer only including an optical sensor for paper position detection on a paper conveyance path. That is, the optical sensor for paper position detection may be used to recognize a filled check box on an order sheet.

Furthermore, the image select area 71 may have an identifier and/or a file name instead of the thumbnail image 73. In this case, the LCD 14 is desirably adjusted to be capable of displaying the thumbnail image 73 and an identifier corresponding thereto.

Tenth Example

For a multifunction machine 1 according to a tenth example, an order sheet 70 is used on which two image files can be selected in the image select area 71.

FIG. 37 is a schematic diagram showing a screen transition according to the tenth example of the invention.

When a user selects "PRINT ORDER SHEET" with the cross button 12 and presses the OK button 10 on the menu screen 100 displayed, the LCD 14 displays a screen 2021 for selecting a layout. The screen 2021 displays an icon 203 schematically showing a layout. When the user selects one icon with the cross button 12 and presses the OK button 10 on the displayed screen 2021, the layout shown by the icon is selected, and the first operating unit 300 receives a request for printing the order sheet 70 in accordance with the selected layout (step S10).

FIG. 38 is a schematic diagram showing an example of the order sheet 70 according to the tenth example of the invention.

The printed image select area 71 has check boxes 74a and 74b for each thumbnail image 73. A user can select two image files by filling one of the check boxes 74a and filling one of the check boxes 74b.

The free rendering area 72 has a rectangular frame indicating areas 89a and 89b in which an image indicated by the image file selected in the image select area 71 is laid out. A user can render a hand-written character on the free rendering area 72 excluding the areas 89a and 89b.

A position and a size of the frames 89a and 89b with respect to the free rendering area 72 respectively agree with a position and a size of each of two images selected by the user with respect to an image read from the free rendering area 72 in a composite layout.

With the image processing system according to the tenth example of the invention described above, an order sheet 70 can be output in a form in accordance with a layout selected by a user. Thus, when the user writes a hand-written message, for example, in the free rendering area 72, the user can easily image the result of the composition with an image to be composited. Moreover, two images to be composited can be selected simply by filling the check boxes 74a and 74b on the order sheet 70.

Eleventh Example

An order-sheet receiving terminal serving as an eleventh example of the image processing system of the invention is an apparatus for reading an order sheet and receiving an order for printing.

FIG. 39 is a schematic diagram showing a printer system using the order-sheet receiving terminal according to the eleventh example of the invention. A printer system 6 includes an order-sheet receiving terminal 4, a printer 212 connecting to the order-sheet receiving terminal 4, a PC 210, and a printer 211 connecting to the PC 210.

The order-sheet receiving terminal 4 may be placed in a shop or a convenience store, for example, which provides a digital image printing service. The order-sheet receiving terminal 4 includes an input unit 213, an operating unit 214, an order reading unit 306 and an output unit 215. The operating unit 214 has substantially the same function as that of the second operating unit of the ninth example. The output unit 215 has substantially the same function as that of the second output unit of the ninth example. The input unit 213 is an input interface for inputting data stored in the removable memory 3.

The order-sheet receiving terminal 4 uses the operating unit 214 to receive a predetermined button manipulation by a user as a request for reading an order sheet 70 and uses the output unit 215 to display a preview of a printing result of a composited image on a display device, not shown, in the order-sheet receiving terminal 4. The composited image is created based on an image input from the removable memory 3 by the input unit 213 and is printed by the printer 212 connecting to the order-sheet receiving terminal 4.

With the image processing system according to the eleventh example of the invention described above, a user can easily obtain a high quality printed matter of a composited image having a laid-out hand-written character, for example, even when a printer with high quality printing ability is not available to the user.

Twelfth Example

In the image processing system according to a twelfth example, a setting for a number of pages to print is received through a key manipulation.

FIG. 40 is a schematic diagram showing a screen transition of the LCD 14 according to the twelfth example of the invention. FIG. 41 is a flowchart showing processing for printing a composited image in the image processing system according to the twelfth example of the invention.

In step S330 of the processing for printing a composited image, if the multifunction machine 1 recognizes a check box 84 for selecting a preview of an order sheet 70 is filled and then determines it as a preview request, the processing moves to step S332. If the multifunction machine 1 determines that no preview request is received, the processing moves to step S318. In step S332, the multifunction machine 1 displays a test mode screen 220 on the LCD 14. The test mode screen 220 displays a composited image 228 of a hand-written character written in the free-rendering area 72 and an image indicated by the image file selected in the image select area 71. The test mode screen 220 further displays a PRINT button 222 and a number-of-pages setting box 224. The cross button 12 on the test mode screen 220 may be manipulated vertically to define a desired number of pages to print in the number-of-pages setting box 224. When the cross button 12 is manipulated horizontally, the PRINT button 222 or a BACK button 226 is selected. When the OK button 10 is pressed with the PRINT button 222 selected, a print request for the defined number of pages to print is received (step S334). Then, the processing moves to step S318. In steps S318 and S320, the composited image is repeatedly printed by the second output unit 308 until the defined number of pages of the composited image are printed.

Notably, though the composited image 228 is displayed on the test mode screen 220 in step S332, one page of the composited image 228 may be printed by the second output unit.

With the image processing system according to the twelfth example of the invention described above, an order sheet 70 does not have to be read again for defining a number of pages of a composited image to print by a user after the display or printing of the composited image in response to a preview request defined on the order sheet 70. That is, a user does not have to read an order sheet, which takes time, for defining a desired number of pages to print, but can define the number of pages to print through a simple button manipulation, which can reduce a work time therefor.

Thirteenth Example

In the image processing system according to a thirteenth example, after the image in the free rendering area 72 resulting from reading an order sheet 70 at a low resolution and the thumbnail image of the image file selected in the image select area 71 are composited and displayed on the screen, the image in the free rendering area 72 resulting from reading the order sheet 70 at a high resolution and the original image of the image file selected in the image select area 71 are composited and printed in response to a user's print request.

FIG. 42 is a schematic diagram showing a screen transition of the LCD 14 according to the thirteenth example of the invention. FIG. 43 is a flowchart showing processing for printing a composited image in the image processing system according to the thirteenth example of the invention.

In step S340, the multifunction machine 1 displays, on a test mode screen 230 of the LCD 14, a composited image 238 resulting from composition of the image in the free rendering area 72 read at a low resolution in step S300 and the thumbnail image of the image selected in the image select area 71 under an image processing condition defined on the order sheet 70. A scan request is received (step S342) when a PRINT button 232 displayed on the test mode screen 230 is selected through a manipulation on the cross button 12 and the OK button 10 is pressed. Then, the processing moves to step S312. As described with reference to the ninth example, steps S312, 314, 316, 318 and S320 include reading the free rendering area 72 at a high resolution, compositing the original image of the image file selected in the image select area 71 and the high resolution image of the free rendering area 72, and printing the composited image of the defined number of pages. The test mode screen 230 further includes a BACK button 236. When a user selects the BACK button 236 through the cross button 12 and presses the OK button 10, a menu screen 1000 is displayed without printing (step S342).

With the image processing system according to the thirteenth example of the invention described above, the image of the free-rendering area 72 resulting from reading an order sheet 70 at a low resolution and the thumbnail image selected in the image select area 71 are composited under an image processing condition defined on the order sheet 70, and the composited image is displayed on the test mode screen 230. Thus, a user can request printing after checking an expected printing result thereof. Therefore, the image processing system according to the thirteenth example of the invention can reduce the amounts of print paper and ink consumed by test printing. Furthermore, the image processing system according to the thirteenth example of the invention can reduce time required for checking a printing result since the test mode screen 230 displays the composited image 238 based on the image read at a low resolution and the thumbnail image.

Fourteenth Example

In the image processing system according to a fourteenth example, an order sheet 70 allows selecting an image to be composited and defining a layout, number of pages to print and border processing condition, which are image processing conditions, and, after the order reading unit 306 reads the order sheet 70, a hand-written message, for example, is separately read and is composited and displayed with the selected image.

FIG. 44 is a schematic diagram showing the order sheet 70 according to the fourteenth example of the invention. The order sheet 70 includes the image select area 71, the area 75 for selecting a number of pages to print, the layout select area 77 and the overlap composite condition select area 85.

FIG. 45 is a schematic diagram showing a screen transition of the LCD 14 according to the fourteenth example of the invention. FIG. 46 is a flowchart showing processing for printing a composited image in the image processing system according to the fourteenth example of the invention. FIG. 47 is a schematic diagram showing a user's original 260.

In the multifunction machine 1, when a user places the order sheet 70 on an original table, not shown, selects "PRINT COMPOSITED IMAGE" with the cross button 12 and presses the OK button 10 on the menu screen 1000, the second operating unit 302 receives the scan request and starts processing for printing the composited image. The multifunction machine 1 reads the order sheet 70 as a monochrome binarized image at a low resolution and identifies an image to be composited and an image processing condition in step S300 of the processing for printing a composited image, checks errors in steps S302 and S304 and then displays an original placement waiting screen 240 on the LCD 14. Next, when a user places the user's original 260 on the original table, not shown, and presses the OK button 10, the multifunction machine 1 determines the completion of the placement of the user's original 260 (step S350) and moves the processing to step S352. Here, the user's original 260 may be a rectangular original to be placed at a predetermined position on the original table or may be an original in any form to be placed at any position on the original table. Next, the multifunction machine 1 displays, on the LCD 14, a screen 242 indicating the composited image is being printed. The multifunction machine 1 further reads an image of the entire original table as a monochrome binarized image at a low resolution and locates the composite target area of the original table based on the read image (step S352). Here, the entire user's original 260 may be a composite target area, or an area excluding an area corresponding to a mount for the user's original 260 may be a composite target area. The following steps of reading a composite target area as an area of a subject such as a hand-written character at a high resolution, creating a composited image thereof, and printing are identical to those of the first example.

The image processing system according to the fourteenth example of the invention described above accepts various subjects to be composited.

Though a result of composition between the image in the free rendering area 72 and the image selected in the image select area 71 is printed in the above-described multiple examples, the image processing system may only output data indicating the image resulting from composition of the image of the free rendering area 72 and the image selected in the image select area 71 to a removable memory or a communication circuit, for example.

The image processing system of the invention does not have to be a single multifunction machine but may include a PC and a printer and image scanner connecting to the PC. In this case, an interface such as a USB (Universal Serial Bus) interface for connecting between the PC and the image scanner and a USB interface for connecting the PC and the printer is equivalent to the claimed "interface that connects the printer unit and the scan unit".

[List of Order Sheet Configurations]

FIG. 48 is a table that lists combinations of components arranged on the hitherto described order sheet.

Fifteenth Embodiment

1. Configuration of Image Processing System

FIG. 50 shows an outer appearance of a multifunctional machine 1 according to the fifteenth embodiment of an image processing system according to the present invention. FIG. 51 is a block diagram showing the multifunctional machine 1. The multifunctional machine 1 has a function to print an image input from a removable memory 20 or a personal computer (PC) not shown and a copying function. It is to be noted that the image processing system may be configured by a scanner having a function to read an image, a printer having a printing function, and a PC having a function to control the scanner and the printer.

A scan unit 50, which is contained mainly in an upper housing 14, comprises an illumination portion 52, an image sensor 54, an analog front end (AFE) portion 56, a sensor driver portion 74, a sensor carriage driver portion 76, etc. The illumination portion 52 is configured by a fluorescent lamp that is large in a main scanning direction. The image sensor 54 driven by the sensor driver portion 74 is a linear image sensor such as a color CCD linear image sensor etc. equipped with a group of three channels, for R, G, and B colors, of photoelectric devices. The image sensor 54 is mounted on a sensor carriage, not shown, that moves parallel with a transparent original table. The image sensor 54 outputs an electric signal correlated with shading of an optical image of an original formed on a light receiving surface by a lens and a mirror not shown. The sensor carriage driver portion 76 is equipped with a motor, a driving belt, a driver circuit, etc., which are not shown. The sensor carriage driver portion 76 reciprocates the sensor carriage along a guide rod, now shown, that is installed to be vertical to a main scanning direction. A two-dimensional image can be read by moving the image sensor vertically with respect to the main scanning direction. The AFE portion 56 is equipped with an analog signal processing circuit for amplification, noise removal, etc., an A/D converter etc.

A printer unit 86, which is contained mainly in a lower housing 16, comprises a print head 84 for forming an image on a sheet of paper by ink jet printing, a head carriage driver portion 78, a paper feeder portion 80, a print control portion 82 for controlling these, etc. It is to be noted that the printer unit 86 may have a configuration that accommodates any other printing such as laser printing. The print head 84 is provided to a head carriage, not shown, that is mounted with an ink cartridge and comprises a nozzle, a piezo actuator, a piezoelectric driver circuit etc. for outputting a drive signal to be applied to the piezo actuator. The piezoelectric driver circuit can control an ink drop jetted from the nozzle in three steps of large, medium, and small sizes, in accordance with a waveform of a drive signal applied to the piezo actuator. The piezoelectric driver circuit applies a drive signal having a predetermined waveform to the piezo actuator in accordance with a control signal output from the print control portion 82. The head carriage driver portion 78 comprises a motor, a driving belt, a motor driver circuit, etc., not shown. The head carriage driver portion 78 reciprocates the print head 84 vertically with respect to a direction in which a sheet of paper is carried. The paper feeder portion 80 comprises a paper conveying roller, a motor, a motor driver circuit, etc., not shown. The paper feeder portion 80 rotates a paper conveying roller to thereby convey a sheet of paper vertically with respect to a shaft line in a direction in which the print head 84 moves. The print control portion 82 is an ASIC that has a function to control a buffer memory to which print data pieces are sequentially transferred from a RAM 60 and a timing at which print data stored in the buffer memory is output to the print head 84 in accordance with a position of the head carriage, a function to control the head carriage driver portion 78 and a function to control the paper feeder portion 80.

An external memory controller 70, which functions as an access unit, is connected to the removable memory 20 inserted through a card slot 18. Data stored in the removable memory 20 is read by the external memory controller 70 and transferred to the RAM 60.

An operation portion 68 comprises a variety of push buttons such as an LCD 24 for displaying a menu, a cross button 22 for operating a menu, an OK button 28, a cancel button 21, a print command button 30, and a numeric keypad 26. It is to be noted that the operation portion 68 may be configured by a touch panel, a pointing device, etc.

A communication portion 69, which functions as an access unit, is a communication interface for permitting a control portion 58 to communicate with an external system such as a PC. The communication portion 69 communicates with an external system through an LAN, the Internet, a USB, etc.

The control portion 58 comprises the RAM 60, a ROM 62, and a CPU 64. The CPU 64 controls the portions of the multifunctional machine 1 by executing a control program stored in the ROM 62. The ROM 62 is a nonvolatile memory in which the control program is stored. The RAM 60, which serves as a recording medium, is a volatile memory for temporarily storing the control program or an image read by the scan unit 50 and a variety of kinds of data pieces such as a color gamut table of a background image. The control program may be stored in the ROM 62 via a network from a remote server or stored in the ROM 62 via a computer-readable recording medium such as the removable memory 20. The control portion 58 functions as a subtractive color processing unit, an order sheet print control unit, a composition unit, and a composite print control unit by executing the control program.

A digital image processing portion 66 is a dedicated circuit such as a DSP for performing image processing such as decoding of a JPEG image, a resolution conversion, unsharp processing, gradation processing, binarization, and version division processing in cooperation with the CPU 64.

The above has described a hardware configuration of the multifunctional machine 1. The following will describe processing to print an order sheet.

2. Processing to Print Order Sheet

FIG. 52 is a flowchart showing a flow of processing to print an order sheet. The processing shown in FIG. 52 starts when an order sheet print mode is selected on a mode selection menu and is performed when a predetermined module of the control program stored in the ROM 62 is executed by the control portion 58.

First, the control portion 58 sets a user image, which is a photo image to be composed (step S100). Specifically, for example, the control portion 58 displays on the LCD 24 user images stored in the removable memory 20 and, when having received a command to select the user image through manipulation of the cross button 22, the OK button 28, etc., sets a user image that matches the selection command, as a subject to be composed.

At steps S102, S104, S106, S108, and S110, the control portion 58 generates a background image from the user image in cooperation with the digital image processing portion 66. An original user image for a background image may be an image having a maximum resolution which is to be composed with a subject such as a handwritten character or a thumbnail image. By forming a background image based on a thumbnail image, processing time can be reduced. A user image in accordance with a JPEG format etc. has three color channels for R, G, and B colors when it is decoded. If a gradation value of each of the channels is represented in one byte, a color gamut of a user image is configured by 16777216 (256×256×256) color values. In a case where the color gamut of a user image extends over the entire color space, it is extremely difficult to optically recognize an area of a character written using a color pen on the user image printed. In a case where a color gamut of a user image and a color gamut of an area of a character do not overlap with each other, it is possible to decide a pixel in a specific color gamut as the area of the character. To expand a range of a color gamut of a subject such as a character that can be written on a user image, that is, to increase the number of colors that can be utilized by the user, it is necessary to narrow the color gamut of the user image printed under the subject. The following will describe a variety of image processing pieces to be performed by the multifunctional machine 1 in order to restrict a color gamut of a user image.

FIG. 53 is a schematic diagram showing a color gamut of a user image and a color gamut of a background image to be printed on an order sheet. Since an arbitrary subject is shown by a user image, a color gamut of the user image is comprised of full colors (e.g., 16777216 colors). To narrow a color gamut of a background image, first the control portion 58 converts a user image into a gray-tone image (step S102).

FIG. 54 shows a variation in gradation properties in a process up to generation of a background image from a user image. When a user image having gradation properties shown in FIG. 54A is converted into a gray-tone image, gradation properties of the gray-tone image are such that histograms of channels for R, G, and B colors agree with each other as shown in FIG. 54B. The control portion 58 may obtain brightness from R, G, and B colors and convert gradation values of the R, G, and B colors into values having linear relationship with the brightness to thereby generate a gray-tone image or may convert gradation values of R-color and B-color channels into those of G-color channel to thereby generate a gray-tone image.

Next, the control portion 58 converts the gray-tone image into a cyan-colored monotone image (step S104). Specifically, for example, the control portion 58 sets all gradation colors of the G-color and B-color channels to one fixed value (e.g., 256/256) by leaving only gradation values of the channel for R, which is complementary to cyan, as they are. It is to be noted that a hue of the monotone image is not limited to cyan but only needs to be a single; however, a hue of an ink color of the printer unit 86 is preferable such as cyan, magenta, or yellow. It is to be noted that single-hue images include a gray-tone image. When a gray-tone image having gradation properties shown in FIG. 54B is converted into a cyan-colored monotone image by converting all gradation values of the G-color and B-color channels into a maximum value, the monotone image has gradation properties shown in FIG. 54C.

Next, the control portion 58 flattens the R-color channel histogram of the cyan-colored monotone image (step S106). Specifically, for example, the control portion 58 sequentially adds up frequencies of the R-color channel gradation values starting from a minimum value until a value closest to a target value is obtained, whereupon it sets a post-flattening minimum gradation value $R_1$ to pixels having gradation values $[r_1-r_p]$ obtained by hitherto adding up the frequencies. Next, the control portion 58 again adds up frequencies of gradation values sequentially starting from a gradation value $r_{p+1}$ of the R-color channel until a value closest to a target value is obtained, whereupon it sets a post-flattening gradation value $R_2$ to pixels having gradation values $[r_{p+1}-r_p]$ obtained by hitherto adding up the frequencies. When converting a gradation value, the control portion 58 may set a new gradation value in accordance with an average of gradation values of peripheral pixels or set a new gradation value at random. If a histogram of the R-color channel of a cyan-colored monotone image is flattened, the monotone image has such gradation properties as shown in FIG. 54D.

As a method for reducing a standard deviation of gradation values of the R-colored channel, besides the above-described histogram flattening, for example, parametric conversion or linear conversion can be employed. Further, gradation properties of a user image may be analyzed to switch these conversion methods in accordance with these gradation properties or, these conversion methods to reduce a standard deviation of the R-color channel gradation values may not be performed if gradation properties of a user image are such that a background image provides a sufficient level of contract even if the deviation of the R-color channel gradation values is not reduced.

A histogram $g_j$ (j=1, 2, . . . , M) which is targeted in parametric conversion is given by the following equation (1).
[Equation 1]

$$g_i = f_j^p \Big/ \sum_{i=1}^{M} f_i^p \left( \text{where} \sum_{i=1}^{M} f_i = 1 \right) \qquad (1)$$

A parameter p is set to, for example, p=0.5–0.7. By setting such a parameter, it is possible to improve a contract of a band (value range) of high-frequency gradation values without decreasing a contract of a band of low-frequency gradation values as compared to the case of histogram flattening. It is to be noted that an algorithm to obtain a post-conversion gradation value of the R-color channel in parametric conversion is compliant with the above-described histogram flattening algorithm.

Linear conversion is effective if G-color channel gradation values of a user image are distributed over a narrow band. A transformation for extending a band $[r_A, r_B]$ of R-color channel gradation values to a larger band $[R_c, R_d]$ is as follows.
[Equation 2]
ri: pre-conversion gradation value
Ri: post-conversion gradation value $$R_i = \frac{R_d - R_x}{r_B - r_A}(r_i - r_A) + R_c \qquad (2)$$

Next, the control portion 58 compresses cyan-colored monotone image gradation values into a highlight band to thereby form a background image (step S108). The resultant background image has R-color channel gradation values concentrated into the highlight band, so that the image is lighter than the original user image. Specifically, for example, the control portion 58 converts the R-color channel gradation values in such a manner that a shadow level of the R-color channel for a cyan-colored monotone image may be increased to a predetermined value (e.g., 200/255). A method to convert the gradation values is compliant to flattening of the histograms. A background image formed by compressing the R-color channel gradation values of the monotone image shown in FIG. 54D into a highlight band have such gradation properties as shown in FIG. 54E.

By compressing a distribution of gradation values into a narrow range, gradations disappear in a band where an original image has a low contract. That is, information about a spatial configuration of the image disappears. Then, the user, if he tries to write a handwritten character etc. on a background image printed on an order sheet, cannot recognize a positional relationship between the handwritten character and a subject given in the background image. A standard deviation is decreased before compressing gradation values as described above, that is, by uniforming a distribution of gradation values, it is possible to suppress a decrease in amount of information about a spatial configuration of an image. Of course, if a distribution of gradation values is uniformed and compressed, gradation properties of an original image change greatly. However, a background image works only as a measure for determining a position where a handwritten character is to be written on an order sheet, so that the user only needs to recognize a rough spatial configuration of a user image even if its gradation properties are changed. The above has described processing to form a background image.

When having formed a background image, the control portion 58 allocates the background image to an order sheet image (step S110). FIG. 55 shows one example of the order sheet image. An order sheet image as a whole has been stored in the ROM 62 as combined with an instruction to draw one image or image component. Positional reference marks 90 and 98 are used to permit the control portion 58 recognize a position and an inclination of the order sheet placed on an original table 12. A block code 92 is a mark to permit the control portion 58 to recognize a type of the order sheet. A plurality of check marks 94 is used to permit the control portion 58 to recognize composite print conditions such as the number of copies to be printed, boundary processing conditions for handwritten characters and user images. A sample patch 96 is a chart whose color gamut agrees with that of a background image and whose density uniformly changes from transparency to a maximum density of the background image. The sample patch 96 may be constituted of one area or a plurality of areas that has different color gamuts. The background image has coordinates of its vertexes facing each other allocates to a rectangular free rendering area 100 recorded in the ROM 62. An auxiliary image area 102 has coordinates of its vertexes facing each other stored in the ROM 62 and a user image allocated in a condition where its gradation properties are left unchanged. The user image to be allocated to the auxiliary image area 102 may be an image of a maximum resolution or a thumbnail image. FIG. 56 shows one example of the order sheet image.

At step S112, the control portion 58 causes the printer unit 86 to print the order sheet image to which the background image is allocated. It is to be noted that the above-described processing to allocate a background image to an order sheet and processing to print the order sheet are performed for each band of the image. Specifically, in a case where a background image or a user image is allocated in a band, the control portion 58 performs the print processing after performing conversion of a resolution of the background image, correction of an image quality of the user image, allocation of the background image and the user image, etc. as printing the pre-allocation order sheet image for each band.

FIG. 57 is a flowchart showing a flow of processing to print an order sheet. The processing shown in FIG. 57 is performed when the control portion 58 executes a predetermined module of the control program.

At step S120, the control portion 58 converts a resolution of the background image or the user image in accordance with a size of an area to be allocated in cooperation with the digital image processing portion 66. It also converts an entire template image into an image having a print resolution.

At step S122, the control portion 58 adjusts an image quality of the user image to be allocated to the auxiliary image area 102, in cooperation with the digital image processing portion 66. Specifically, for example, the control portion 58 performs unsharp processing etc.

At step S124, the control portion 58 performs version division processing. Specifically, for example, the control portion 58 converts a gradation value of the order sheet image from that in an RGB color space into that in a CMY color space, to which an auxiliary channel for K (black) etc. may be provided. As a result, in principle, the free rendering area 100, which is a cyan-colored monotone image in which only the R-color channel has gradations and the G-color and B-color channels have a fixed value, has such gradation properties that only on a C (cyan) colored channel has gradations. However, actually, due to an error in grid value of a 3D-LUT used in conversion from an RGB value into a CMY value and an error in interpolation processing for 3D-LUT grids, typically gradations of a narrow width appear in a dense band also for the M-color and K-color channels of the free rendering area 100.

At step S126, the control portion 58 performs halftone processing. The halftone processing is based on processing to convert an array of multi-gradational color values into an array of binary values to determine whether to jet an ink drop. In the case of using large, medium, and small sizes ink drops separately from each other, multi-gradational color values are converted into any one of four values to avoid jetting, jet small-sized ink drops, jet medium-sized ink drops, and jet large-sized ink drops. In this case, four gradations can be expressed by the ink drops, so that an error occurs in gradation of each of pixels. By dispersing this error over to the pixels that exist in the vicinity, many gradations can be expressed apparently. To perform such error diffusion processing speedily, the ROM 62 stores beforehand a lookup table that describes four values assigned to a target pixel for each C, M, and Y gradations and an error in distribution of them over to the adjacent pixels. An amount of a group of ink drops jetted to a unit area from the print head 84 has a larger ratio of the small-sized ink drops as an ink concentration is decreased and a larger ratio of the large-sized ink drops as the concentration is increased.

After the halftone processing, the control portion 58 performs interlace processing to rearrange jet data pieces of four values given by the halftone processing, in order in which the drops have been jetted (step S128).

At step S130, the control portion 58 outputs the jet data pieces to the print control portion 82 in order in which the drops have been jetted, which portion 82 in turn drives the print head 84 based on the jet data pieces stored in a buffer memory sequentially.

FIGS. 59 and 60 are schematic diagrams showing how a density of an image that changes uniformly over a sheet of paper is read in a case where the image is formed using ink drops having a plurality of sizes. Numbers 110, 112, 114, 116, 118, and 120 respectively indicate one pixel to be read by the scan unit 50. Further, pixel suites of the numbers 110 and 112, the numbers 114 and 116, and the numbers 118 and 120 each correspond to the same color value (device color) of the print unit 86. Each pixel read by the scan unit 50 is extremely small, so that even pixels that correspond to the same color value may have a nonuniform intra-pixel composition of the ink drops as shown in FIGS. 59 and 60. That is, even pixels that correspond to the same color value may have different percentages of areas occupied by the ink drops in the pixels. Irregularities in occupied area percentage of the ink drops in the pixels that correspond to the same color value increase with an increasing size of the ink drops. In the case of deciding an area of a background image within a read free rendering area, accuracy of the decision increases as the irregularities decreases in occupied area percentage of the ink drops in the pixels that correspond to the same color value. That is, to improve accuracy at which to decide an area of a background image, it is preferable to print the background image and the sample patch 96 by using the smaller sized ink drops as much as possible.

To print the background image by using the smallest possible ink drops, for example, the following methods may be available:

(1) Before halftone processing by the control portion 58, a background image is formed which is light so such an extent that large-sized and medium-sized ink drops may not be jetted.

(2) After halftone processing by the control portion 58 or the print control portion 82, a value to jet the large-sized and medium-sized ink drops is converted into a value not to jet them.

(3) After halftone processing by the control portion 58 or the print control portion 82, a value to jet the large-sized and medium-sized ink drops is converted into a value to jet small-sized ink drops.

(4) the print control portion 82 causes a piezoelectric driver circuit to output a drive signal having a waveform to jet small-sized ink drops in accordance with a value to jet large-sized and medium-sized ink drops.

(5) A lookup table not containing a value to jet large-sized and medium-sized ink drops is stored in the ROM 62 besides an ordinary mode lookup table so that in a mode to print a background image, the control portion 58 may perform halftone processing by using the lookup table not containing the value to jet the large-sized and medium-sized ink drops.

3. Entry of Subject to Order Sheet

FIG. 49 is a plan view showing one example of an order sheet in which a handwritten character 126 (Hello!) after being printed by the above-described processing is entered. The free rendering area 100 has a background image printed in it. The auxiliary image area 102 has a user image printed in it in a condition where its gradation properties are left unchanged. The user can record a subject such as the handwritten character 126 on the background image printed in the free rendering area 100. In the free rendering area 100, a magazine clip or seal may be attached, to record a subject to be composed with a user image. Further, the user can set desired print conditions by filling an arbitrary check mark 94.

A user image, which is an original image of a background image, is composed with a subject such as the handwritten character 126 etc. by using the free rendering area 100 as an allocation positional reference, so that the user can record the subject such as the handwritten character 126 etc. in the free rendering area 100 by recognizing a spatial configuration of the user image based on a spatial configuration of the background image printed in a multi-gradational manner. That is, the user can record a subject such as the handwritten character 126 etc. in the free rendering area 100 by recognizing to which area of the user image the handwritten character 126 is allocated. Furthermore, since histograms of the R-color channel of the background image have been averaged in a highlight band, the user can surely recognize the spatial configuration of the user image from the light-colored background image. Furthermore, since the user image has been printed in the auxiliary image area 102 in a condition where its gradation properties have been left unchanged, the user can more surely recognize a positional relationship between the user image and the subject such as the handwritten character 126 etc. based on the background image printed in the free rendering area 100 and the user image printed in the auxiliary image area 102.

Further, since the background image has only a single hue (cyan), the user can record in the free rendering area 100 a subject in an arbitrary hue other than cyan. Further, since the background image has been light-colored, it is possible to record in the free rendering area 100 a subject by using a color whose brightness and color saturation are different from those of the background image even if it has the same hue as the background image. That is, it is possible for the multifunctional machine 1 to optically recognize an area of a subject recorded in the free rendering area 100 in an arbitrary hue different from that of the background image and also to optically recognize an area of a subject as far as it has been recorded in a color whose brightness and color saturation are different from those of the background image even if it has the same hue as it.

It is to be noted that the background image only needs to have been obtained by restricting a gamut of the user image and need not necessarily be of a single hue. If a maximum gamut of the background image has been determined beforehand, it is only necessary to guide the user to use writing implements having a color that falls outside the color gamut of the background image.

4. Composition of User Image and Handwritten Character

FIG. 61 is a flowchart showing a flow of processing for the multifunctional machine 1 to read an order sheet, composes a subject such as a handwritten character recorded on the order sheet and a user image, and print it. The processing shown in FIG. 61 starts when the multifunctional machine 1 is commanded to read an order sheet through a predetermined manipulation by use of the operation portion 68 in a condition where an order sheet on which the user has hand-written a character etc. is mounted on the original table 12 of the multifunctional machine 1.

At step S200, the multifunctional machine 1 reads the order sheet in two values. Specifically, an original mounted on the original table 12 is read by the scan unit 50, so that a read image of the original is stored in the RAM 60. The control portion 58 binarizes the original's image stored in the RAM 60 by using a predetermined threshold value (e.g., 128/256).

At step S202, the control portion 58 performs optical mark recognition (OMR) processing on the binarized original's image to thereby set print conditions in accordance with the filled check mark 94. In this case, positions of image components (background image, sample patch, checkmark, etc.) printed on the order sheet are located with reference to positions of the positional reference marks 90 and 98.

At step S204, the multifunctional machine 1 reads the sample patch 96 in full-color. Specifically, the area of the sample patch 96 of read by the scan unit 50 with respect to the positions of the positional reference marks 90 and 98 and the read image of the sample patch 96 is stored in the RAM 60.

At step S206, the control portion 58 generates a color gamut table of the background image based on the image of the sample patch 96. The color gamut table of the background image is a lookup table in which is stored a color gamut of the sample patch 96 that agrees with the color gamut of the background image.

FIG. 62 is a graph showing one example of data to be stored in the color gamut table of the background image. To accurately recognize an area of a background image in the free rendering area 100, the control portion 58 must completely store a color gamut of the sample patch that agrees with the color gamut of the background image. Therefore, modeling is necessary for the purpose of storing the color gamut of the sample patch in a capacity-limited RAM 60. Since the sample patch and the background image are of a single hue of cyan, in a read image of the sample patch, logically only the R-color channel has a gradation and the B-color and G-color channels have gradation properties of a fixed value (e.g., 256/256). However, actually, due to version division accuracy, a difference of device color between the scan unit 50 and the printer unit 86, etc., the B-color and G-color channels also encounter gradations. However, the gradations of the B-color and G-color channels are strongly correlated with those of the R-color channel and so tend to change only in a certain narrow width. Therefore, the control portion 58 can store color gamuts of the sample patch and the background image by using a small capacity by storing how the gradations of the B-color and G-color channels are distributed with respect to the gradations of the R-color channel. Specifically, the control portion 58 can store the color gamut of the sample patch by checking values of the R-color, G-color, and B-color channels of an image of the sample patch for each and detecting a maximum value and a minimum value of the G-color and B-color channels with respect to an arbitrary value of the R-color channel. This will be detailed along a flowchart.

FIG. 63 is a flowchart showing a flow of processing to generate a color gamut table of a background image.

The control portion 58 resets minimum values (Gmin, Bmin) and maximum values (Gmax, Bmax) of the G-color and B-color channels (step S300) and then repeats the following processing on all of pixels of an image of a sample patch (step S302). Specifically, the control portion 58 sets values of (Gmax, Bmax, Gmin, Bmin) that correspond to all the R-color channel values, to (0, 255, 0, 255).

At steps S304 and S306, the control portion 58 decides whether a value of the G-color channel of a target pixel is larger than the maximum value (Gmax) of the G-color channel stored as correlated with a value of the R-color channel of the target pixel and, if such is the case, updates the maximum value (Gmax) of the G-color channel correlated with the value of the R-color channel of the target pixel, to the value of the G-color channel of the target pixel.

At steps S312 and S314, the control portion 58 decides whether the G-color channel value of the target pixel is smaller than the minimum value (Gmin) of the G-color channel stored as correlated with the R-color channel value of the target pixel and, if such is the case, updates the minimum value (Gmin) of the G-color channel correlated with the R-color channel value of the target pixel to the G-color channel value of the target pixel.

At steps S308 and S310, the control portion 58 decides whether the B-color channel value of the target pixel is larger than the maximum value (Bmax) of the B-color channel stored as correlated with the R-color channel value of the target pixel and, if such is the case, updates the maximum value (Bmax) of the B-color channel correlated with the R-color channel value of the target pixel to the B-color channel value of the target pixel.

At steps S316 and S318, the control portion 58 decides whether the B-color channel value of the target pixel is smaller than the minimum value (Bmin) of the B-color channel stored as correlated with the R-color channel value of the target pixel and, if such is the case, updates the minimum value (Bmin) of the B-color channel correlated with the R-color channel value of the target pixel to the B-color channel value of the target pixel.

When the above processing is completed for all of the pixels, the maximum and minimum values of each of the B-color and G-color channels with respect to all the values of the R-color channel are stored and the color gamut of the sample patch 96 is completely stored. A data size of a color gamut table in which the maximum and minimum values of each of the B-color and G-color channels are stored as correlated with the R-color channel in such a manner is only 1K bytes (256×2×2 bytes) if a gradation value of each of the channels is of one byte. The above has described the processing to generate the color gamut table of the background image.

At step S208, the multifunctional machine 1 reads the free rendering area 100. Specifically, the free rendering area 100 in which a handwritten character etc. is written on a printed background is read by the scan unit 50 with reference to the positions of the positional reference marks 90 and 98 and an read image of the free rendering area 100 is stored in the RAM 60.

At step S210, the control portion 58 separates an area of a subject such as the handwritten character from the image of the free rendering area 100. Specifically, the control portion 58 adds a channel (alpha channel) that indicates a degree of transparency to the image of the free rendering area 100 and sets the area of the background to transparency.

FIG. 64 is a flowchart showing a flow of processing to separate an area of a subject.

The control portion 58 repeats the following processing on all of pixels of the free rendering area 100 (step S400).

At step S402, the control portion 58 decides whether B-color channel and G-color channel values of a target pixel are in a range of the B-color channel and G-color channel values stored in the color gamut table of the background image as correlated with the R-color channel value of the target pixel. That is, the control portion 58 decides whether a maximum value of the G-color channel stored as correlated with the R-color channel value of the target pixel is not less than the G-color channel value of the target pixel, a minimum value of the G-color channel stored as correlated with the R-color channel value of the target pixel is not larger than a value of the G-color channel of the target pixel, a maximum value of the B-color channel stored as correlated with the R-color channel value of the target value is not less than the B-color channel value of the target pixel, ad a minimum value of the B-color channel stored as correlated with the R-color channel of the target value is not larger than a value of the B-color channel of the target pixel.

If the B-color channel and G-color channel values of the target pixel are in ranges of respective the B-color channel and G-color channel values stored as correlated with the R-color channel value of the target pixel in the color gamut table of the background image, a color value of the target pixel falls in the color gamut of the background image, so that the control portion 58 sets the target pixel to a transparent pixel (step S404). That is, the alpha channel of the target pixel is set to a value indicative of transparency.

When the above processing is completed for all of the pixels of the free rendering area 100, an area of the subject such as a handwritten character is set to a read value and an area of the background image is set to transparency, to generate an image 142 of the subject such as a handwritten character from an image 140 of the free rendering area 100.

At step S212, the control portion 58 compositely superimposes the area of the subject on the user image. Specifically, the control portion 58 uses the alpha channel of the image 142 of the subject to thereby add up a color value of the image 142 and a color value of the user image 146 for each of the R-color, G-color, and B-color channels, thus forming a composite image 144.

At step S214, the multifunctional machine 1 prints the composite image 144 in which the area of the subject is superimposed on the user image. Specifically, the control portion 58 and the printer unit 86 perform the above-described processing shown in FIG. 57, to print the composite image 144. In this case, the printer unit 86 operates in the ordinary mode, to form a composite image on a sheet of paper by jetting large-sized, medium-sized, and small-sized ink drops.

When the above-described series of processing pieces are finished, the subject such as a handwritten character recorded on an order sheet is composed into the user image generated by a digital camera etc. and stored in the removable memory 20.

Sixteenth Embodiment

A background image may be such as to represent an edge component of a user image. Specifically, for example, a control portion 58 performs edge detection processing on a user image stored in a RAM 60 from a removable memory 20, to form a differential image of the user image. A differential image has, for each of its pixels, values obtained by binarilizing by using a predetermined threshold value a variation width of color values that is calculated between the adjacent pixels horizontally and vertically. Even if a background image representing an edge component of such a user image is printed by the multifunctional machine 1 in a free rendering area 100, a user can recognize a spatial configuration of the user image. Further, since an image representing an edge component is a binary image, it has an extremely narrow color gamut. Therefore, the user can record a subject such as a handwritten character in the free rendering area 100 by using a lot of colors.

Seventeenth Embodiment

FIG. 66 shows one example of an order sheet image related to the seventeenth embodiment of the present invention.

A rectangular frame 104 is a mark that indicates an outer edge of the free rendering area 100. To the rectangular frame 104, a color in a color gamut of a background image is set. Cross marks 106, 108, 110, and 112 are used to permit the control portion 58 to recognize a read area. The cross marks 106, 108, 110, and 112 are placed near the free rendering area 100. Positions of the cross marks 106, 108, 110, and 112 are set so that an intersection point of a line interconnecting a center of the cross mark 106 and a center of the cross mark 110 and a line interconnecting a center of the cross mark 112 and a center of the cross mark 108 may agree with an intersection point of diagonal lines of an outer edge of the rectangular free rendering area 100.

FIG. 67 shows one example of an order sheet image to which a background image is laid out.

FIG. 68 is a pan view showing one example of an order sheet in which a spurted line 114 and a spurted character 116 (Hi!) after being printed by the above-described processing are entered. The free rendering area 100 has background images printed in it. An auxiliary image area 102 has user images printed in it in a condition where their gradation properties are left unchanged. The user can arbitrarily record a handwritten character on a background image printed in the free rendering area 100. A magazine scrap or a seal may be pasted in the free rendering area 100, to record a subject to be composed with a user image. Further, the user can set desired print conditions by filling an arbitrary checkmark 94.

Since the user image, which is an original image of a background image, and the spurted line 114 and the spurted character 116 are composed with each other by using the free rendering area as a reference of a layout position, the user can record in the free rendering area 100 the spurted line 114 and the spurted character 116 by recognizing a spatial configuration of the user image based on a spatial configuration of the background image printed in a multi-gradational manner. That is, the user can record the spurted line 114 and the spurted character 116 in the free rendering area 100 by recognizing in which area of the user image the spurted line 114 and the spurted character 116 are laid out. Furthermore, since a histogram of the R-color channel of the background image has been averaged in a highlight band, the user can surely recognize the spatial configuration of a user image from a light background image irrespective of gradation properties of the user image. Moreover, since the user image has been printed in the auxiliary image area 102 in a condition where its gradation properties are left unchanged, the user can more surely recognize a positional relationship between the user image and the subject such as a handwritten character 126 based on the background image printed in the free rendering area 100 and the user image printed in the auxiliary image area 102.

FIG. 69 is a flowchart showing a flow of processing to compose a subject such as the spurted line 114 or the spurted character 116 recorded on an order sheet and the user image and print it. The processing shown in FIG. 62 is started when a multifunctional machine 1 is commanded to read an order sheet on which the spurted line 114, the spurted character 116, etc. have been written through a predetermined manipulation by use of an operation portion 68 in a condition where the order sheet is mounted on an original table 12.

At step S202, the control portion 58 performs optical mark recognition (OMR) processing on an image of a binarized original to thereby set print conditions in accordance with the filled check mark 94. In this case, a position of an image component (sample patch, check mark, cross mark, etc.) printed on an order sheet is located at a relatively low accuracy by using positions of positional reference marks 90 and 98 as a reference, and a read area to read the free rendering area 100 is located at a high accuracy based on locations of the cross marks 106, 108, 110, and 112.

Processing to locate the read area to read the free rendering area 100 is specifically described with reference to FIG. 68. First, the control portion 58 analyzes an end area of an image of a binarized original to detect outer edges of the positional reference marks 90 and 98. Next, the control portion 58 locates an inclination of an order sheet by using the detected outer edges of the positional reference marks 90 and 98 as a reference and locates a suspected area where the located cross marks 106, 108, 110, and 112 are present. It analyzes the suspected area where the located cross marks 106, 108, 110, and 112 are present to thereby detect edges of the cross marks 106, 108, 110, and 112, thus locating their center positions. Next, the control portion 58 obtains an intersection point 118 of a line interconnecting the center of the cross mark 106 and that of the cross mark 110 and a line interconnecting the center of the cross mark 112 and that of the cross mark 108, to locate an area that has a width and a height determined beforehand by using the intersection point 118, as an area to read the free rendering area 100 and the sample patch 96. In this case, a size and an inclination of the area to read the predetermined free rendering area 100 and the sample patch 96 may be corrected based on the positions of the positional reference marks 90 and 98 or the cross marks 106, 108, 110, and 112. By locating the area to read the free rendering area 100 with respect to the cross marks 106, 108, 110, and 112 printed in the vicinity of the free rendering area 100, the free rendering area 100 can be read accurately.

At step S204, the multifunctional machine 1 reads the sample patch 96 in full-color. Specifically, the area located as described above is read by the scan unit 50, and a read image of the sample patch 96 is stored in the RAM 60.

At step S208, the multifunctional machine 1 reads the free rendering area 100. Specifically, an area 120 (see FIG. 61) located by the above-described processing is read by the san unit 50 with respect to the free rendering area 100 located at step S202, and read image of the area 120 including the read free rendering area 100 and its surroundings is stored in the RAM 60. The read area 120 is set wider than the free rendering area 100 by a predetermined width both horizontally and vertically.

FIG. 70 is a schematic diagram showing a group of images created through a series of processing pieces up to formation of a composite image from a user image. A number 204 indicates a background image formed from a user image 202 through subtractive color processing. A number 206 indicates an order sheet as a result of printing on a sheet of paper an image obtained by composing a template image 200 and the background image 204. A number 208 indicates an order sheet in which a spurted line and a spurted character are entered. An image 210 of the area 120 which includes the free rendering area 100 and its surroundings is configured by three color channels for R, G, and B referred to as 210R, 210B, and 210G. The image 210 into which the free rendering area 100 and its surroundings are read encounters the spurted line 114 and the spurted character 116. Further, since the image 210 is wider than the free rendering area 100, the image 210 encounters a rectangular frame 104 that indicates an outer edge of the free rendering area 100.

At step S210, the control portion 58 forms a composite image based on the user image and an image of the area 120 that includes the free rendering area 100 and its surroundings.

FIG. 71 is a flowchart showing a flow of processing to form a composite image.

At step S500, the control portion 58 creates an α-channel 216α that makes transparent an outer area of a closed curve about the image 210 of the area 120 that includes the free rendering area 100 and its surroundings (in FIG. 49, the α-channel 216α is shown by representing a transparent-value pixel with white and an opaque-value pixel with black). Specifically, the control portion 58 decides whether B-color channel and G-color channel values of a target pixel are in a range of B-color channel and G-color channel values stored as correlated with an R-color channel value of the target pixel in a color gamut table of a background image, to recognize an area of the target pixel in the range as an area of the background image and an area of the target pixel outside the range as an area of a user's handwriting, thereby detecting a closed curve not included in any other closed curves. The control portion 58 locates an outer area of a closed curve by using a boundary of the thus detected closed curve, to create such an α-channel that an outer area of the closed curve may be of a transparent value and the closed curve and its inner area are of an opaque value. By detecting a closed curve by scanning the image of the area 120 from an outside of the free rendering area 100, it is possible to detect a closed curve not included in any other closed curves, that is, the spurted line 114 irrespective of a size of an area enclosed by the closed curve and a configuration of the handwriting in the closed curve. It is to be noted that a color of the rectangular frame 104 that indicates an outer edge of the free rendering area 100 is in a color gamut of the background image, so that the rectangular frame 104 is not detected as a closed curve when the image of the area 120 is scanned from the outside of the free rendering area 100 for detecting closed curves.

At step S502, the control portion 58 fills with a specific color such as white a background image area etc. in a closed curve of the image 210 of the area 120 that includes the free rendering area 100 and its surroundings. Specifically, it decides whether B-color channel and G-color channel values of a target pixel are in a range of B-color channel and G-color channel values stored as correlated with an R-color channel value of the target pixel in a color gamut table of the background image, to recognize a target pixel outside the range as the spurted character 116, thereby changing a color of the target pixel in the range to white (R=255, G=255, B=255). As a result of such processing, a spurted image 216 is formed from the image 210 of the area 120 that includes the free rendering area 100 and its surroundings. The spurted image 216 is configured by a total of four channels of the α-channel 216α and three channels for R, G, and B of 216R, 216G, and 216B.

At step S504, the control portion 58 composes the user image 202 and the spurted image 216. Specifically, the control portion 58 adds up the user image 202 and the image 210 of the area 120 that includes the free rendering area 100 and its surroundings for each of R-color, G-color, and B-color channels by using the α-channel 216α, thereby composing a composite image 218. In this case, in an area that corresponds to the spurted line 114, an opaque value is set to the α-channel 216α, so that by setting values of channels 216R, 216G, and 216B of the spurted image, a value is set which is obtained by scanning the spurted line 114 with the scan unit 50. That is, in an area that corresponds to the spurted line 114, the spurted line 114 is drawn. Further, in an area (an inner area of a closed curve) that corresponds to the spurted character 116 also, an opaque value is set to the α-channel 216α, so that by setting values of channels 216R, 216G, and 216B of the spurted image, a value is set which is obtained by scanning the spurted character 116 with the scan unit 50. That is, in an area that corresponds to the spurted character 116, the spurted character 116 is drawn. In an area (area outside handwriting within a closed curve) not of the spurted character 116 inside the spurted line 114, an opaque value is set to the α-channel 216α and a value that corresponds to white is set to the 216R, 216G, and 216B channels of the spurted image, so that by setting values of the 216R, 216G, and 216B channels of the spurted image, a value of white is set. That is, a white color is drawn in an area not of the spurted character 116 inside the spurted line 114. Further, in an outside area (outside a closed curve) of the spurted line 114, an opaque value is set to the α-channel 216α, so that by setting a value of the user image 202, the user image 202 is drawn.

FIG. 72 is a schematic diagram showing a correspondence relationship between the above-described images. By setting beforehand a layout of the background image 204 to print an order sheet and a layout of the area 120 to read the free rendering area 100 and the user image 202 and the spurted image 216 to form a composite image 218 with respect to the predetermined free rendering area 100, a positional correspondence relationship between the images shown in FIG. 72 can be set. Specifically, these settings are made by setting coordinates of a layout frame, setting an expansion/reduction ratio of the image, and setting coordinates of the read area.

The above has described formation of a composite image.

At step S214 (see FIG. 69), the multifunctional machine 1 prints the composite image 218. Specifically, the control portion 58 and the printer unit 86 perform the above-described processing shown in FIG. 57, to print the composite image 218. In this case, the printer unit 86 operates in the ordinary mode to jet large-sized, medium-sized, and small-sized ink drops, thereby forming an image on a sheet of paper. A layout of the composite image 218 with respect to the sheet of paper is arbitrary; for example, a plurality of composite images 218 may be laid out on one sheet of paper 222 as shown in FIG. 73. Such a layout can be realized by storing beforehand in the ROM 62 a template 220 in which a plurality of layout frames 224 corresponding to the one sheet of paper 222 is defined. Further, by defining a broken-line image and a layout in the template 220 beforehand, a cutoff line 226 can be printed for creating a plurality of cards by using the one sheet of paper 222.

When the above-described series of processing are finished, the spurted line 114 and the spurted character 116 entered in the order sheet are overwritten on a subject photographed with a digital camera etc., and a printed material on which an area not of the spurted character 116 inside the spurted line 114 is filled with white is created by the multifunctional machine 1.

BRIEF DESCRIPTION OF THE DRAWINGS

FIG. 7A is a schematic diagram showing a composition template according to the first example of the invention; and FIG. 7B is a schematic diagram showing a composite result;

FIG. 18 is a schematic diagram showing a composition template according to the fifth example of the invention;

FIG. 36 is a schematic diagram each showing overlap compositing processing according to the ninth example of the invention;

FIG. 48 is a table that lists a plurality of embodiments of the present invention;

Figure 1:
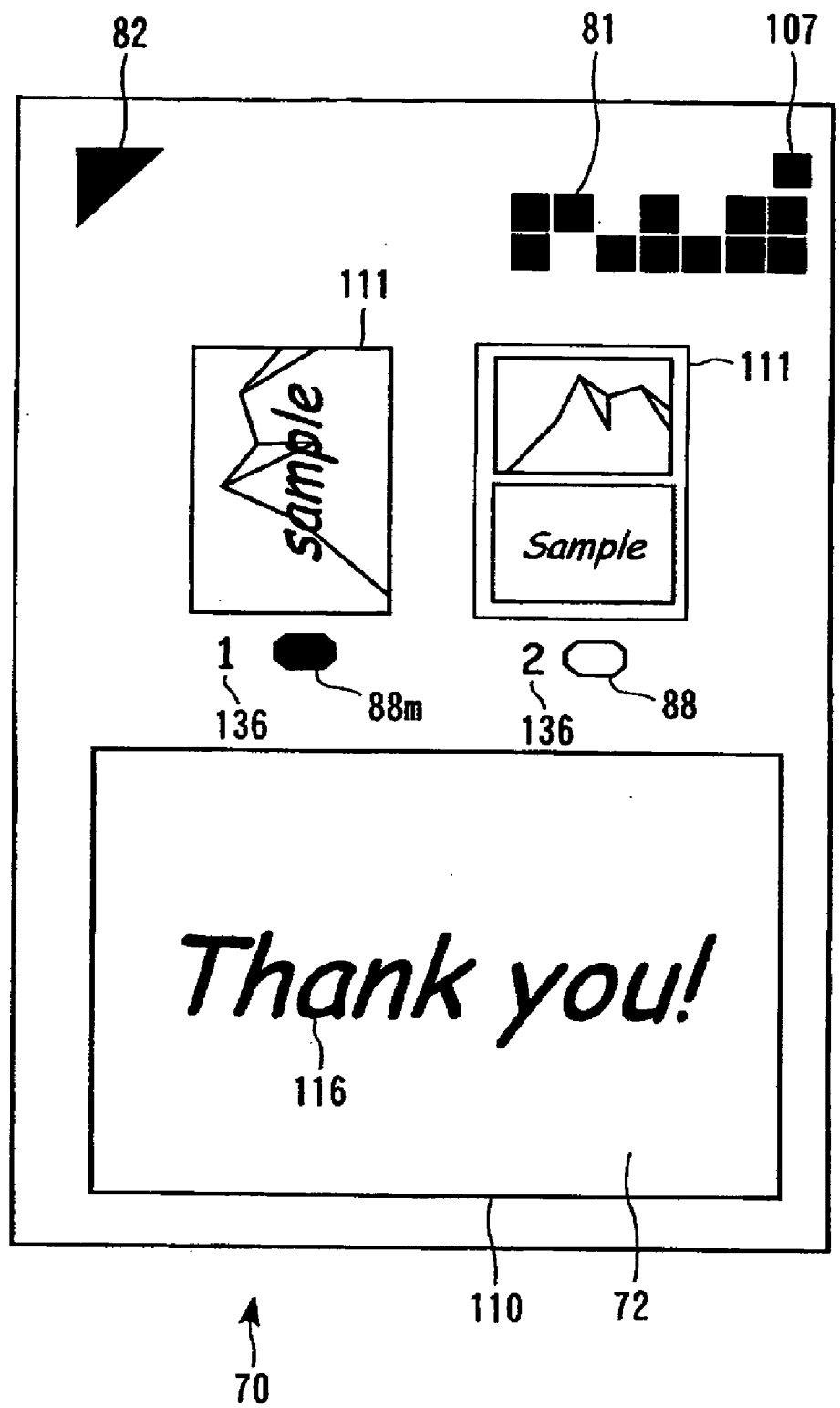
FIG. 1 is a schematic diagram showing an order sheet according to a seventh example of the invention.
Figure 2:
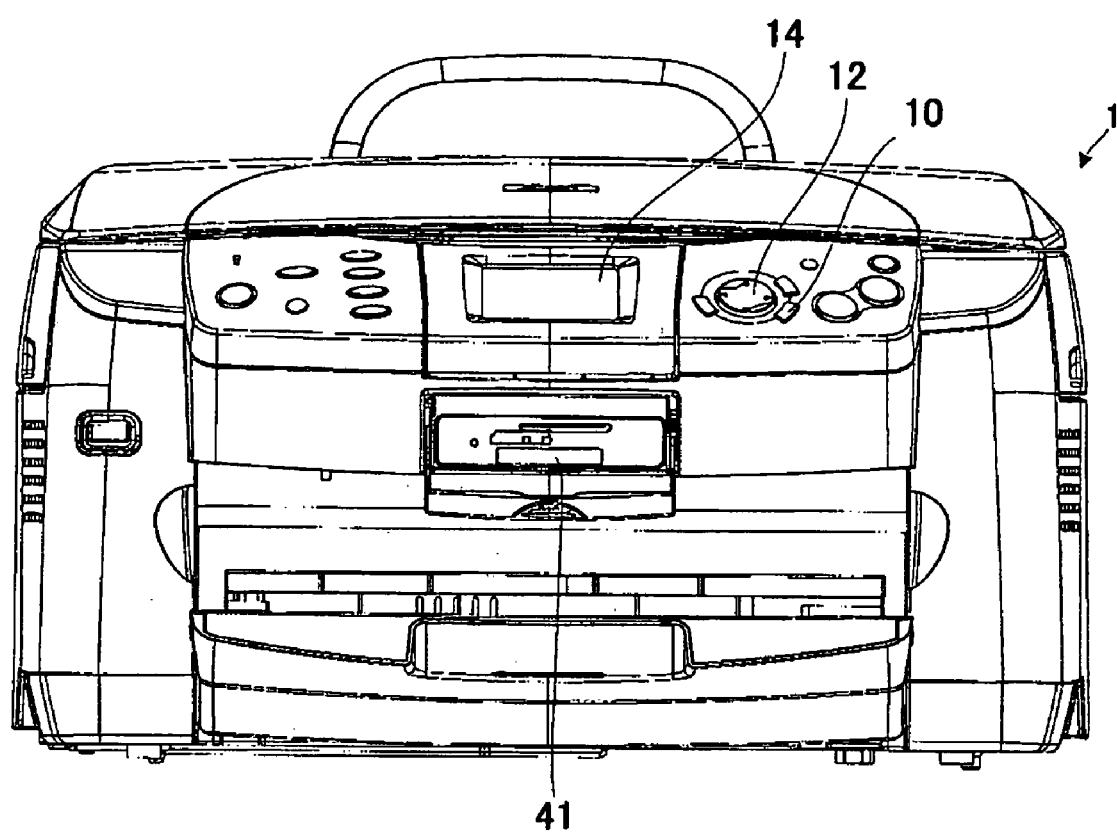
FIG. 2 is a front view of a multifunction machine according to a first example of the invention.
Figure 3:
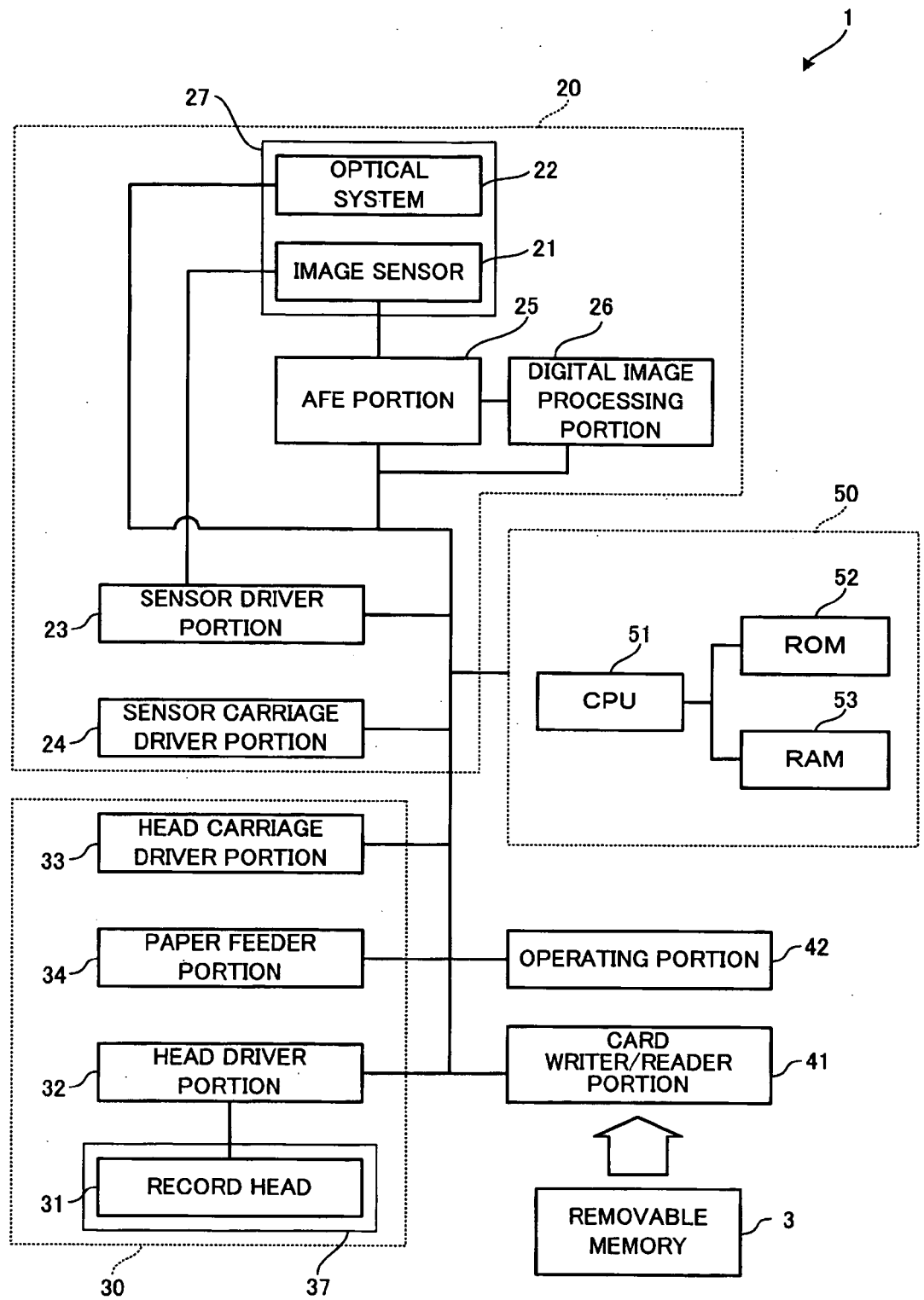
FIG. 3 is a block diagram of the multifunction machine according to the first example of the invention.
Figure 4:
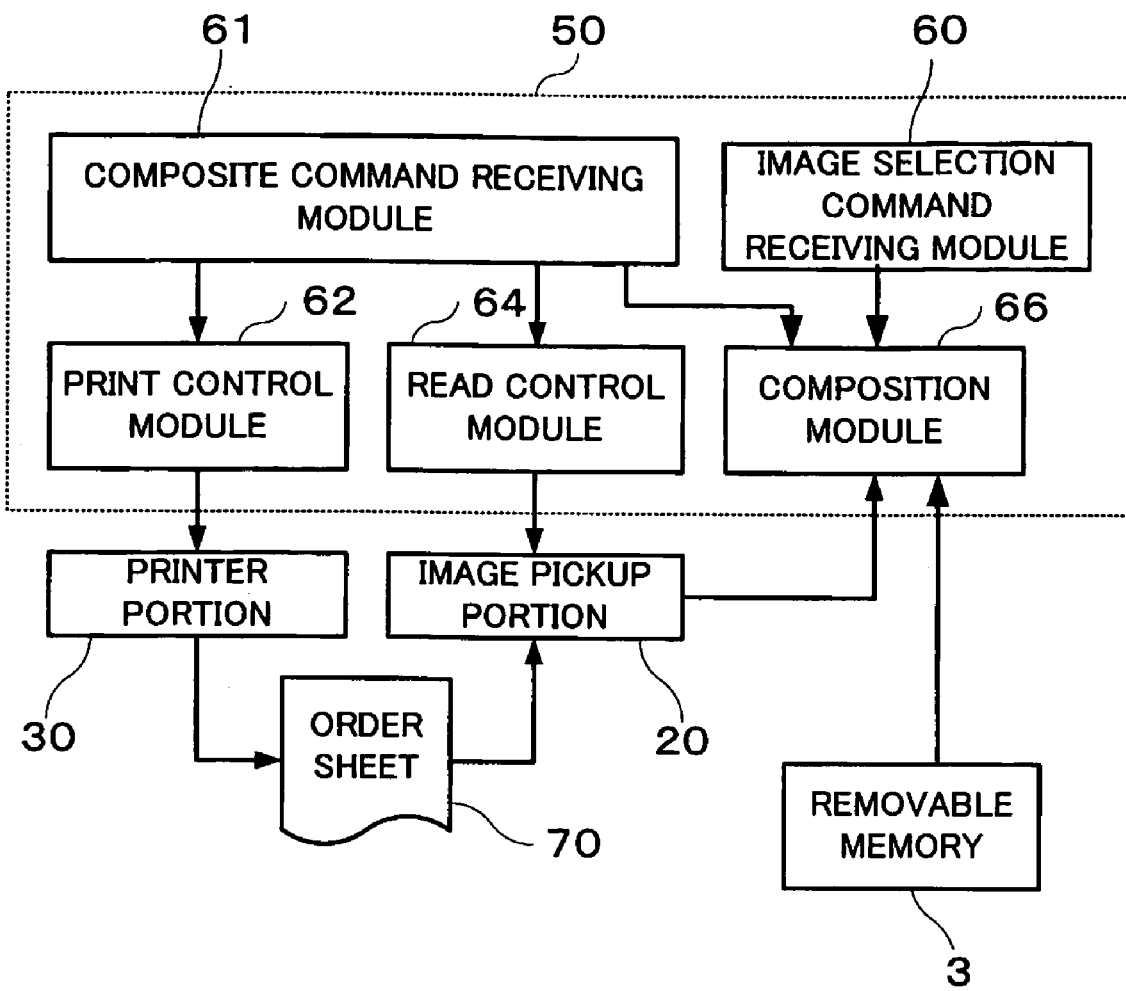
FIG. 4 is a functional block diagram of the multifunction according to the first example of the invention.
Figure 5:
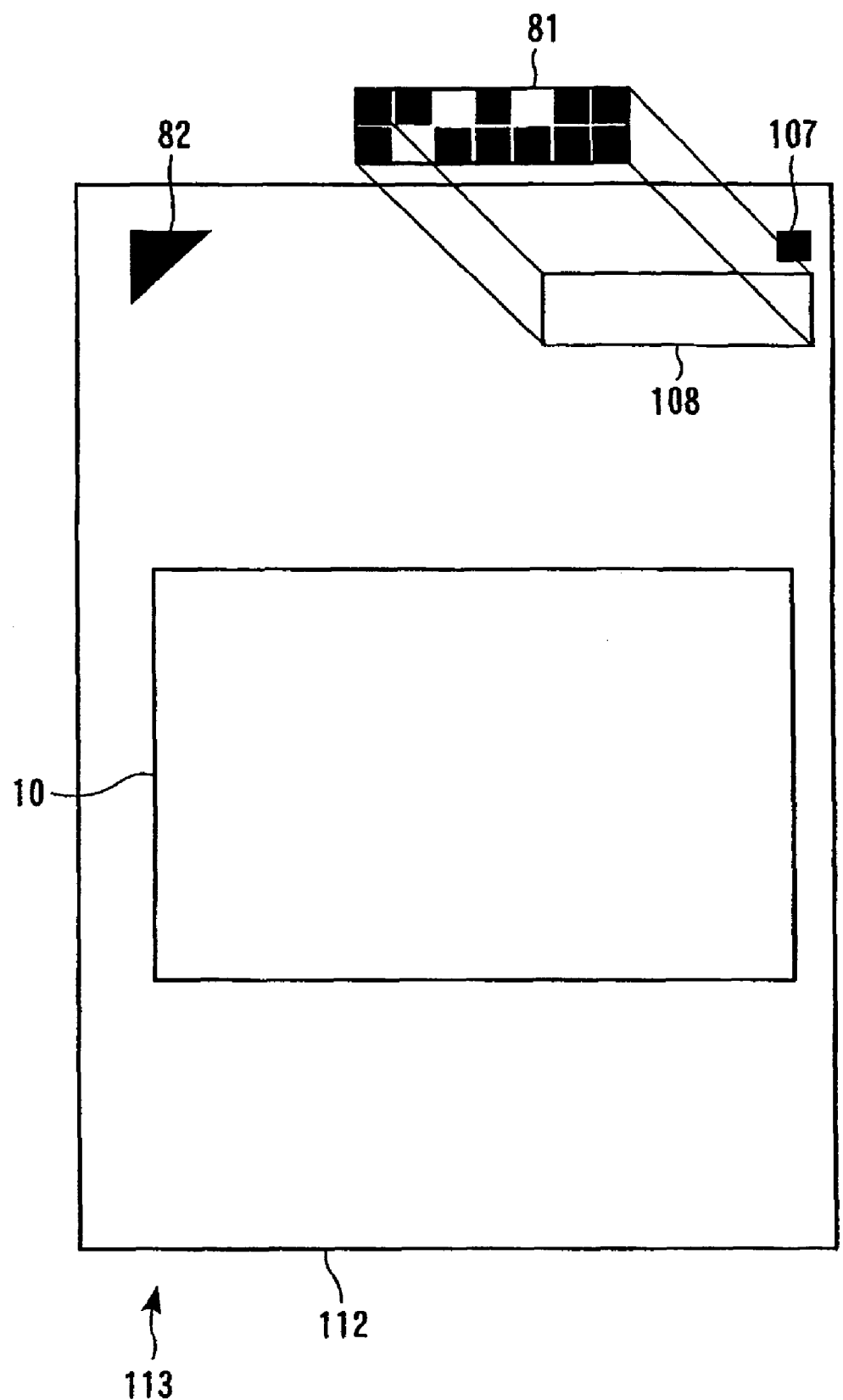
FIG. 5 is a schematic diagram showing an order-sheet template according to the first example of the invention.
Figure 6:
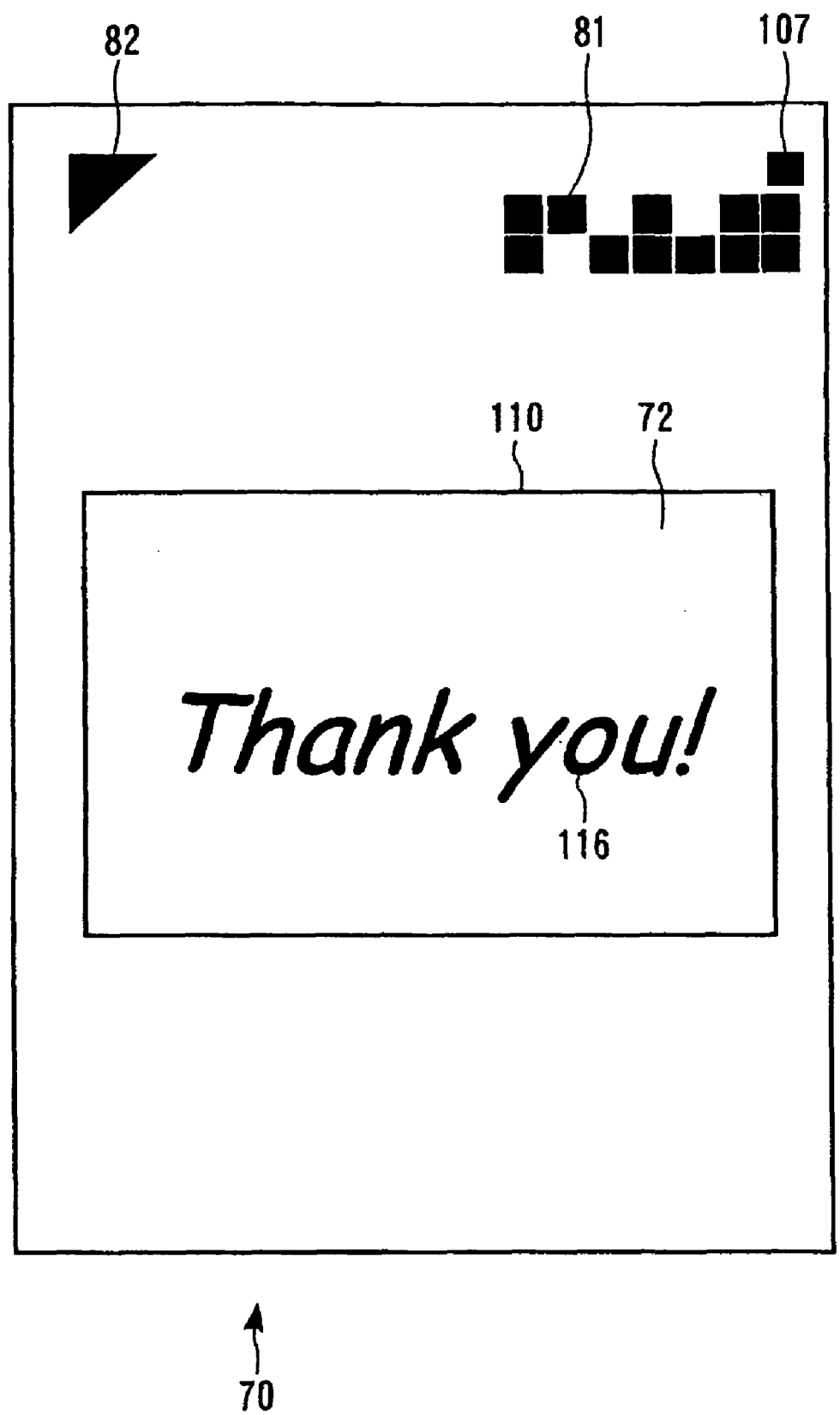
FIG. 6 is a schematic diagram showing an order sheet according to the first example of the invention.
Figure 8:
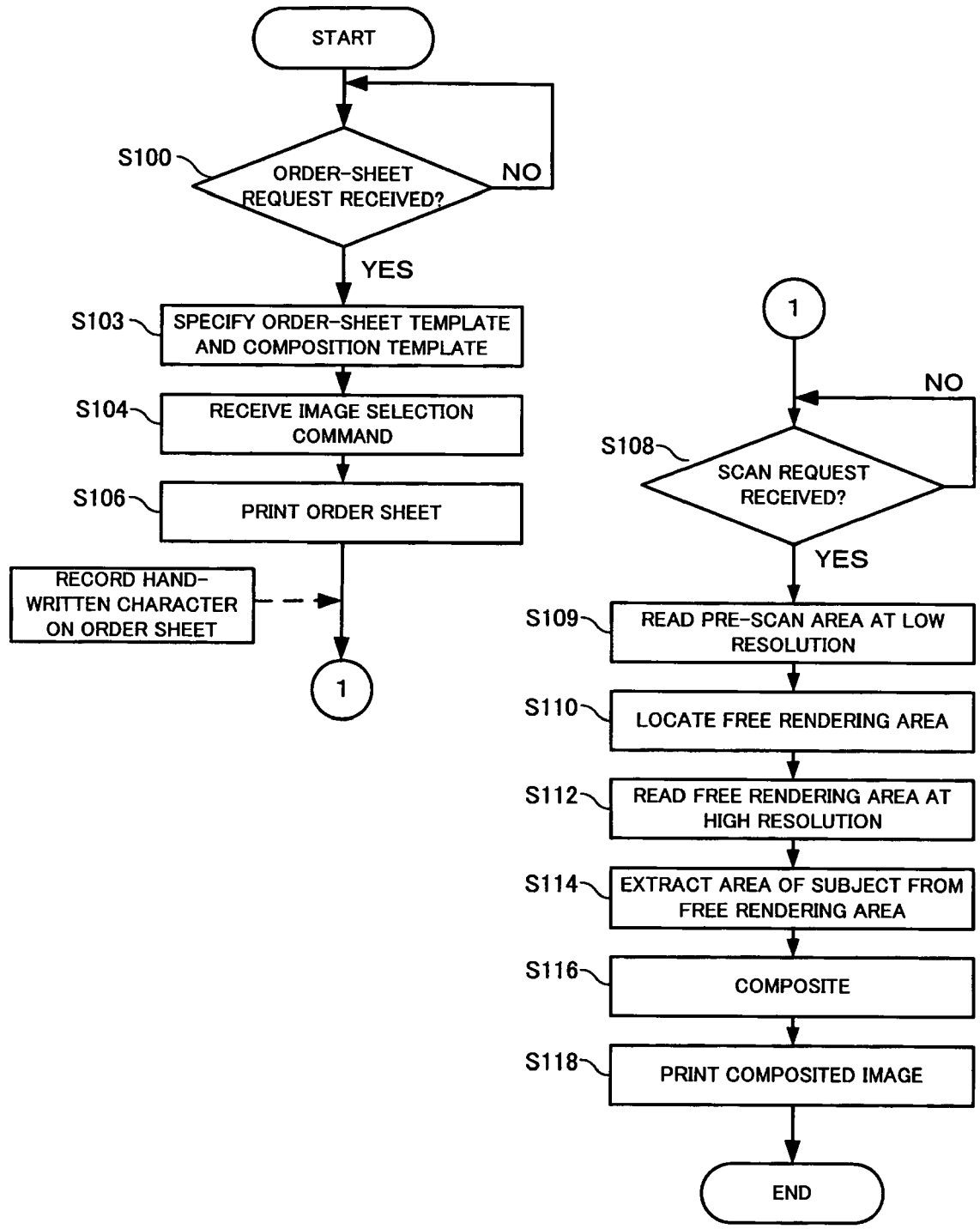
FIG. 8 is a flowchart according to the first example of the invention.
Figure 9:
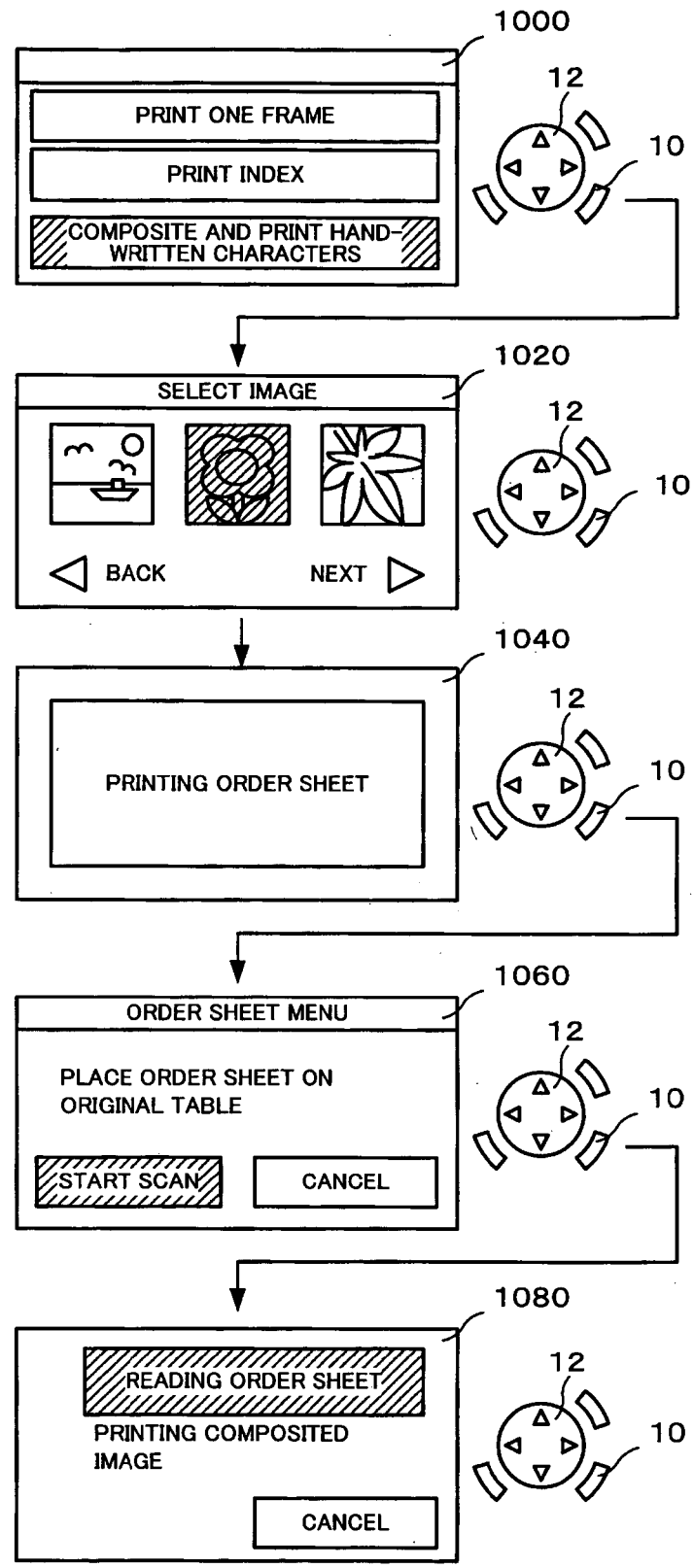
FIG. 9 is a schematic diagram showing a screen transition according to the first example of the invention.
Figure 10:
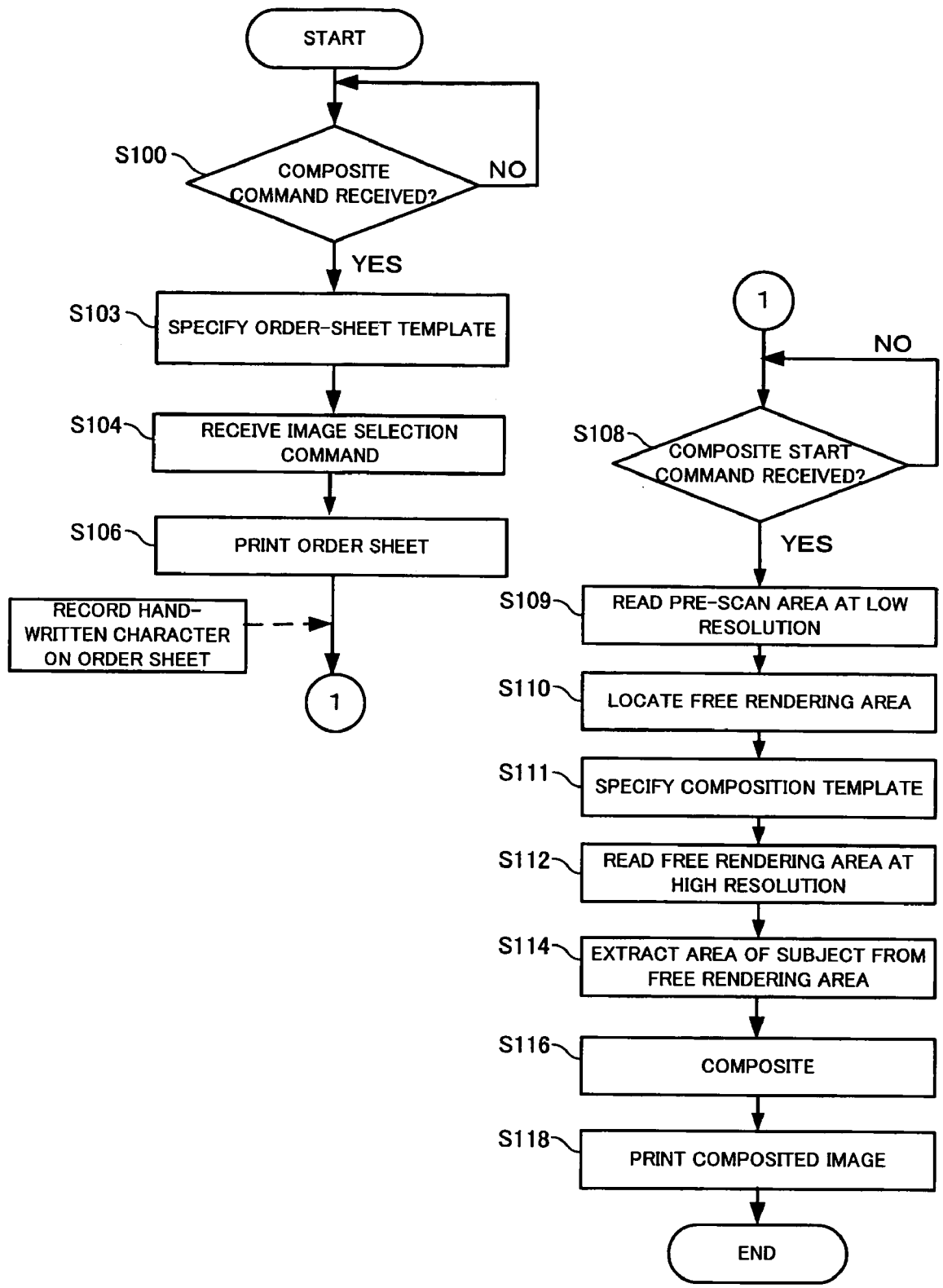
FIG. 10 is a flowchart according to a second example of the invention.
Figure 11:
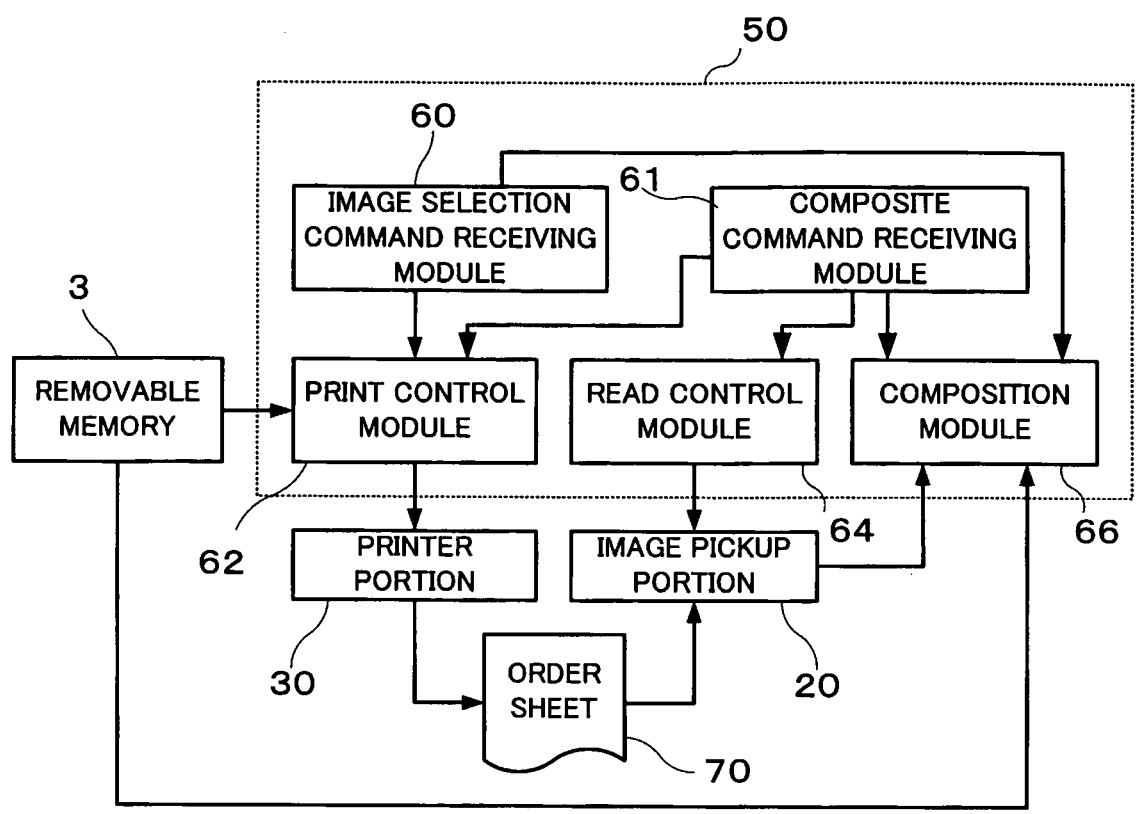
FIG. 11 is a functional block diagram according to the second example of the invention.
Figure 12:
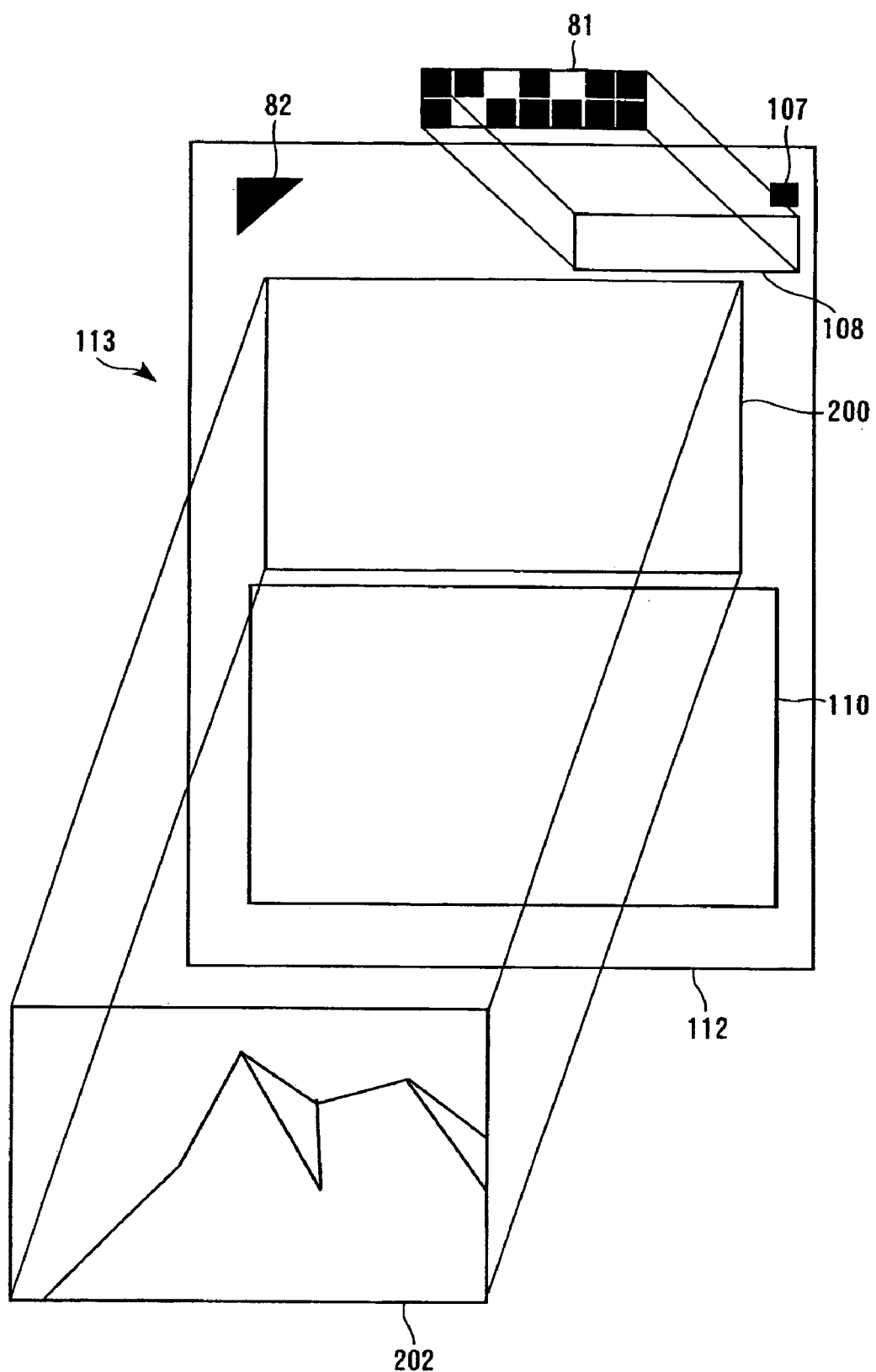
FIG. 12 is a schematic diagram showing an order-sheet template according to a third example of the invention.
Figure 13:
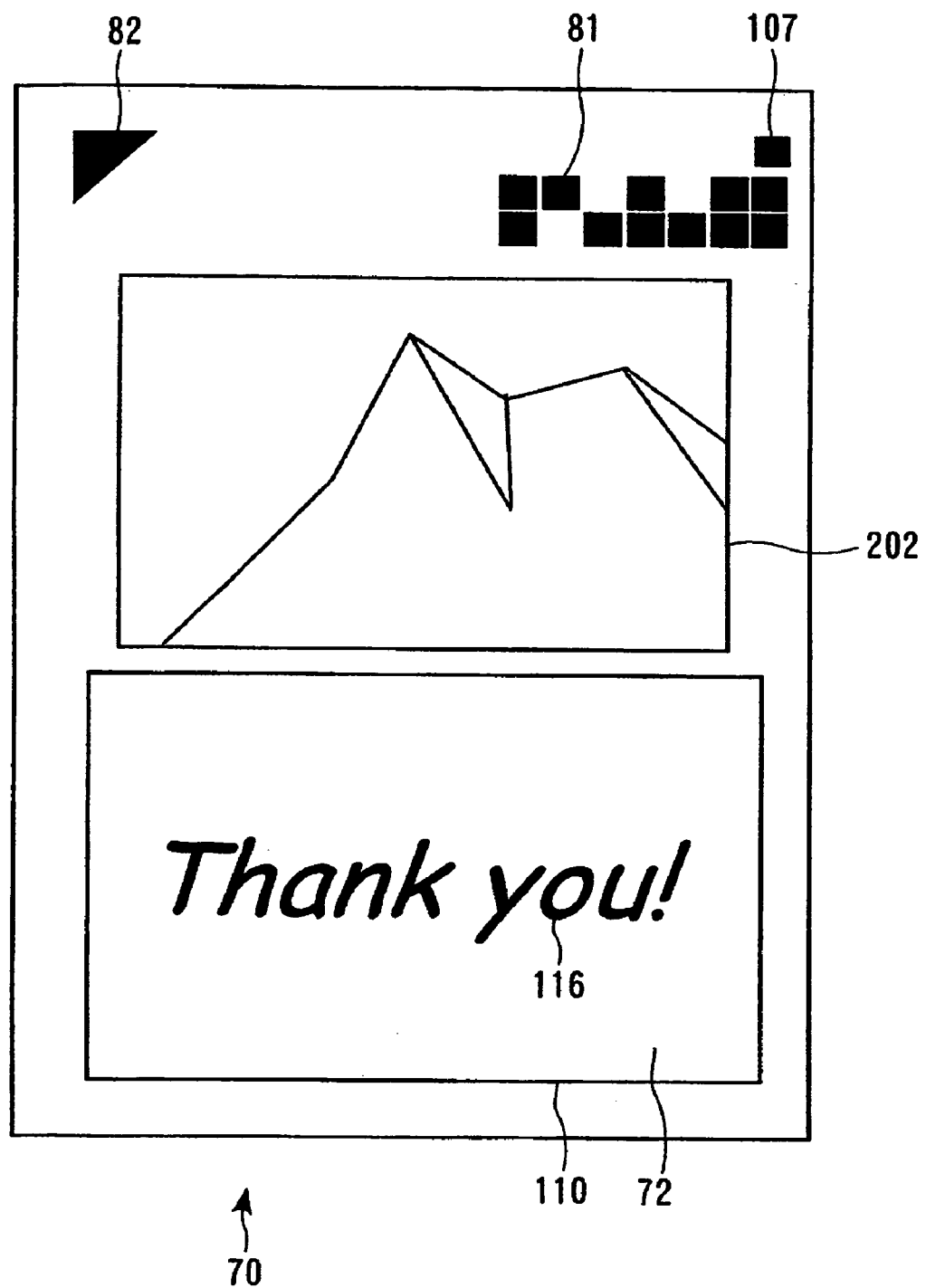
FIG. 13 is a schematic diagram showing an order sheet according to the third example of the invention.
Figure 14:
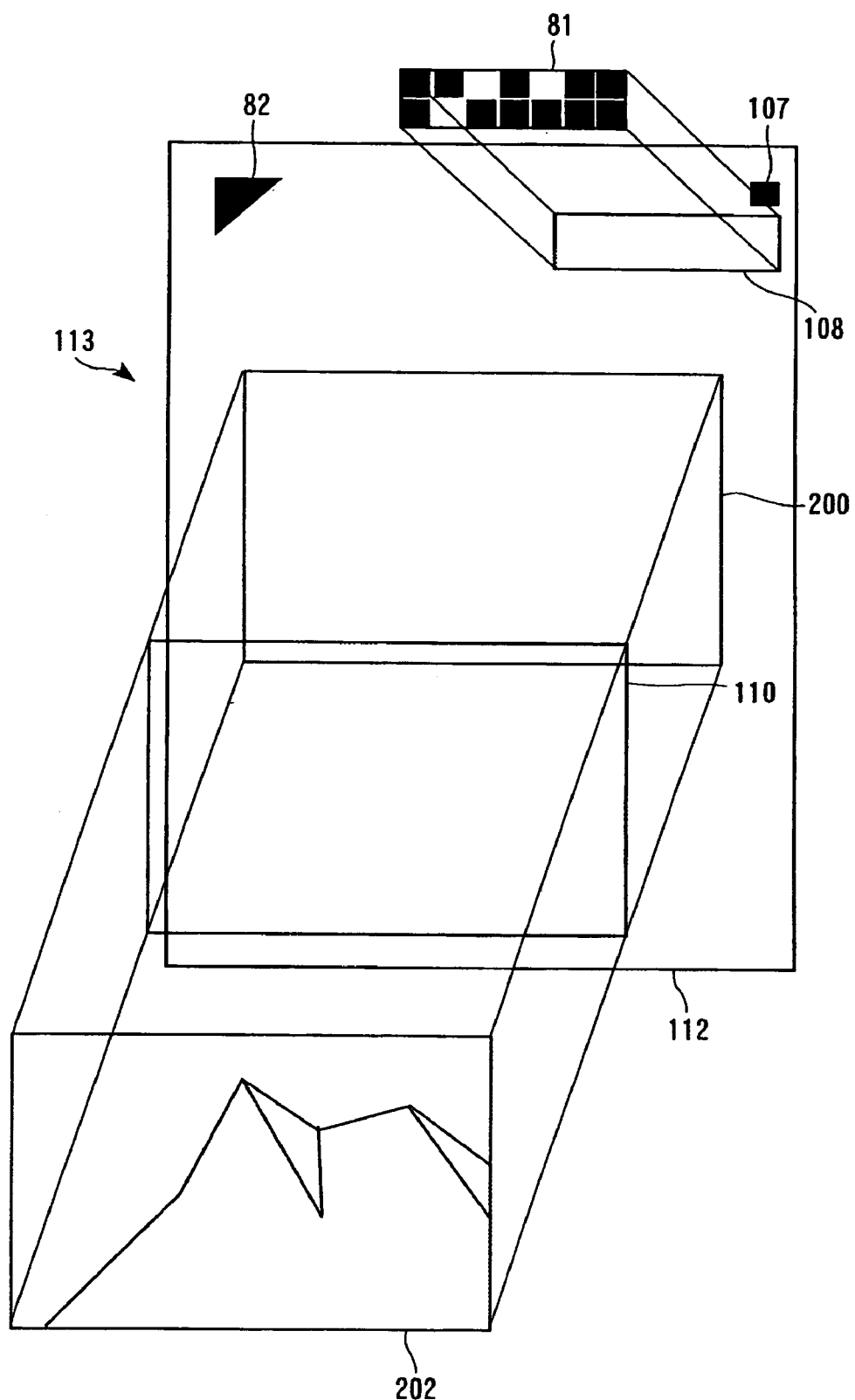
FIG. 14 is a schematic diagram showing an order sheet according to a fourth example of the invention.
Figure 15:
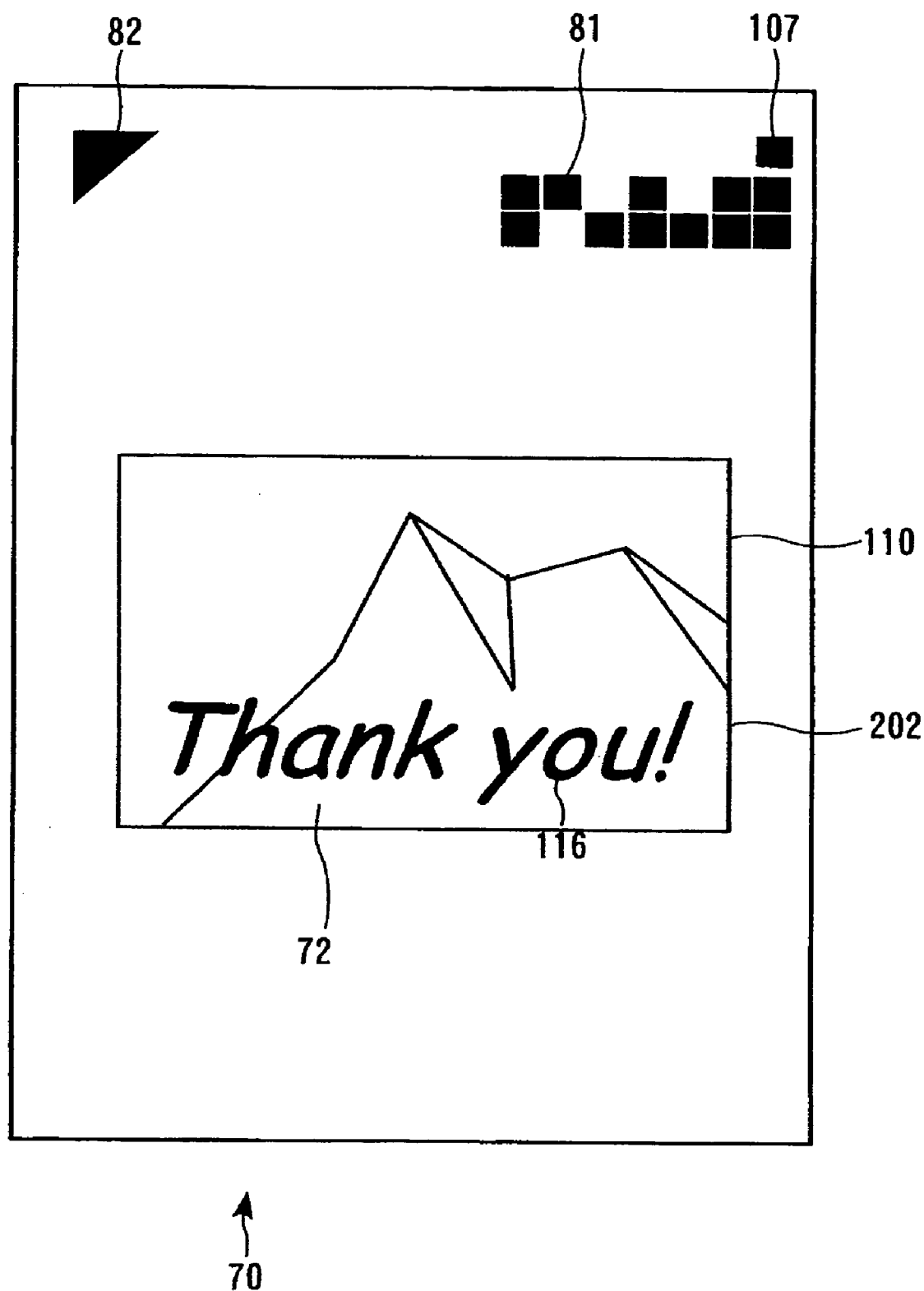
FIG. 15 is a schematic diagram showing an order-sheet template according to the fourth example of the invention.
Figure 16:
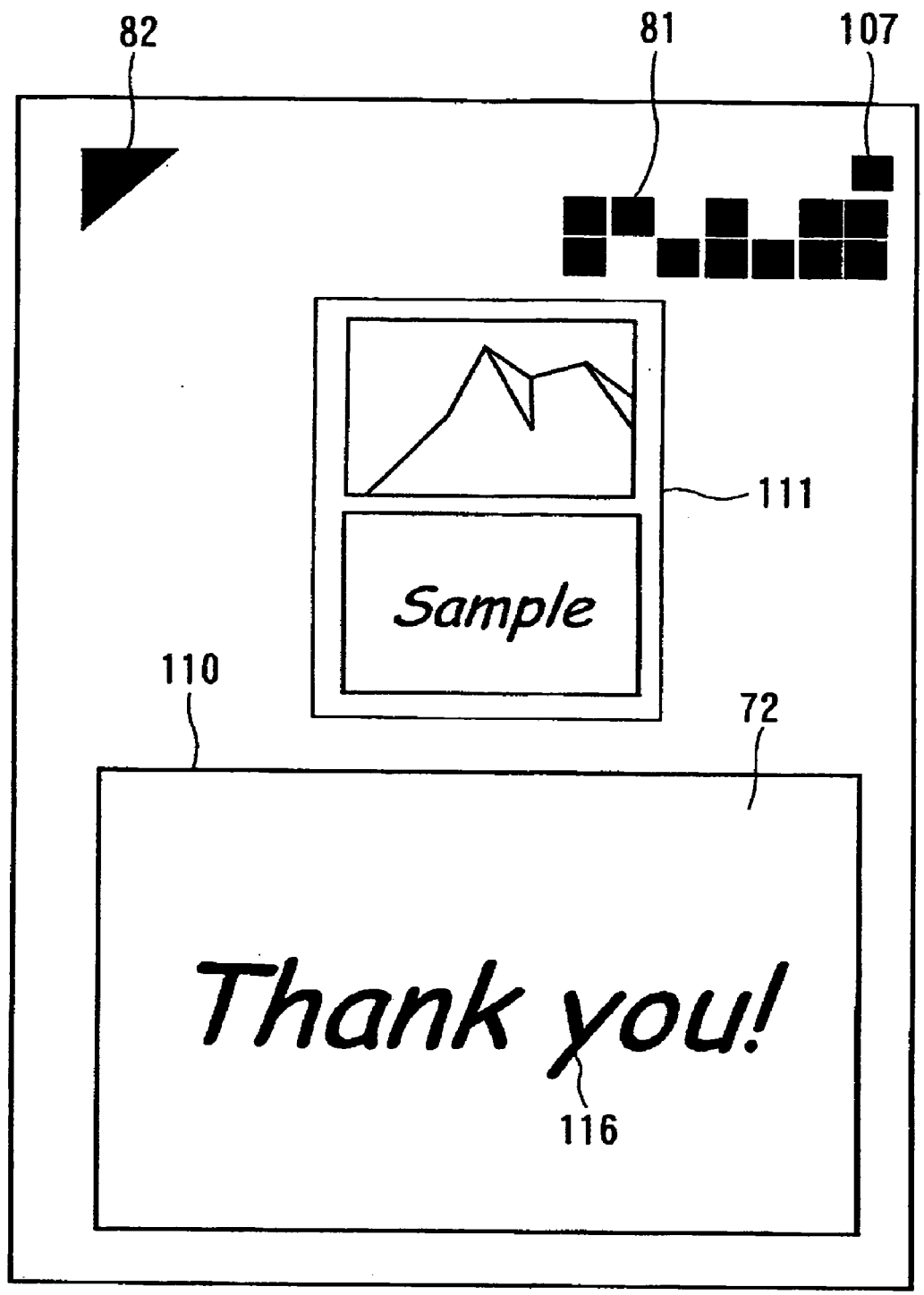
FIG. 16 is a schematic diagram showing an order sheet according to a fifth example of the invention.
Figure 17:
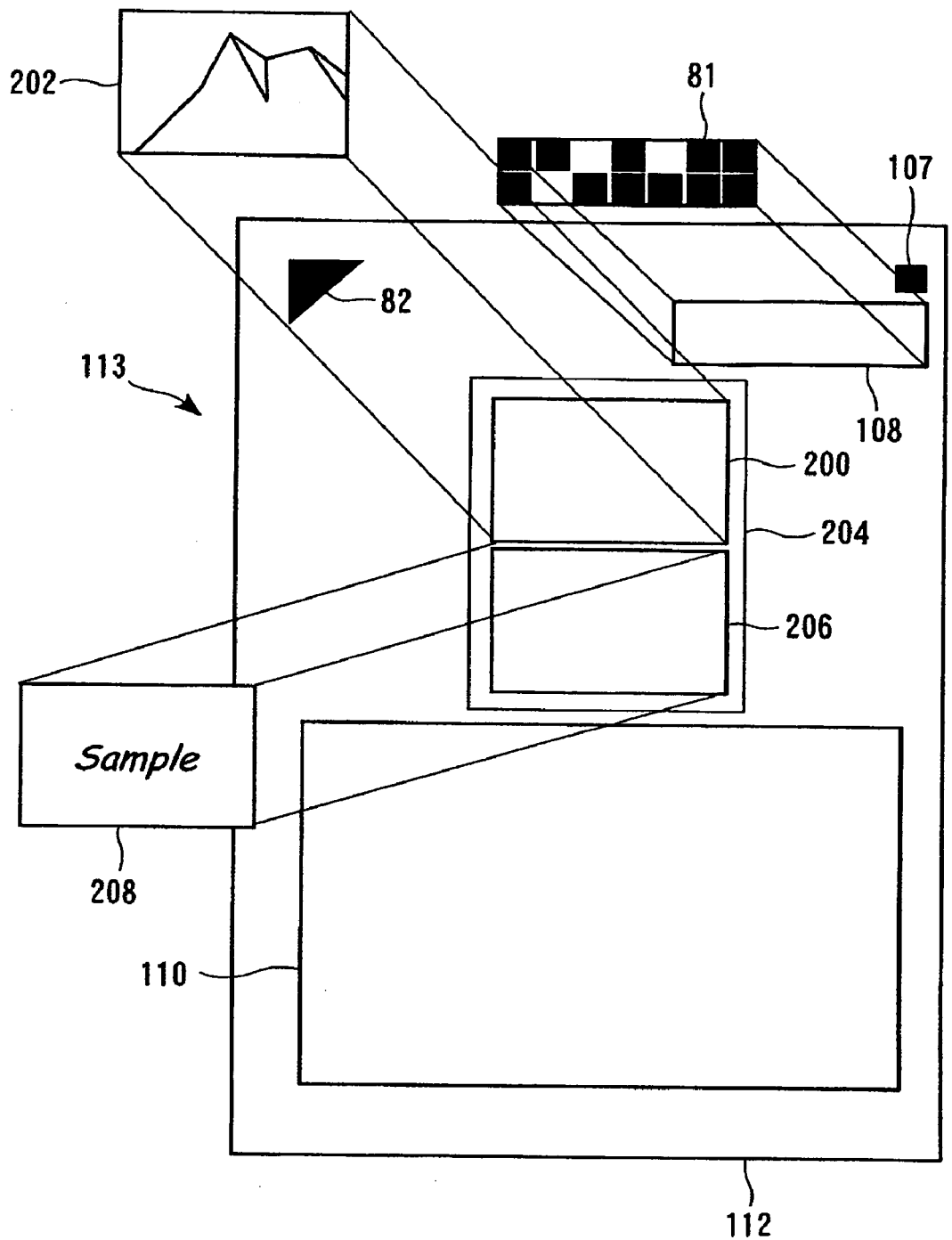
FIG. 17 is a schematic diagram showing an order-sheet template according to the fifth example of the invention.
Figure 19:
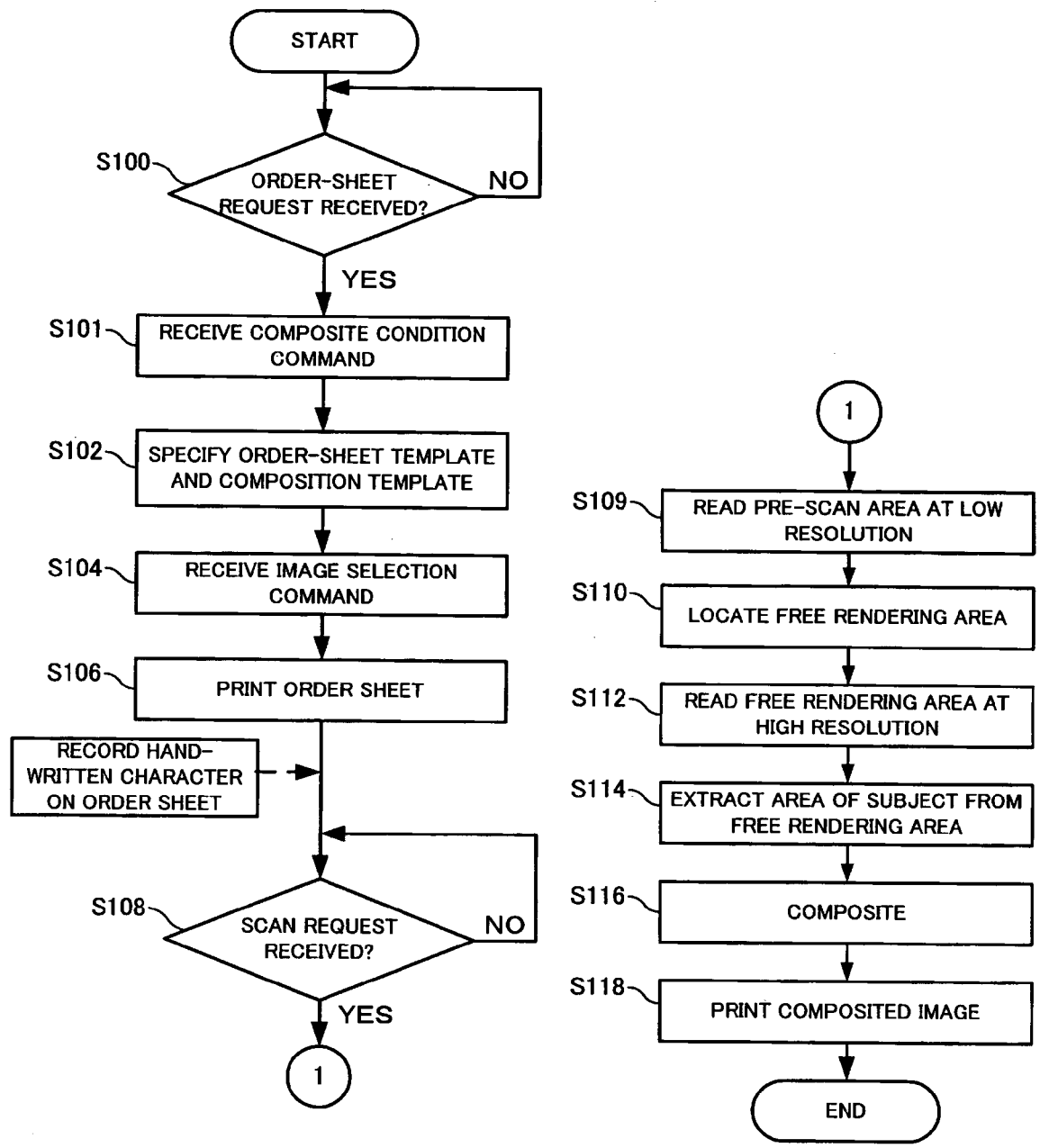
FIG. 19 is a flowchart according to the fifth example of the invention.
Figure 20:
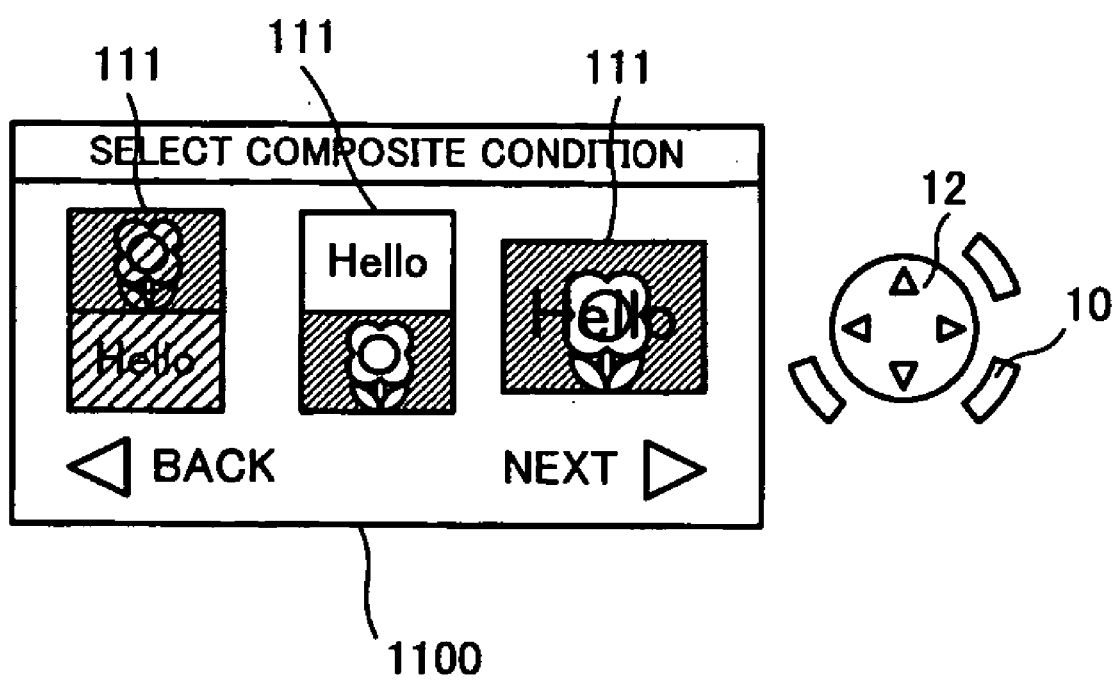
FIG. 20 is a schematic diagram showing a screen transition according to the fifth example of the invention.
Figure 21:
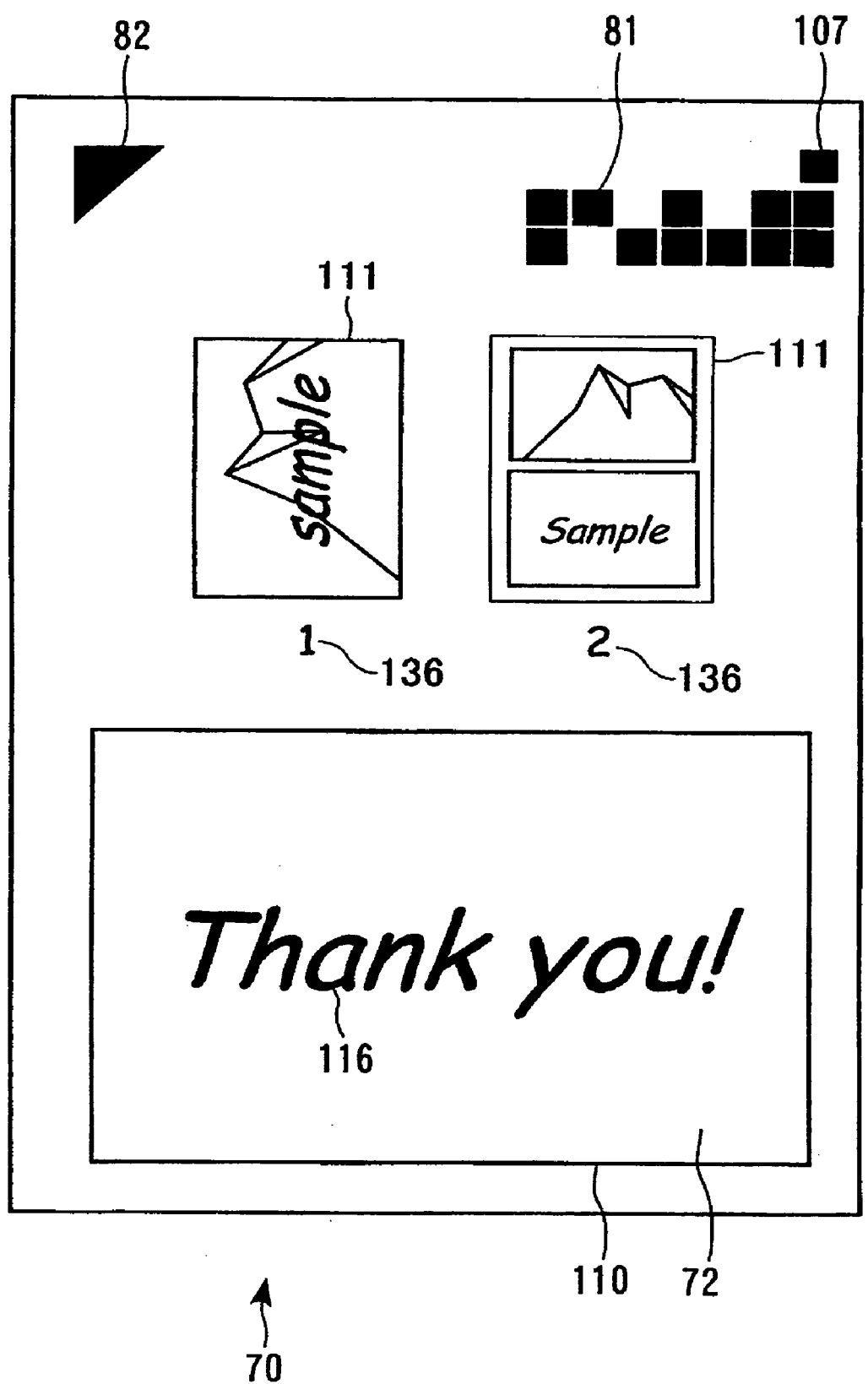
FIG. 21 is a schematic diagram showing an order sheet according to a sixth example of the invention.
Figure 22:
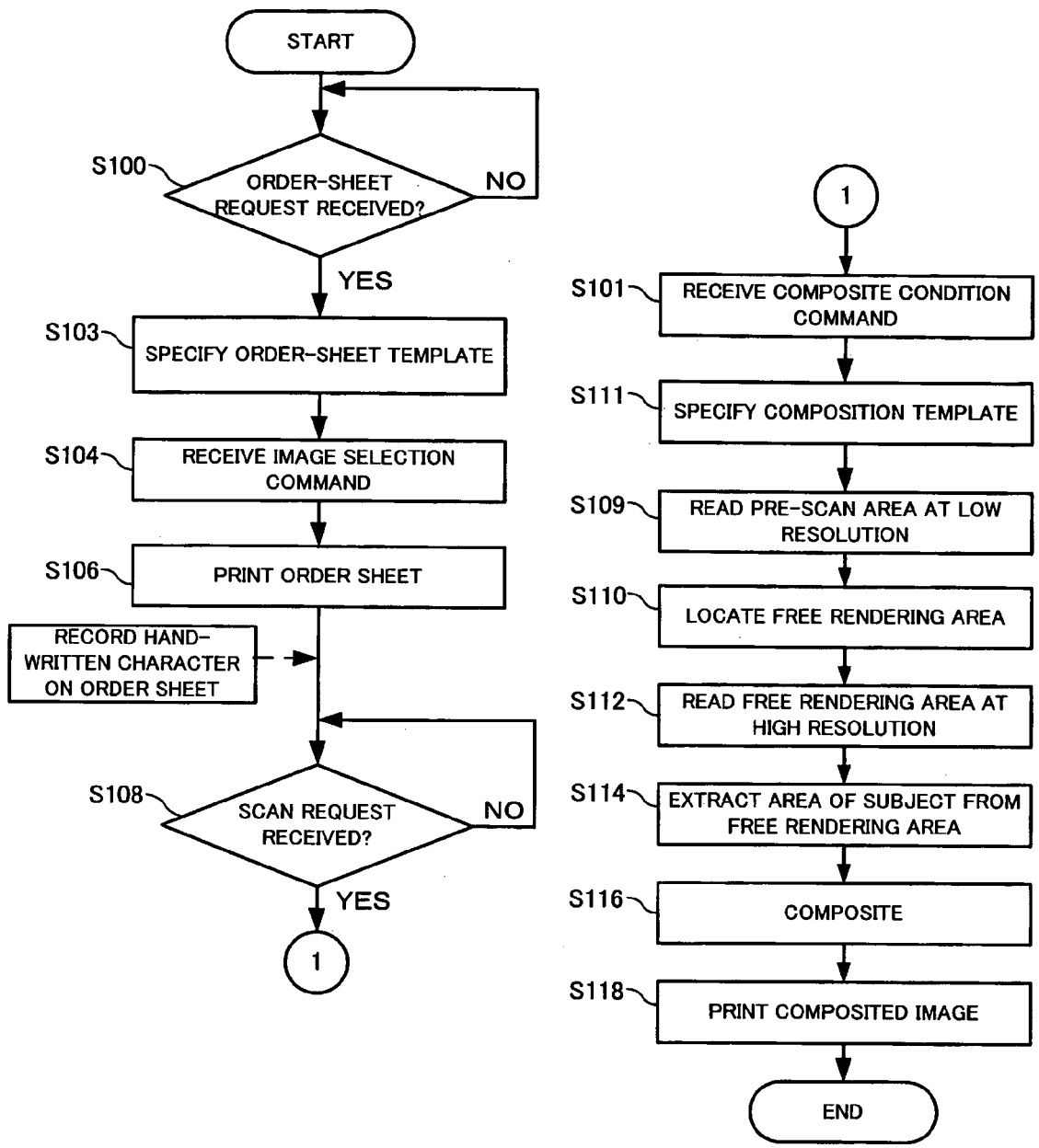
FIG. 22 is a flowchart according to the sixth example of the invention.
Figure 23:
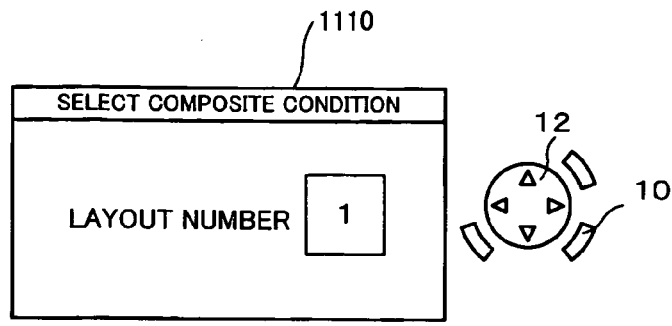
FIG. 23 is a schematic diagram showing a screen transition according to the sixth example of the invention.
Figure 24:
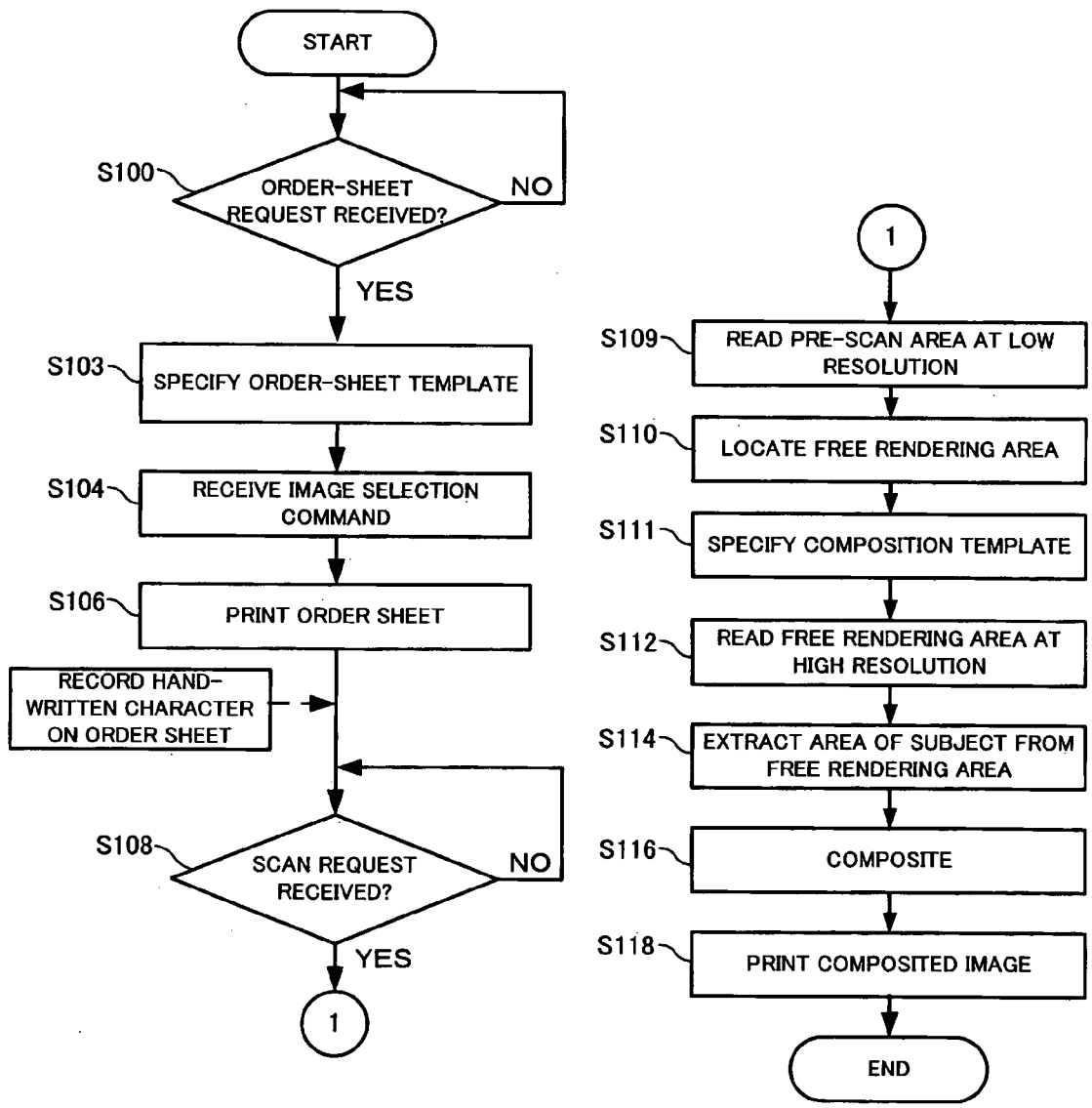
FIG. 24 is a flowchart showing an order sheet according to a seventh example of the invention.
Figure 25:
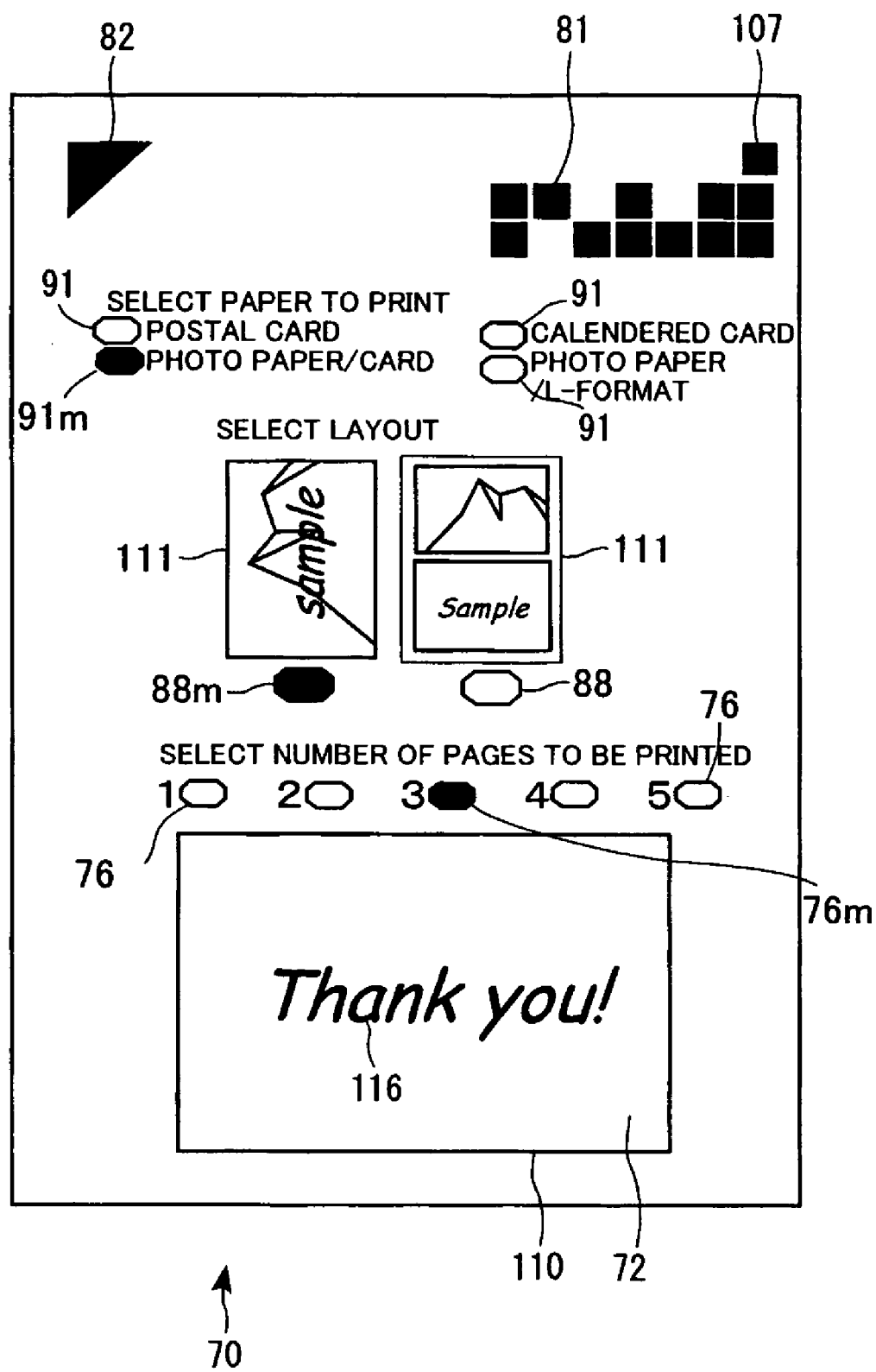
FIG. 25 is a schematic diagram showing an order sheet according to an eighth example of the invention.
Figure 26:
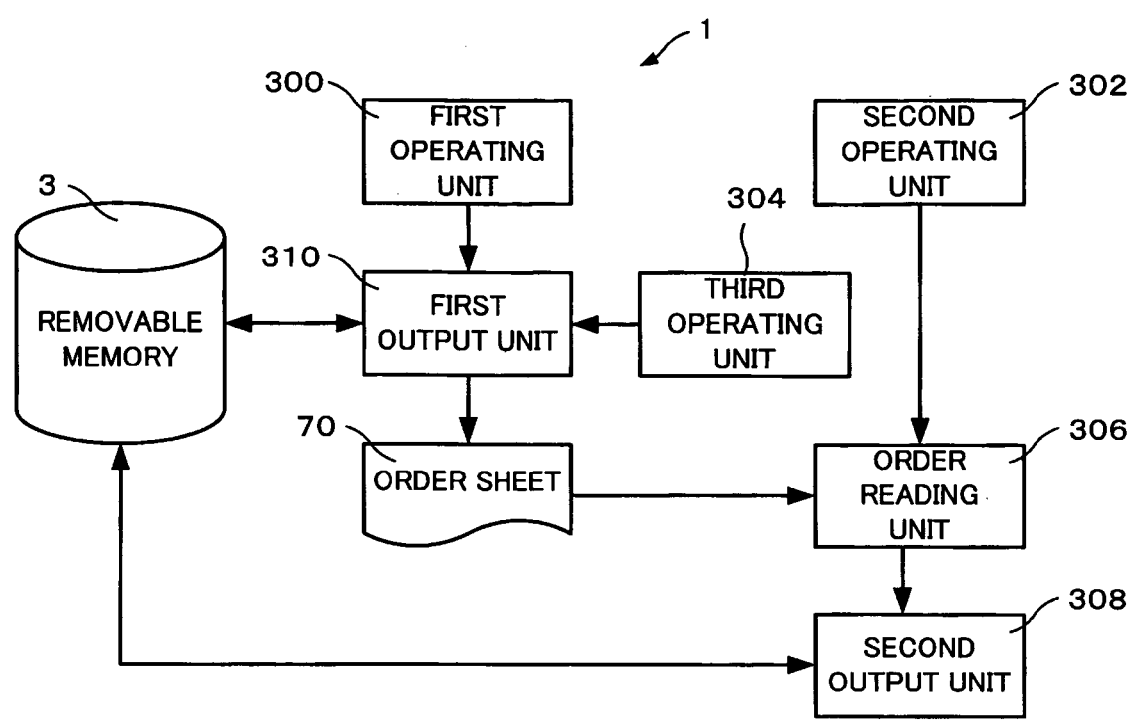
FIG. 26 is a functional block diagram according to a ninth example of the invention.
Figure 27:
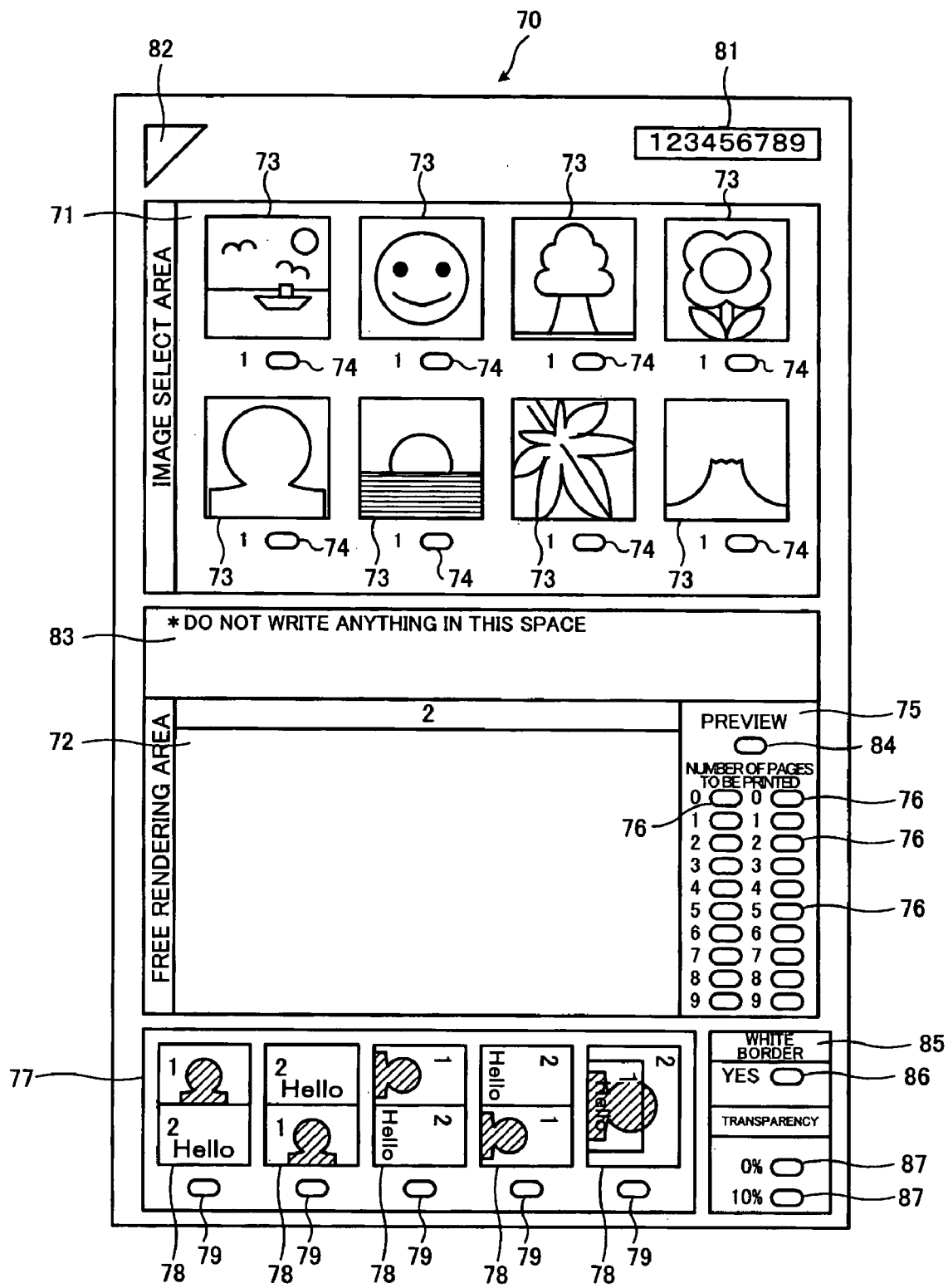
FIG. 27 is a schematic diagram showing an order sheet according to the ninth example of the invention.
Figure 28:
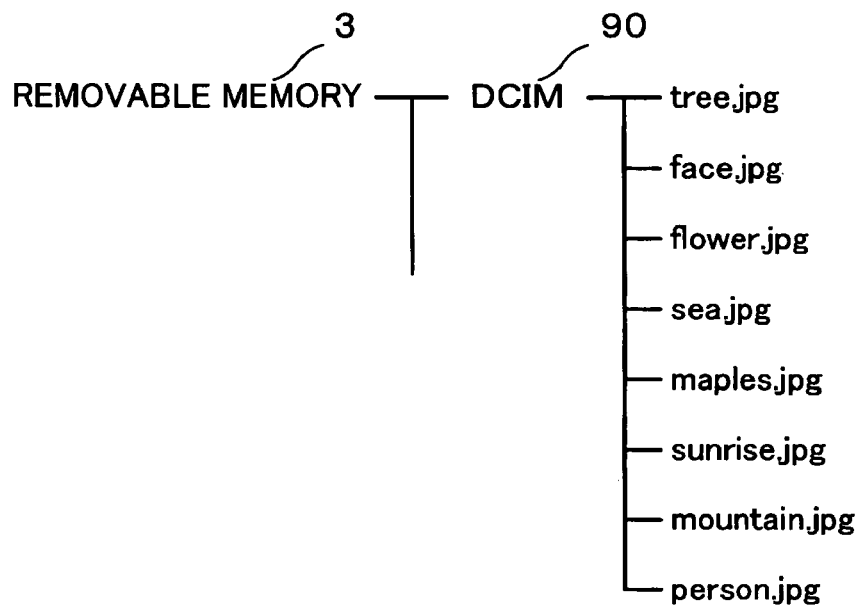
FIG. 28 is a schematic diagram showing a directory structure according to the ninth example of the invention.
Figure 29:
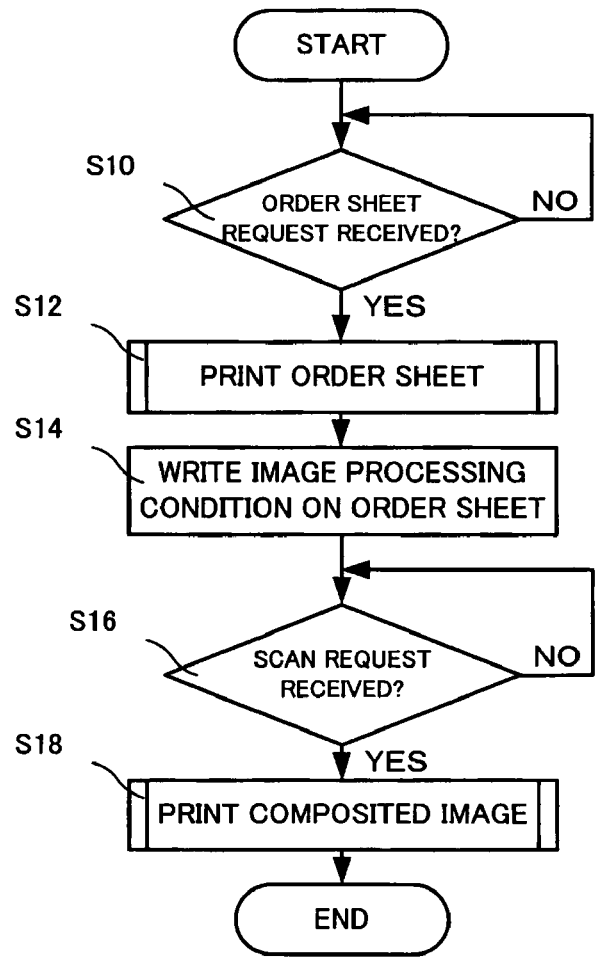
FIG. 29 is a flowchart according to the ninth example of the invention.
Figure 30:
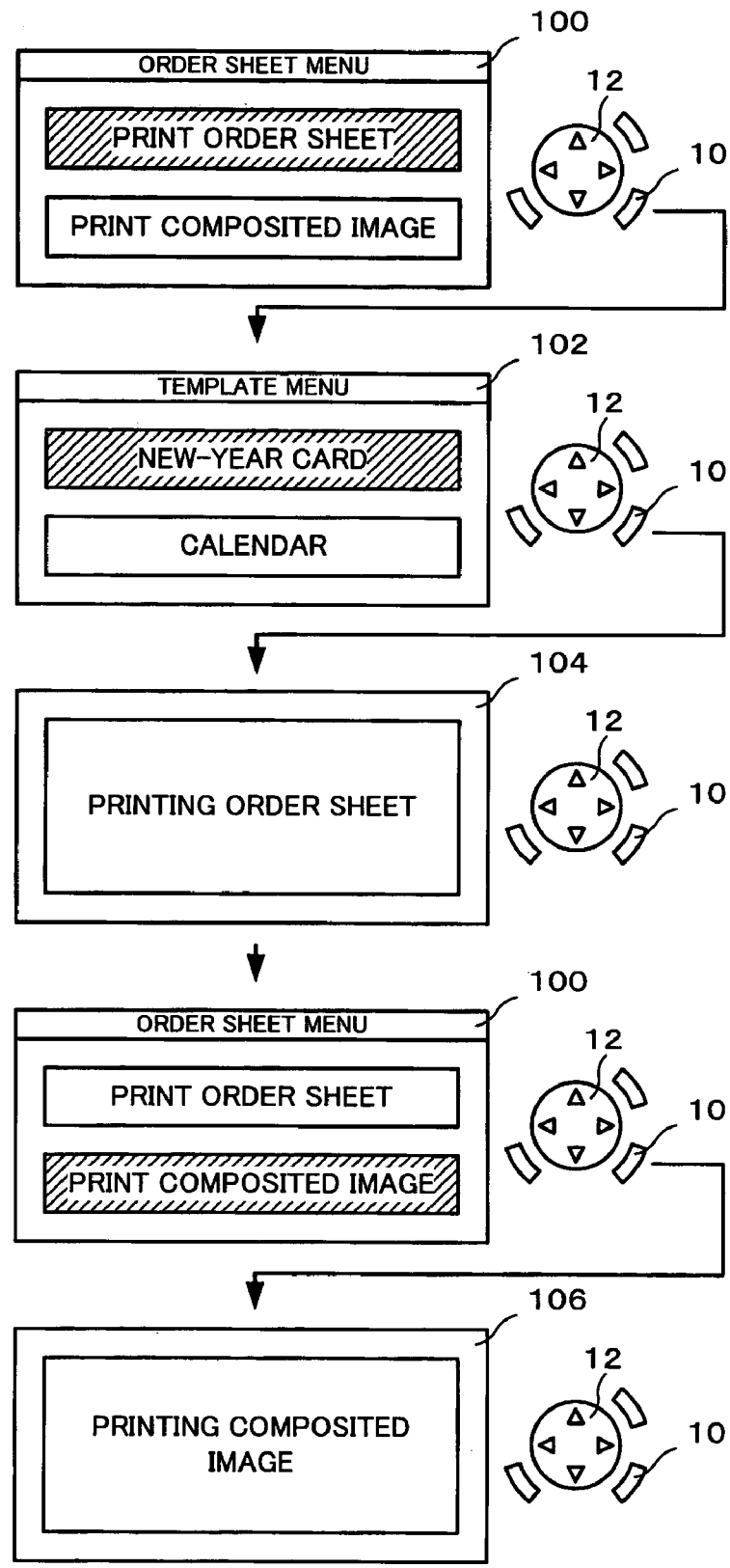
FIG. 30 is a schematic diagram showing a screen transition according to the ninth example of the invention.
Figure 31:
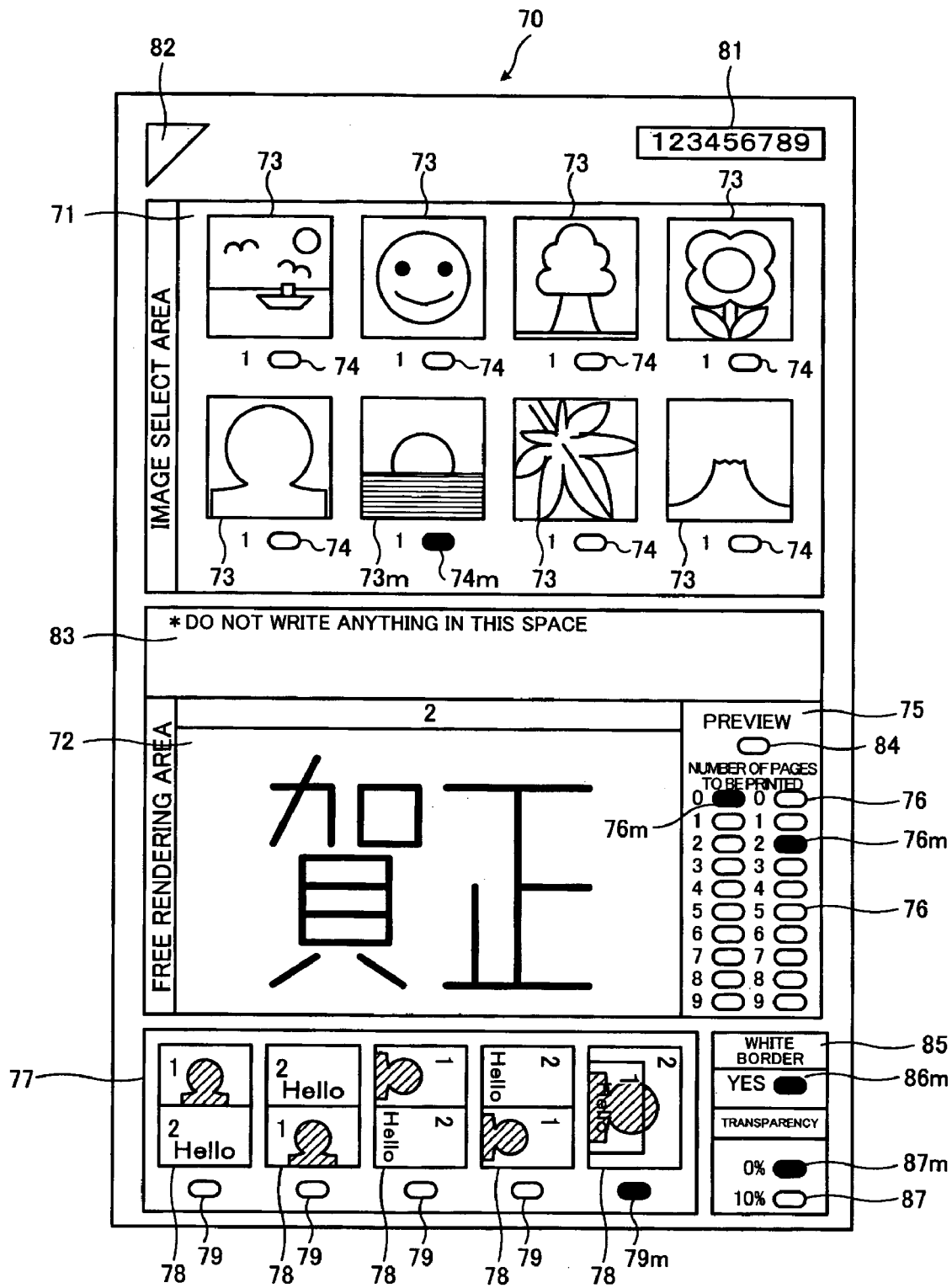
FIG. 31 is a schematic diagram showing an order sheet according to the ninth example of the invention.
Figure 32:
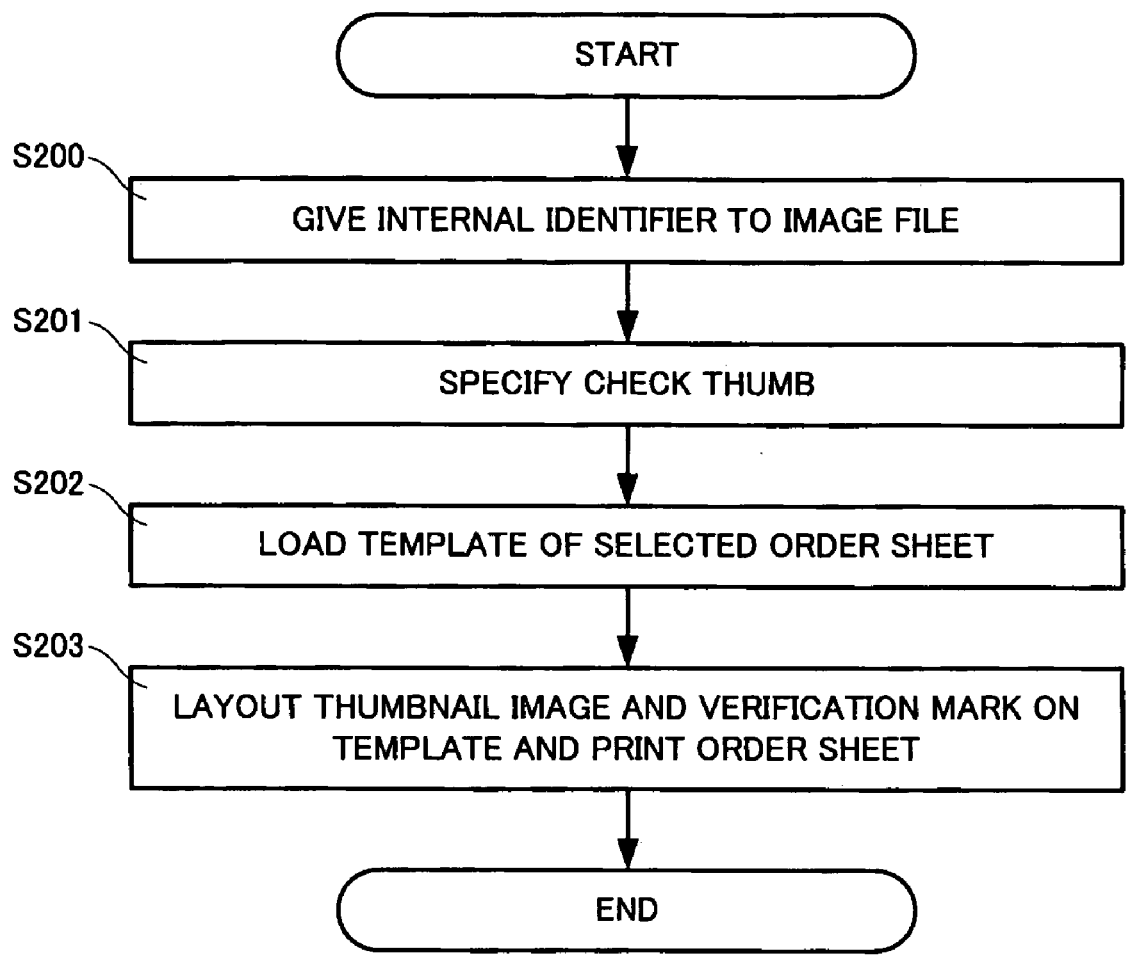
FIG. 32 is a flowchart according to the ninth example of the invention.
Figure 33:
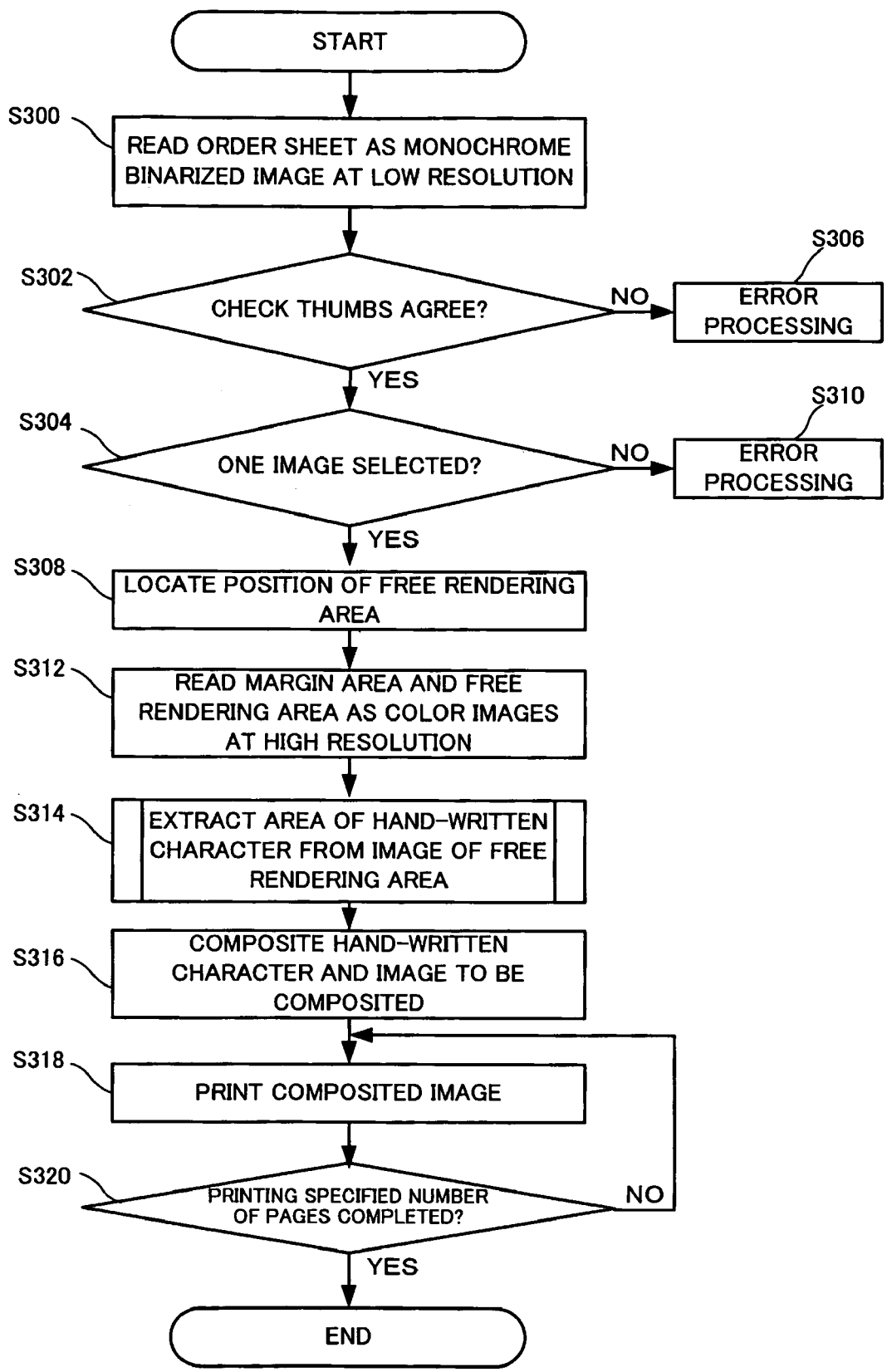
FIG. 33 is another flowchart according to the ninth example of the invention.
Figure 34:
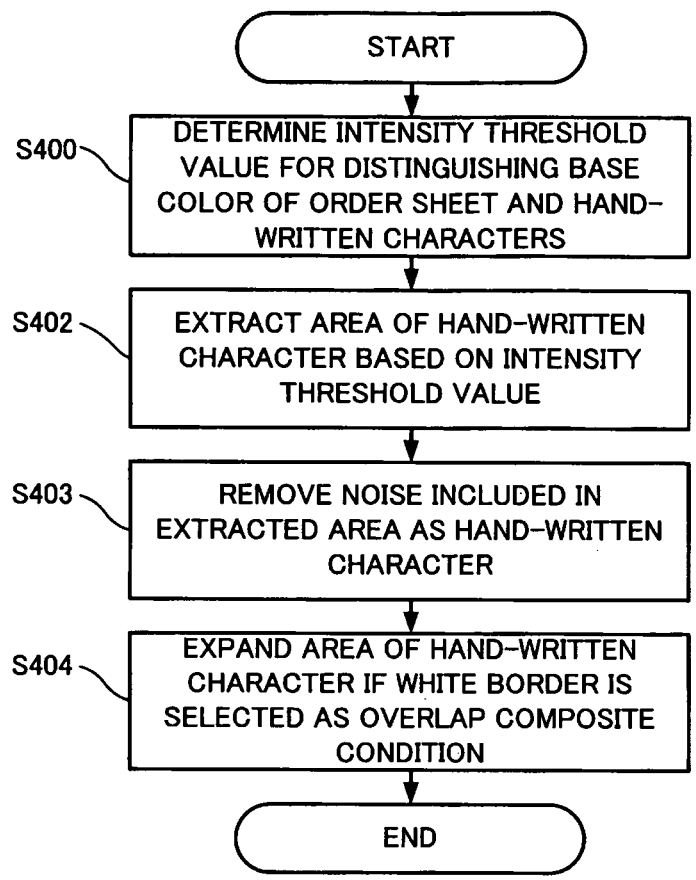
FIG. 34 is another flowchart according to the ninth example of the invention.
Figure 35:
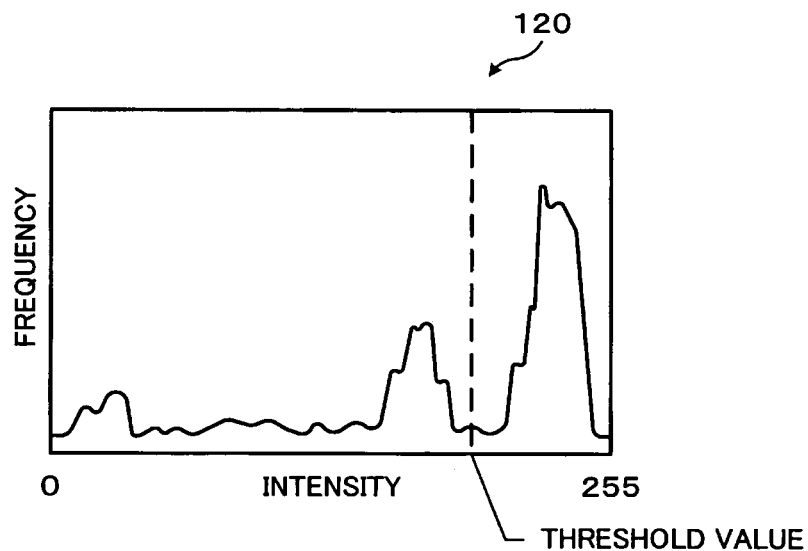
FIG. 35 is a schematic diagram showing a shade histogram according to the ninth example of the invention.
Figure 37:
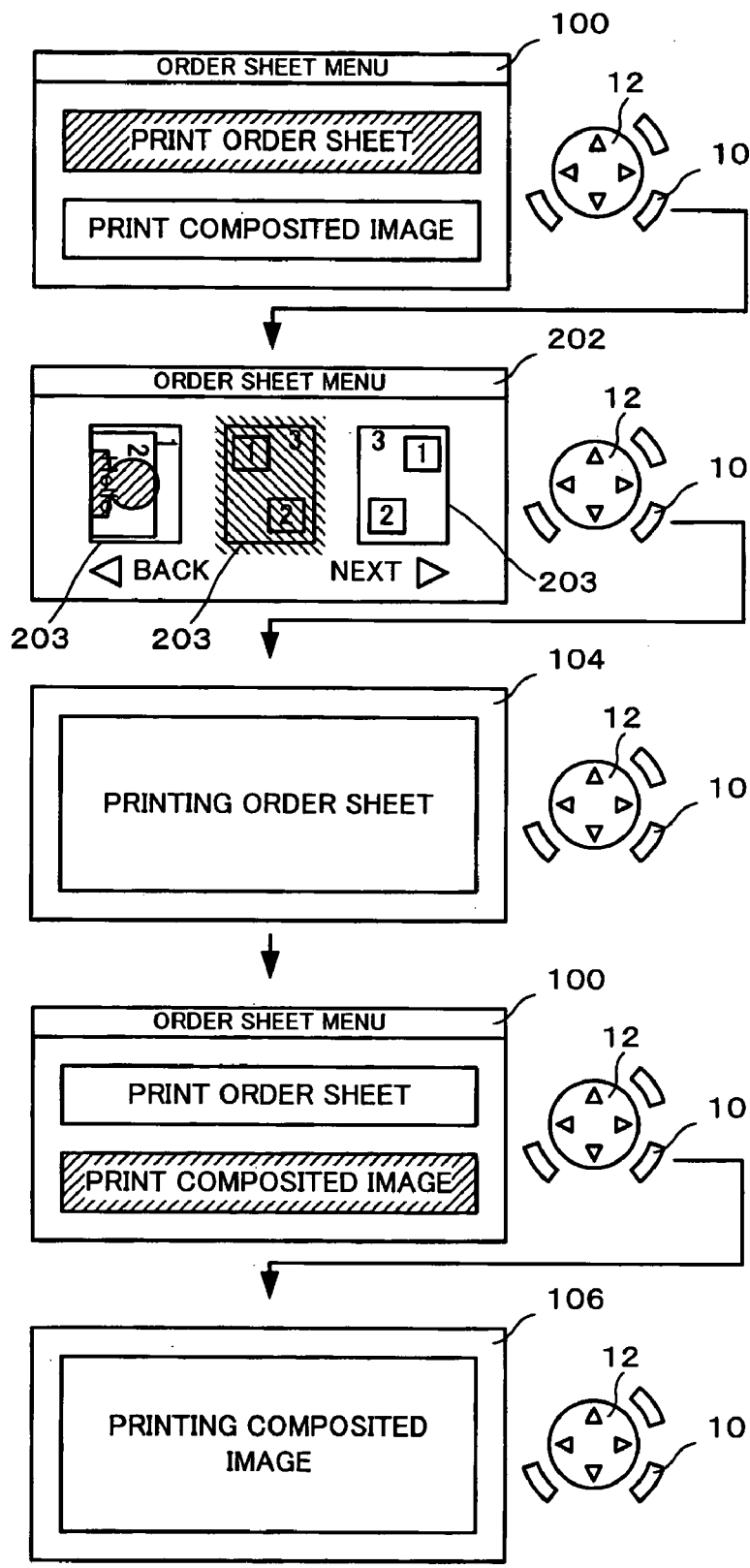
FIG. 37 is a schematic diagram showing a screen transition according to a tenth example of the invention.
Figure 38:
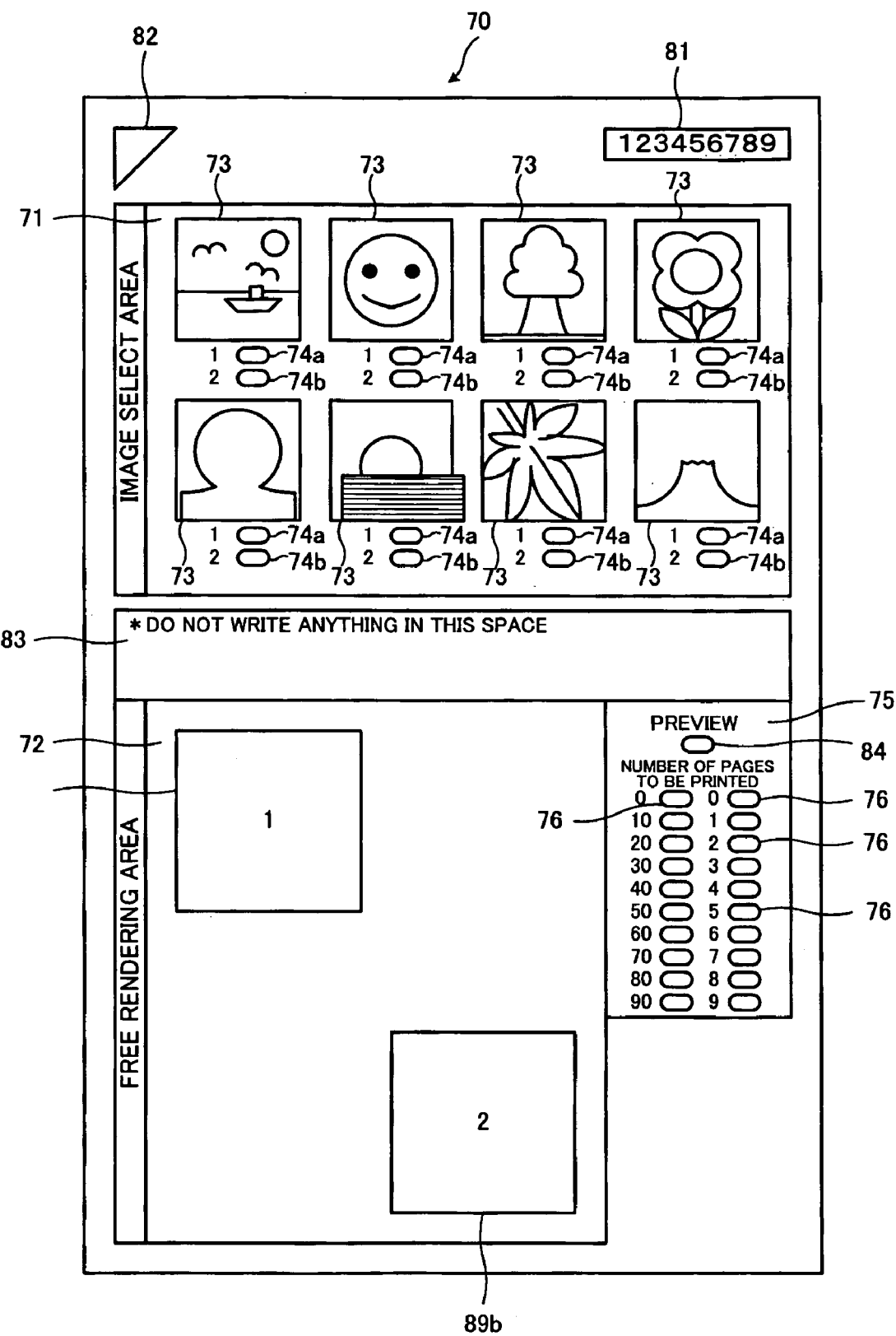
FIG. 38 is a schematic diagram showing an order sheet according to the tenth example of the invention.
Figure 39:
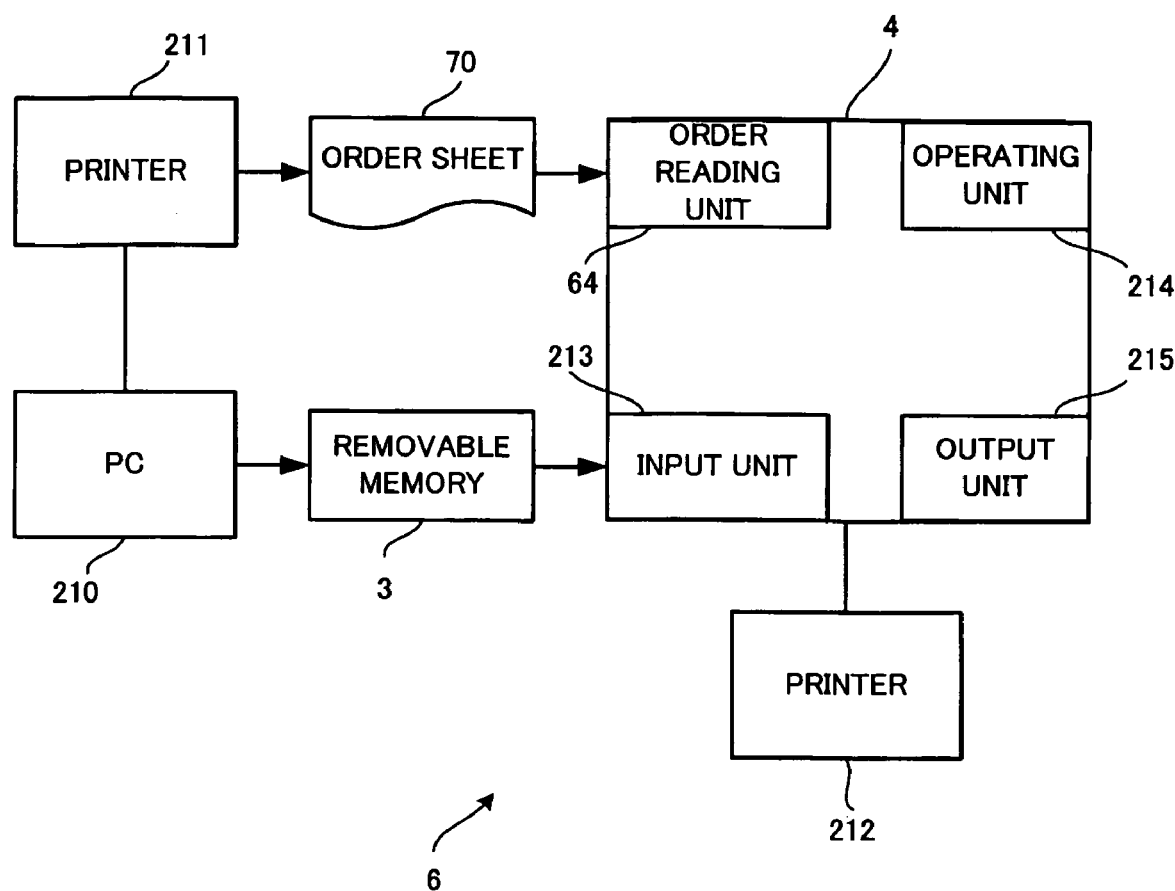
FIG. 39 is a schematic diagram showing an image processing system according to an eleventh example of the invention.
Figure 40:
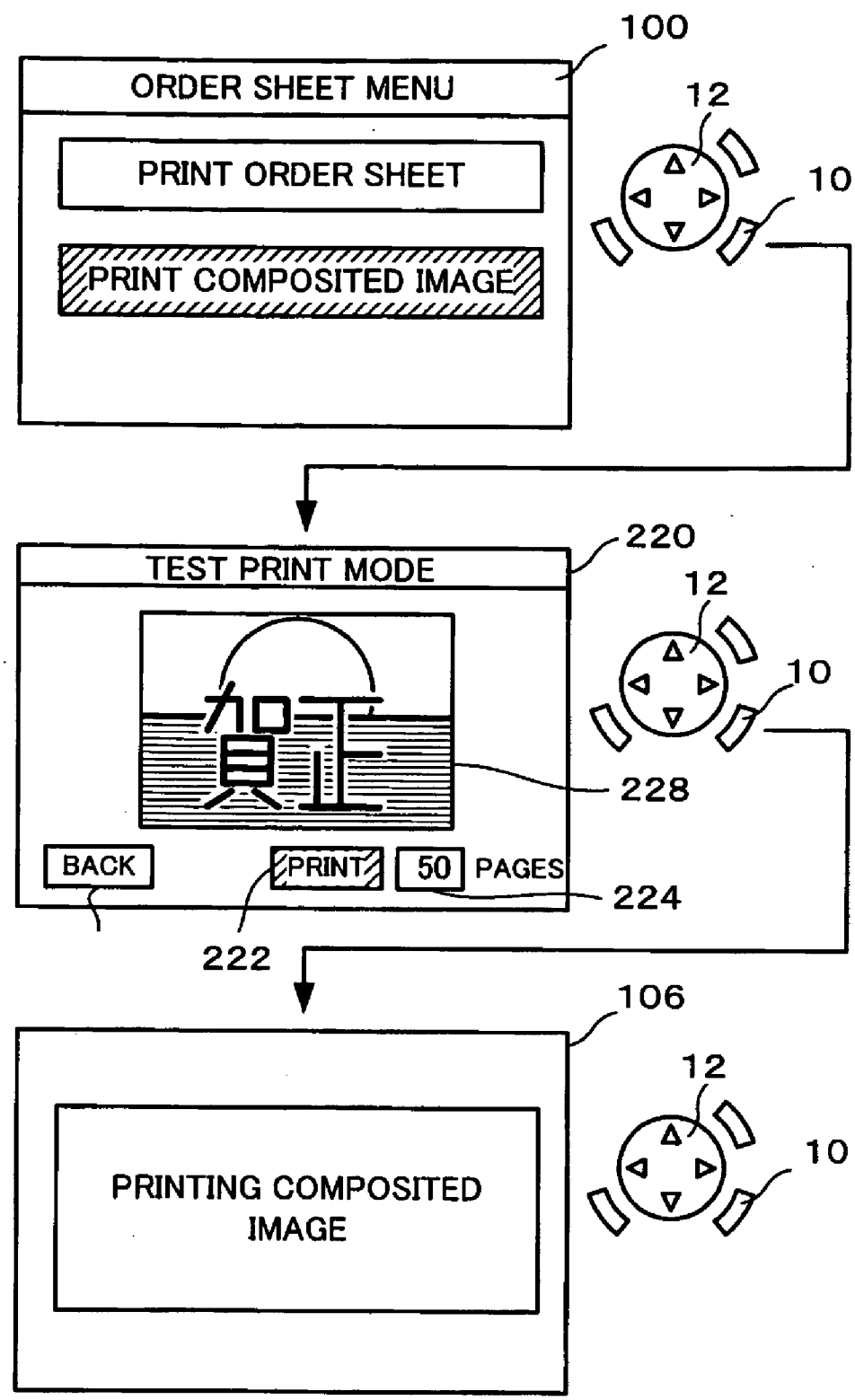
FIG. 40 is a schematic diagram showing a screen transition according to a twelfth example of the invention.
Figure 41:
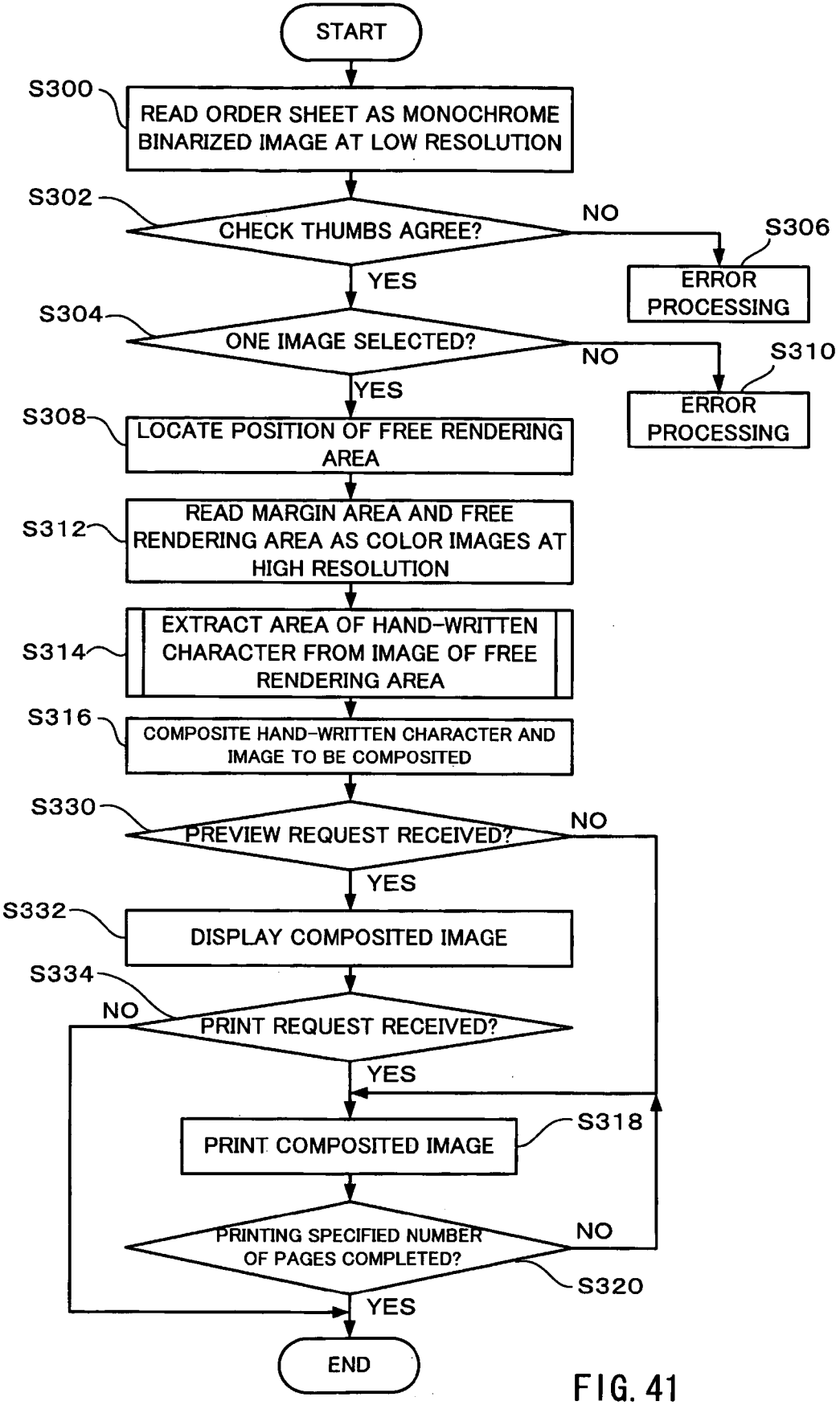
FIG. 41 is a flowchart according to the twelfth example of the invention.
Figure 42:
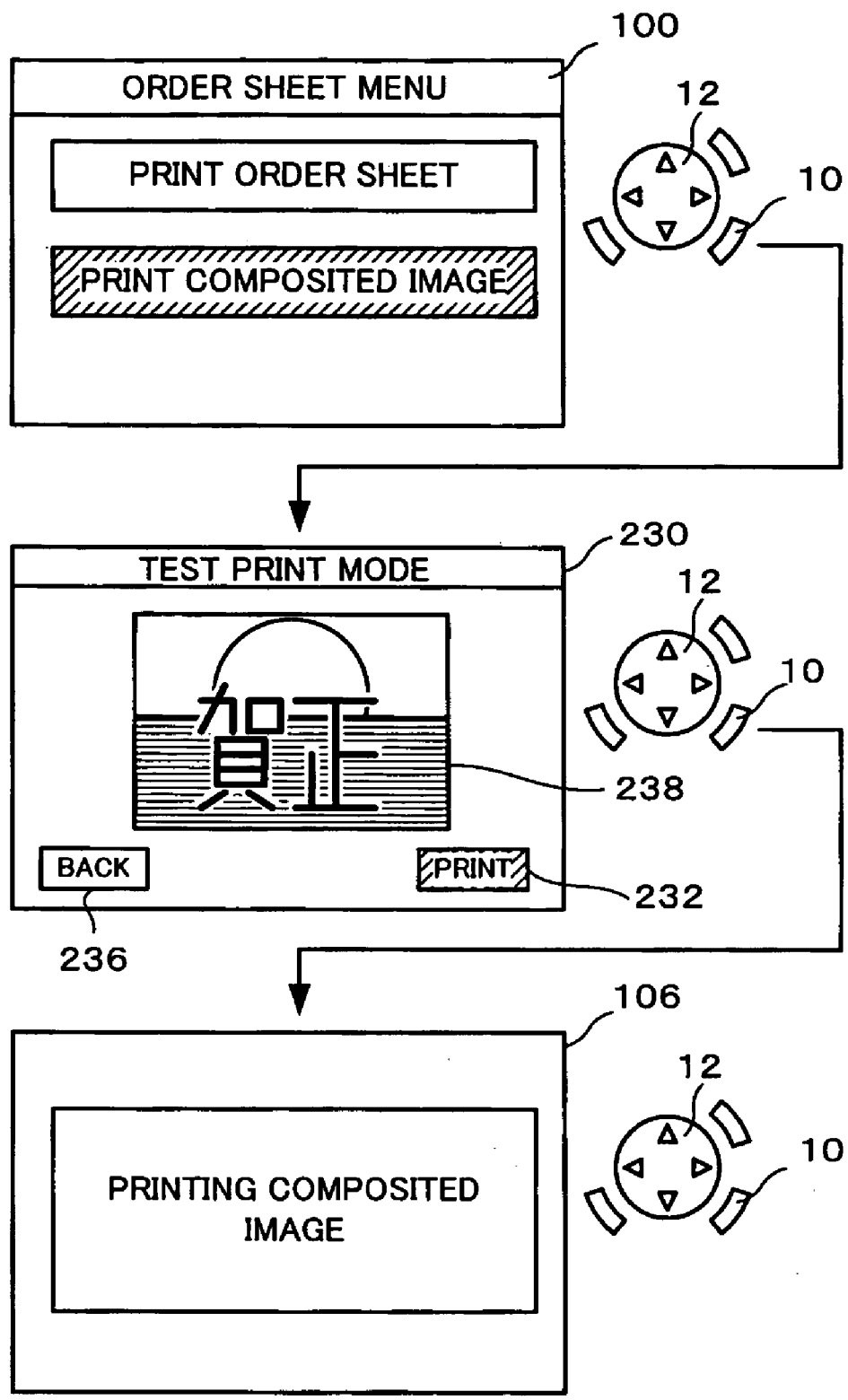
FIG. 42 is a schematic diagram showing a screen transition according to a thirteenth example of the invention.
Figure 43:
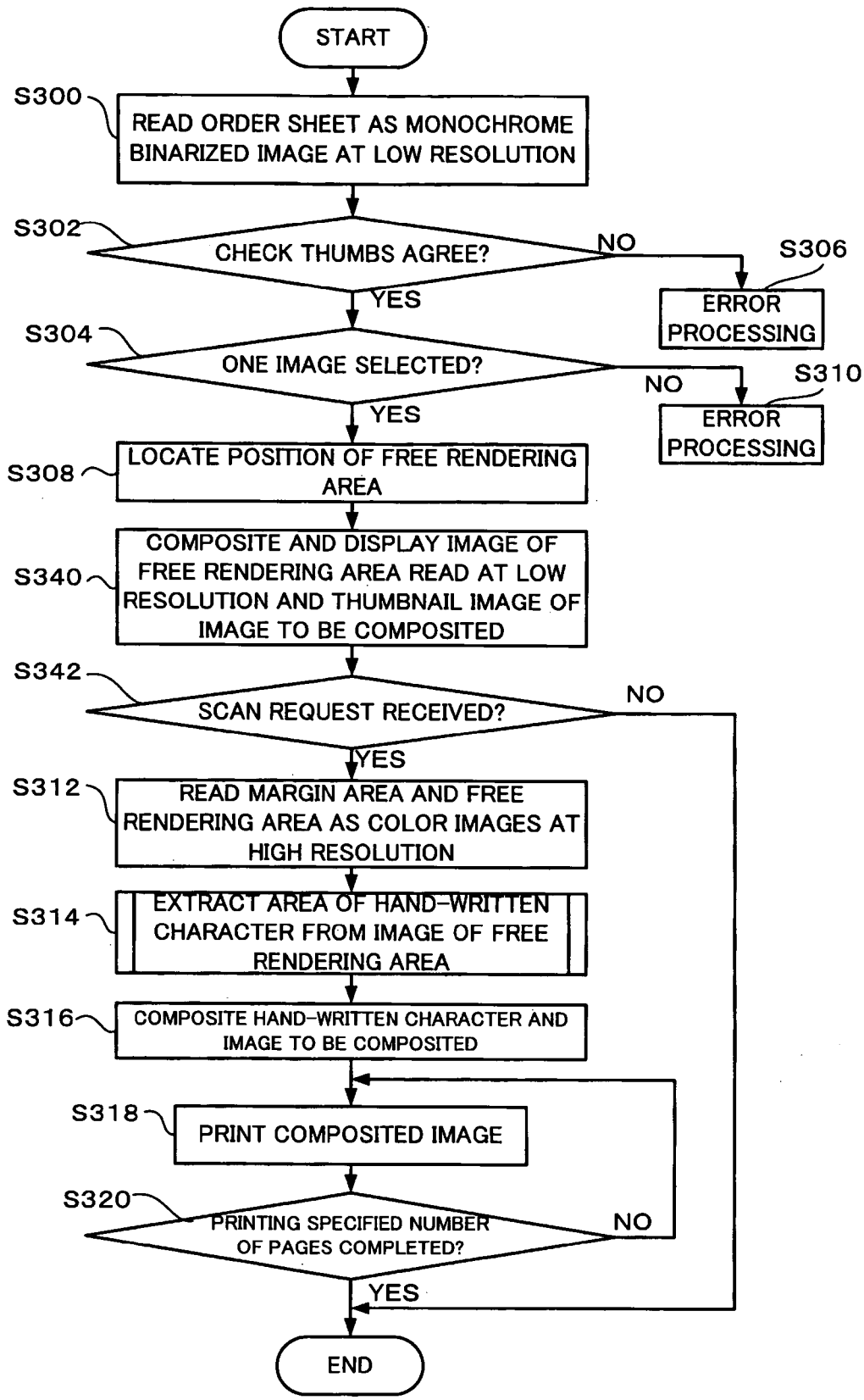
FIG. 43 is a flowchart according to the thirteenth example of the invention.
Figure 44:
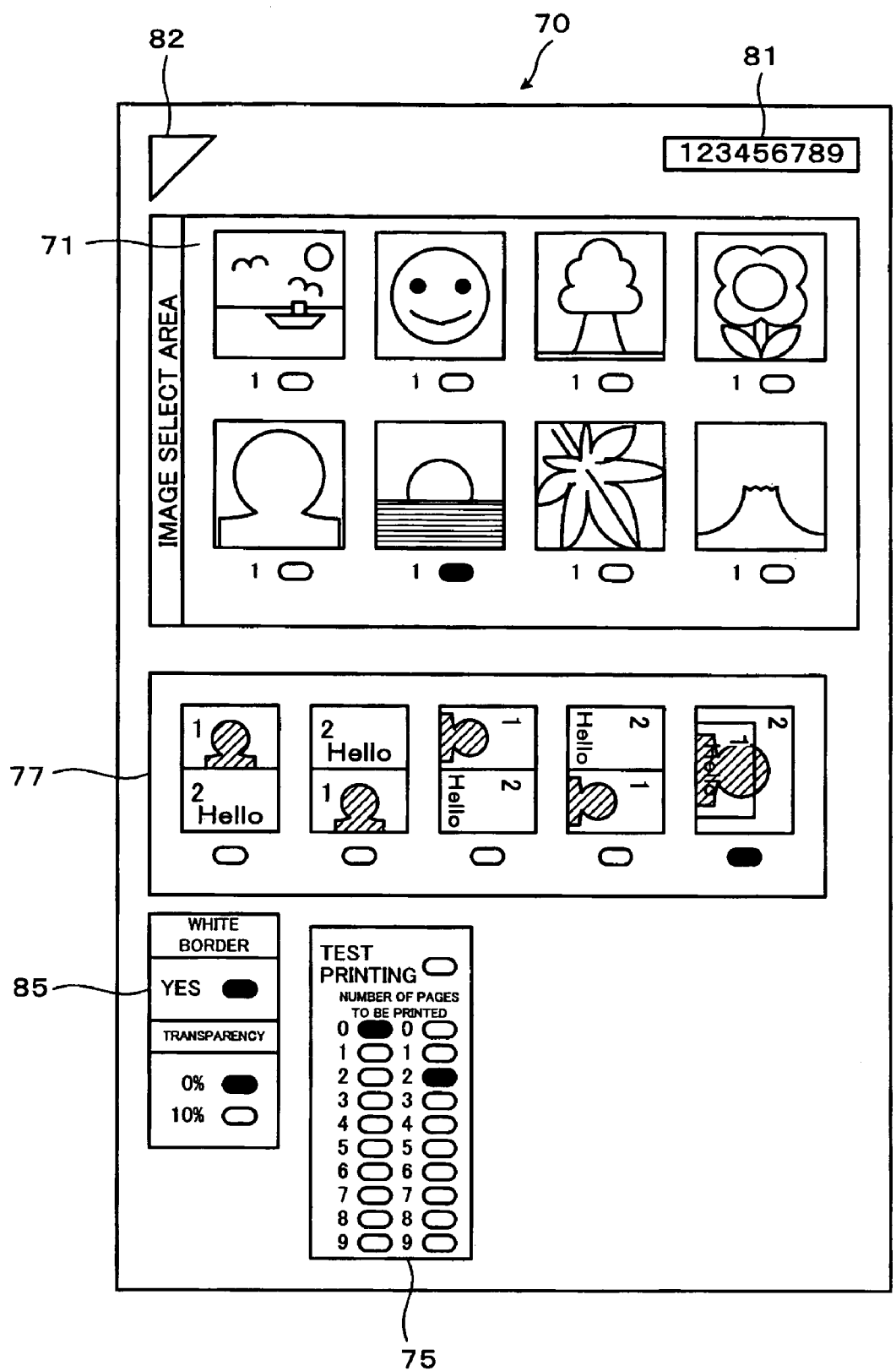
FIG. 44 is a schematic diagram showing an order sheet according to a fourteenth example of the invention.
Figure 45:
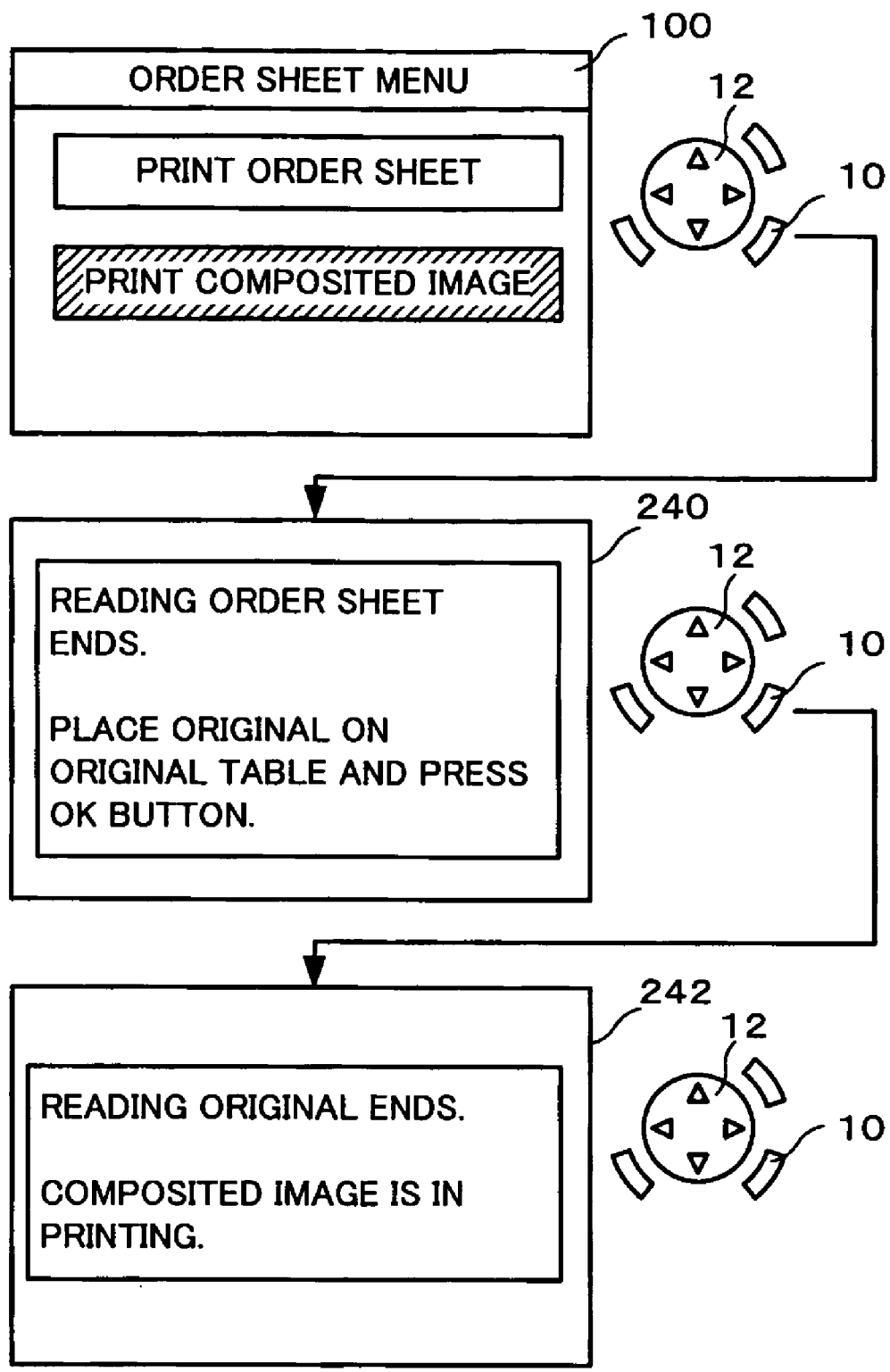
FIG. 45 is a schematic diagram showing a screen transition according the fourteenth example of the invention.
Figure 46:
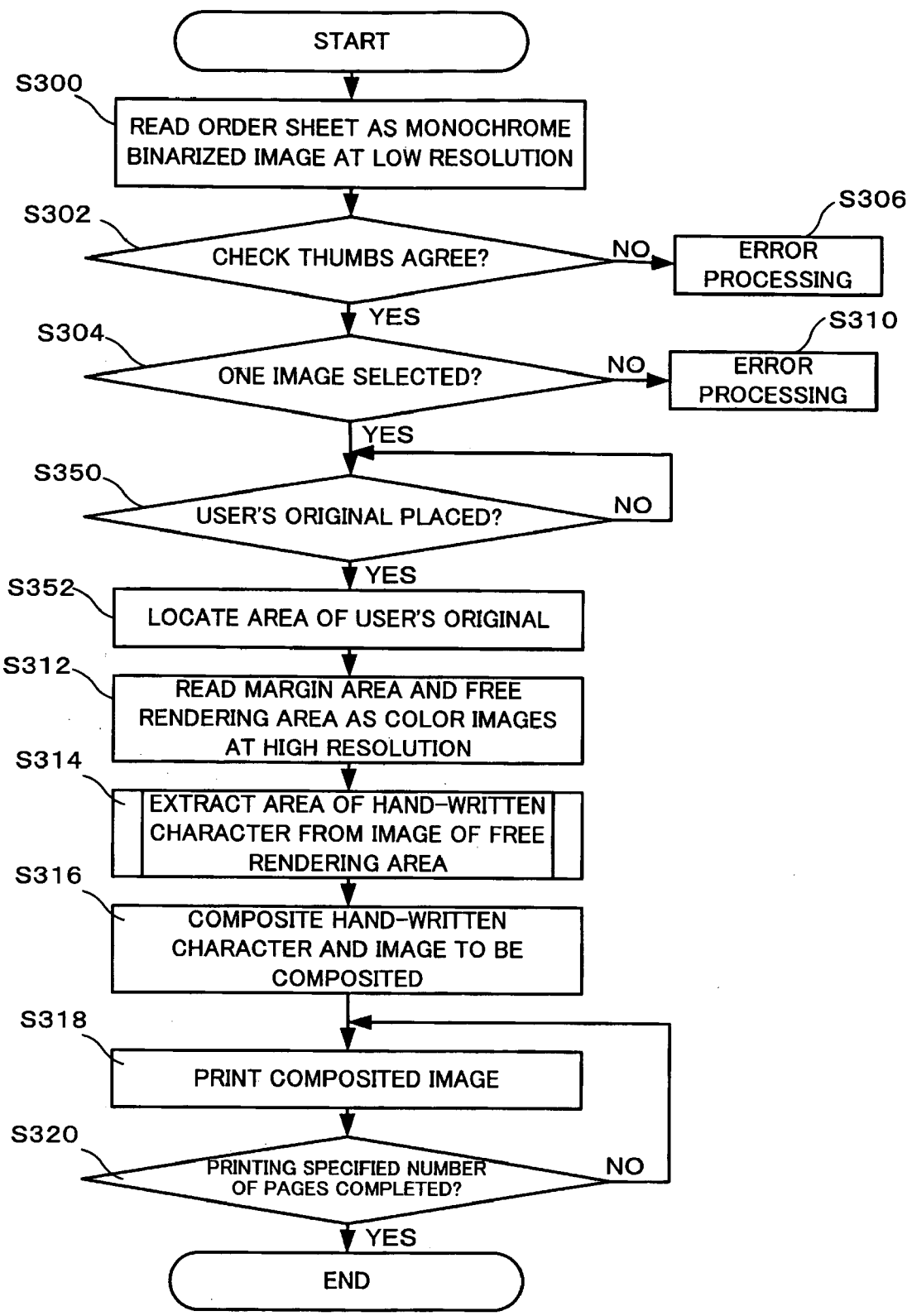
FIG. 46 is a flowchart according to the fourteenth example of the invention.
Figure 47:
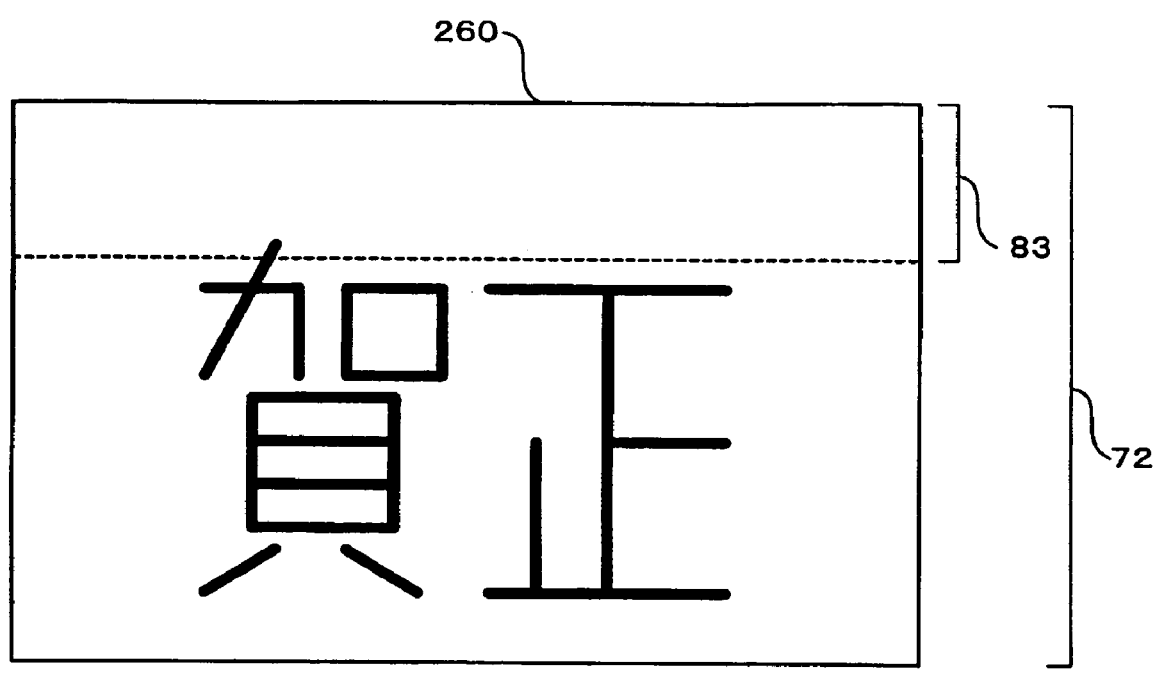
FIG. 47 is a schematic diagram showing a user's original according to the fourteenth example of the invention.
Figure 49:
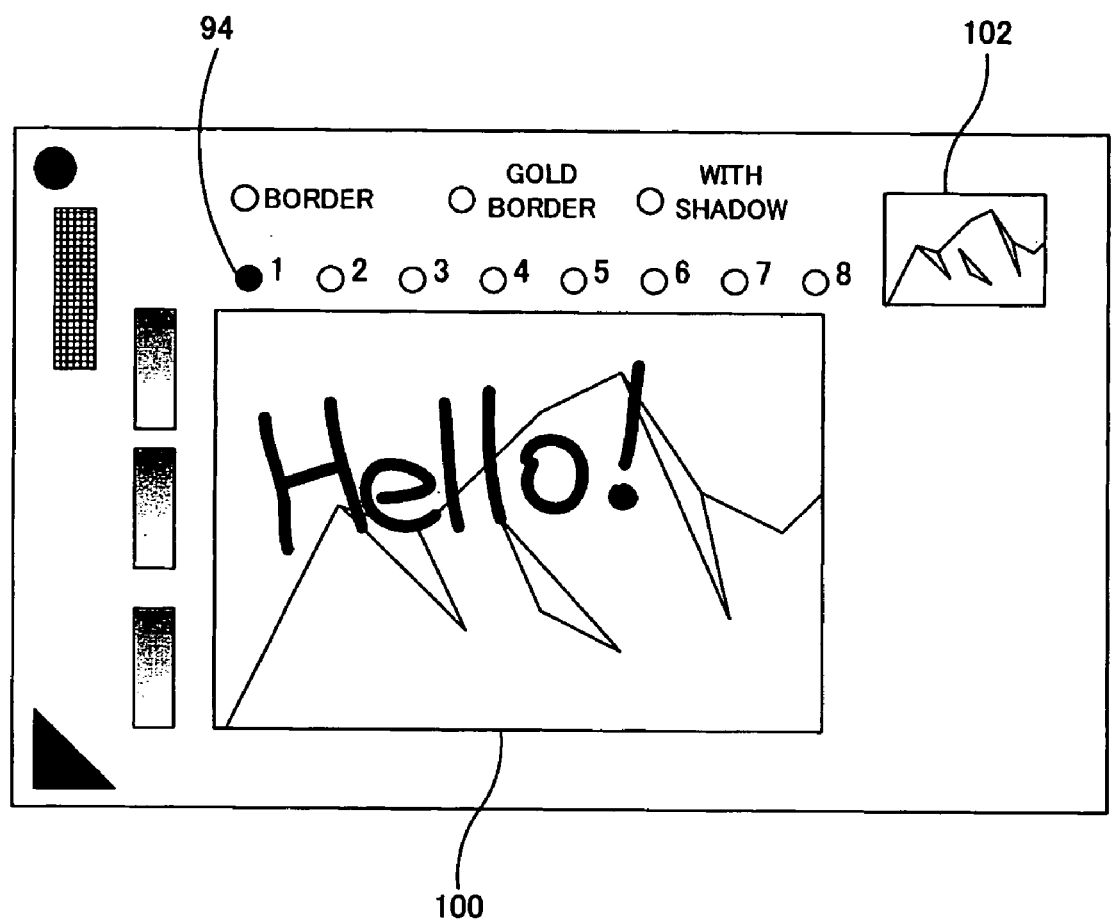
FIG. 49 is a plan view of one embodiment of the present invention.
Figure 50:
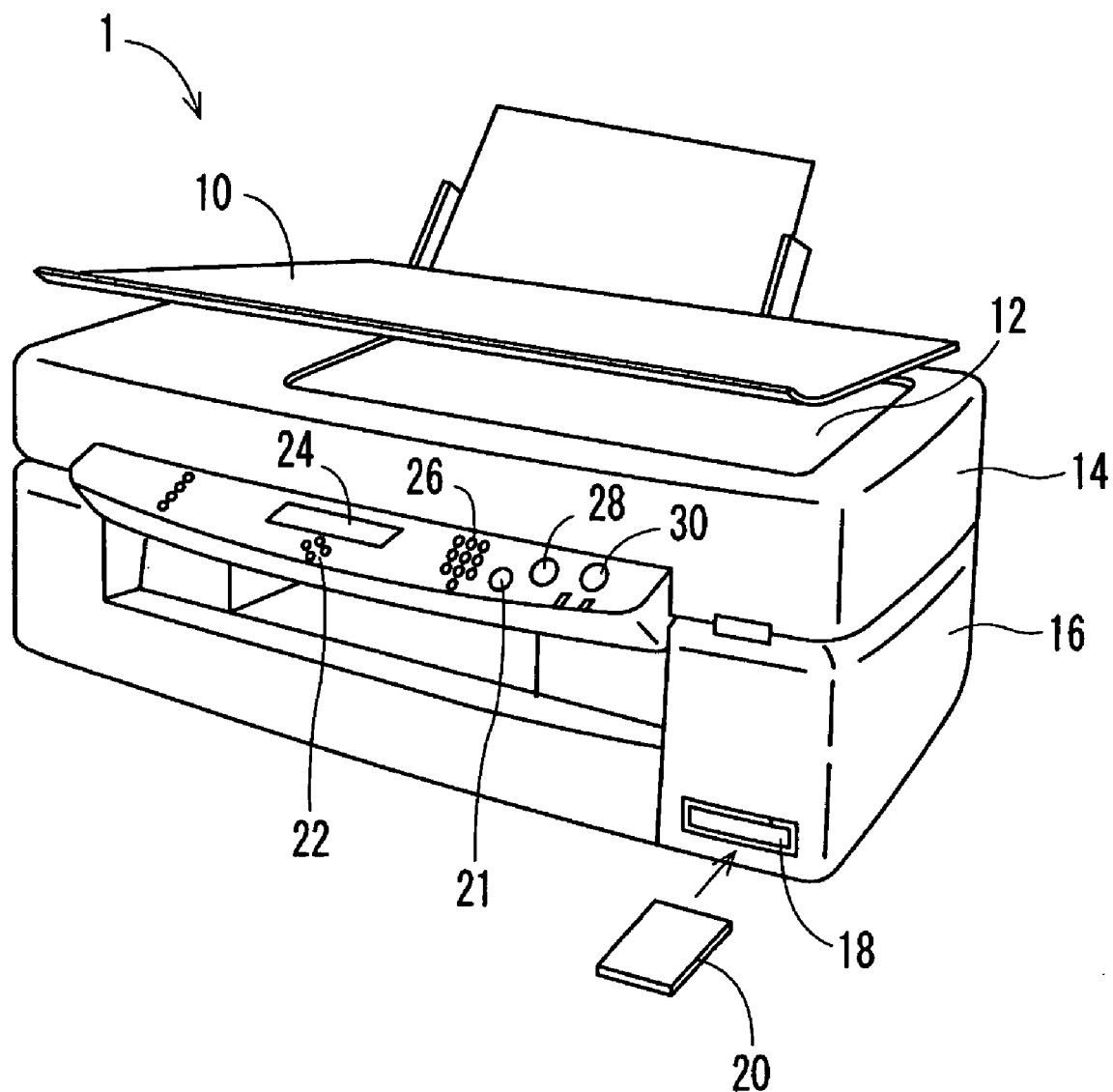
FIG. 50 is a perspective view of one embodiment of the present invention.
Figure 51:
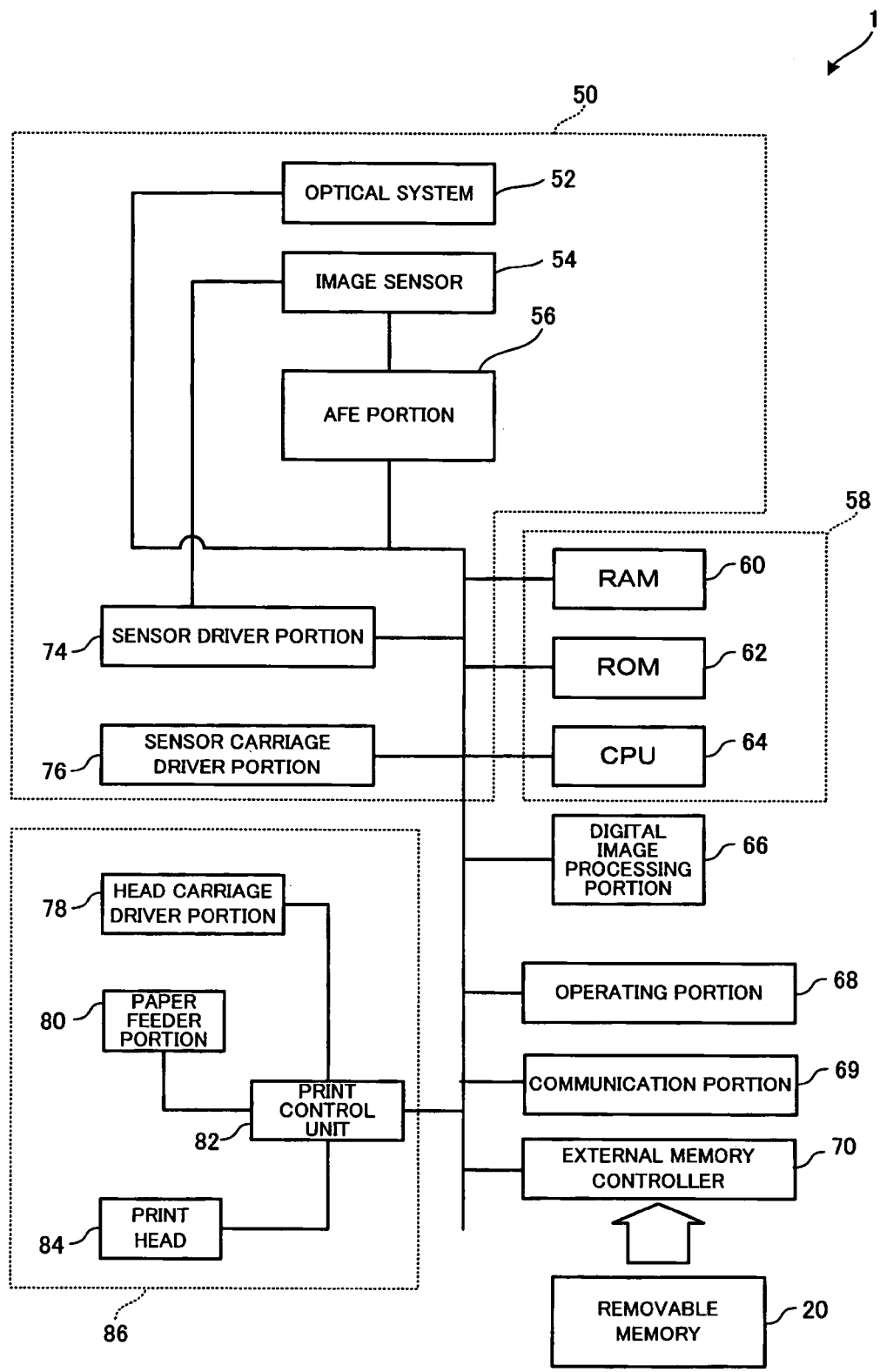
FIG. 51 is a block diagram of one embodiment of the present invention.
Figure 52:
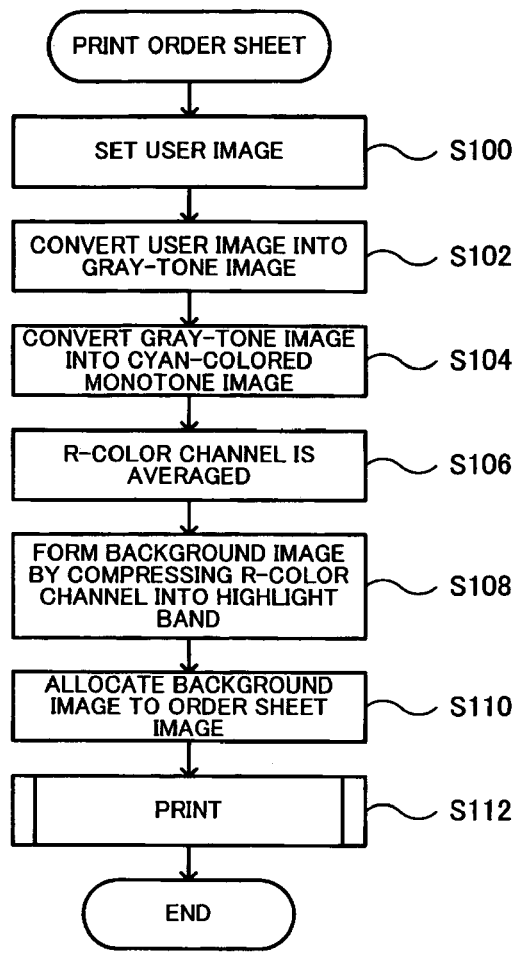
FIG. 52 is a flowchart of one embodiment of the present invention.
Figure 53:
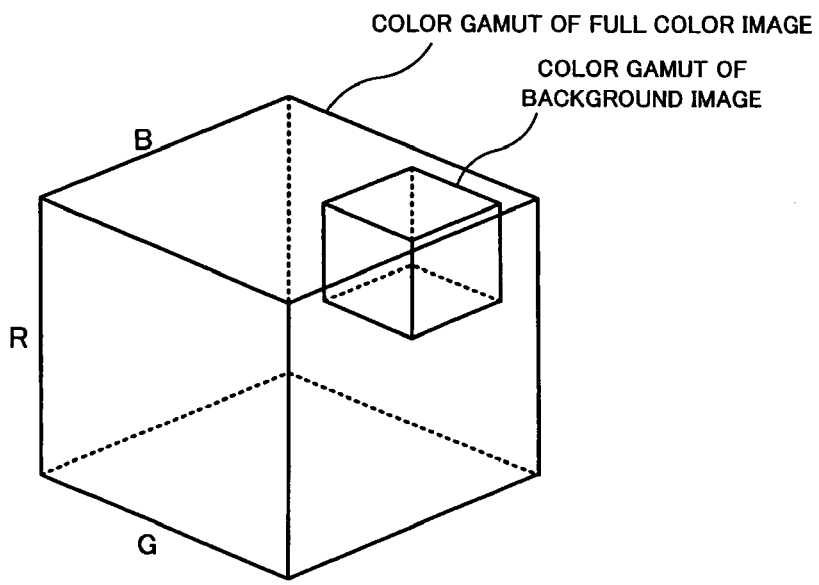
FIG. 53 is a schematic diagram of one embodiment of the present invention.
Figure 54:
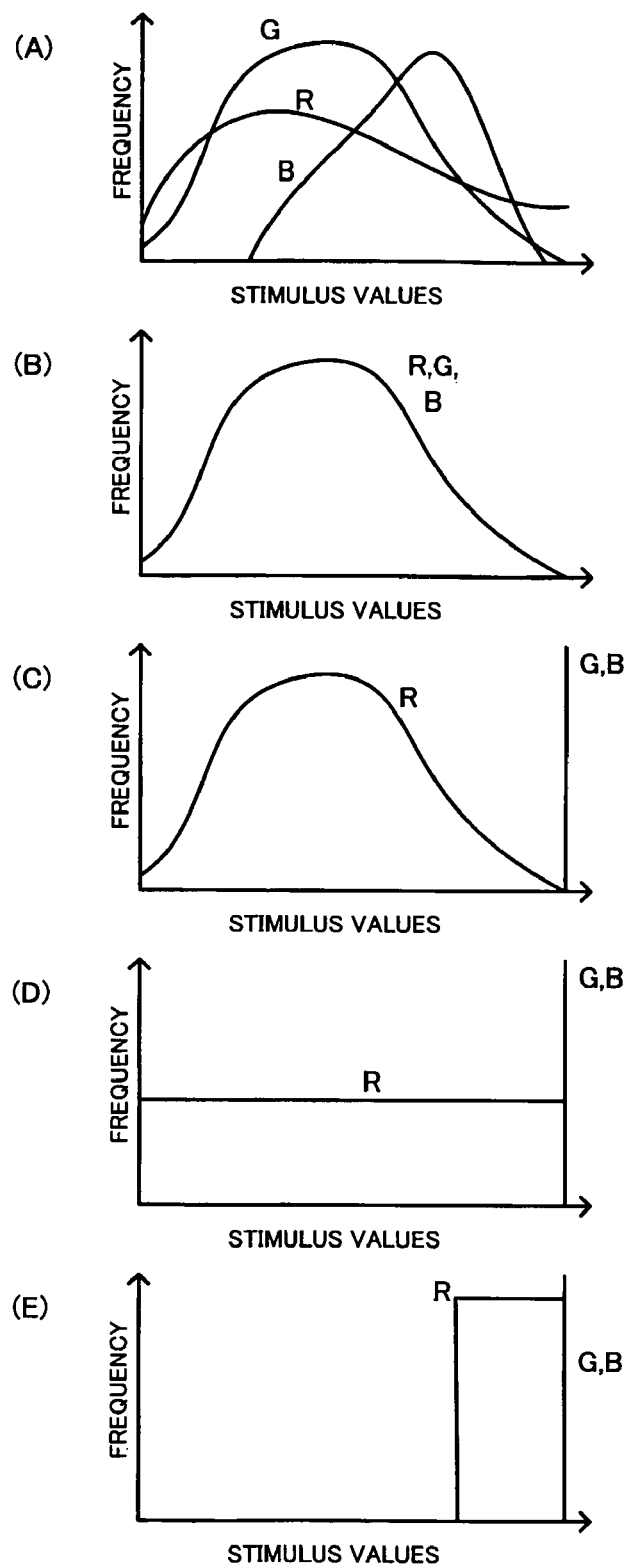
FIG. 54 is a histogram of one embodiment of the present invention.
Figure 55:
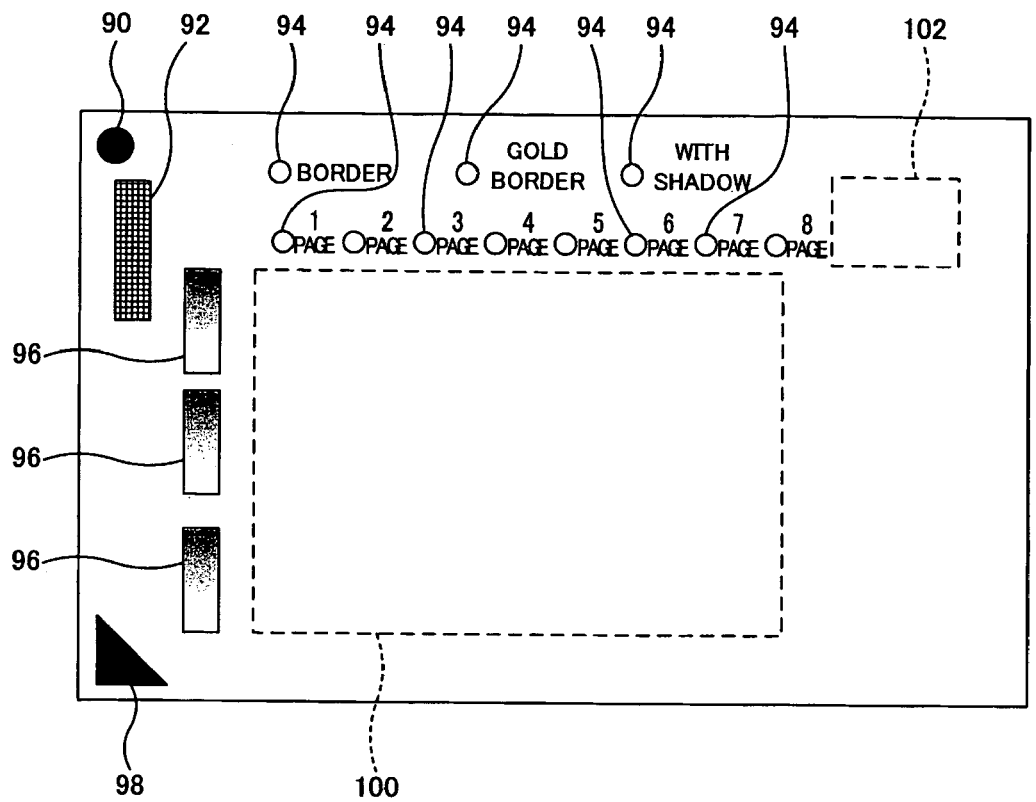
FIG. 55 is a schematic diagram of one embodiment of the present invention.
Figure 56:
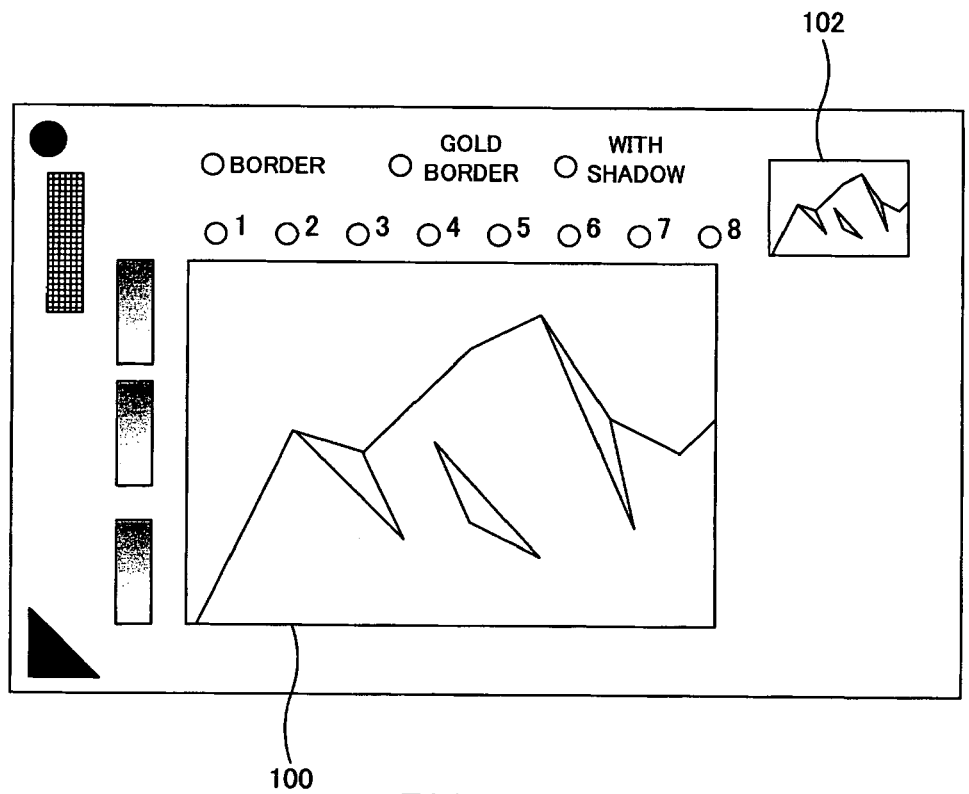
FIG. 56 is a schematic diagram of one embodiment of the present invention.
Figure 57:
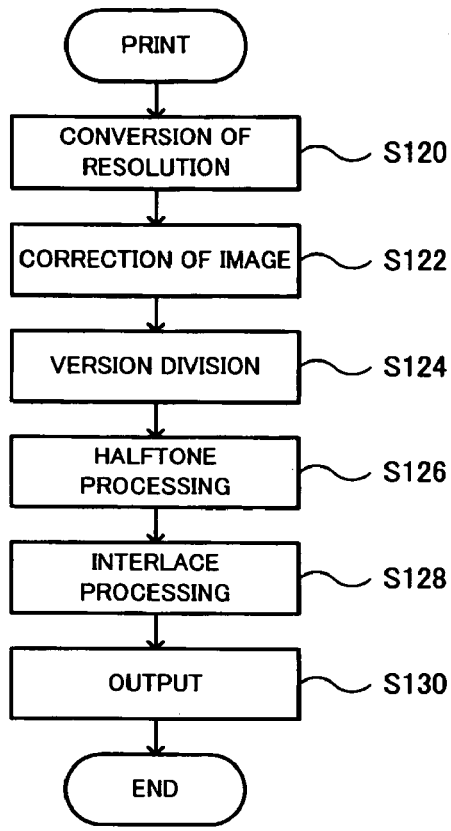
FIG. 57 is a flowchart of one embodiment of the present invention.
Figure 58:
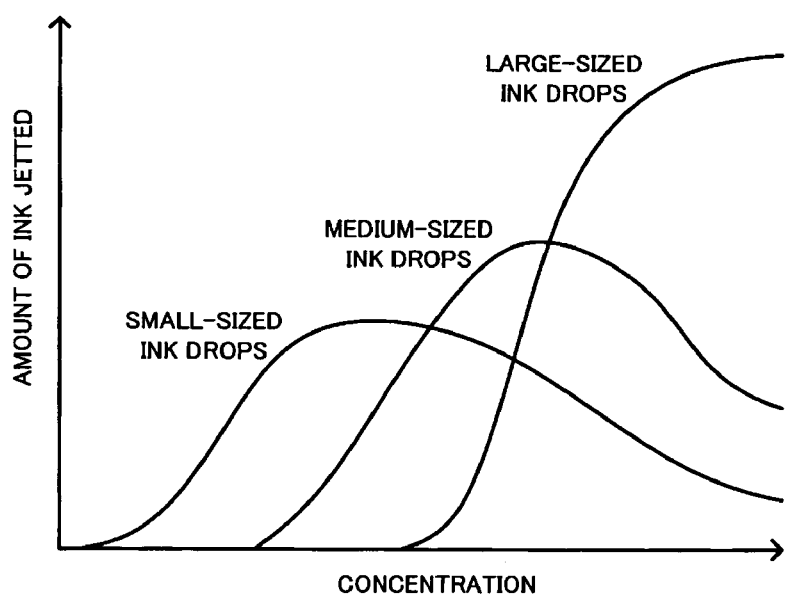
FIG. 58 is a graph of one embodiment of the present invention.
Figure 59:
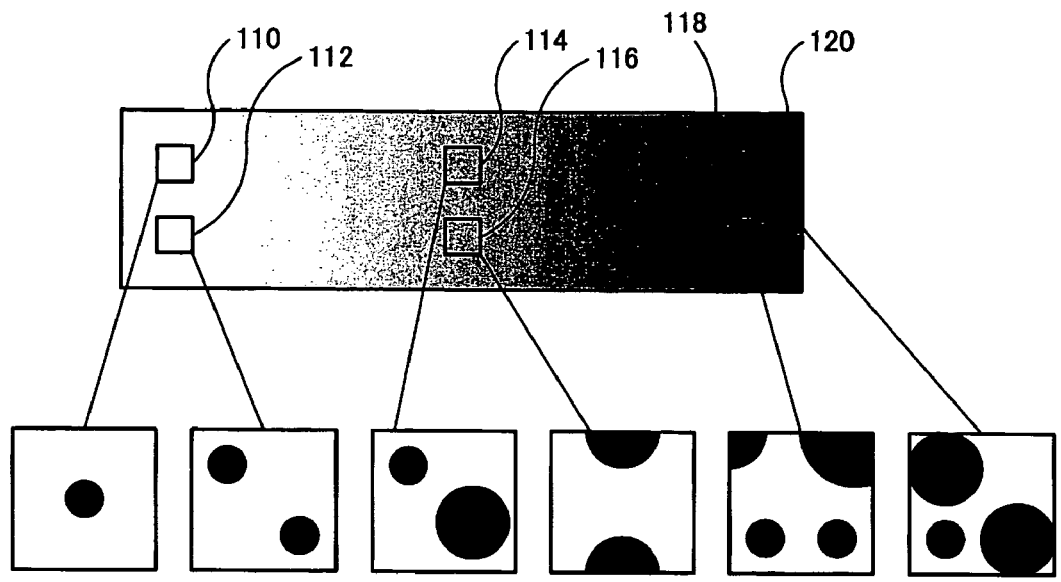
FIG. 59 is a schematic diagram of one embodiment of the present invention.
Figure 60:
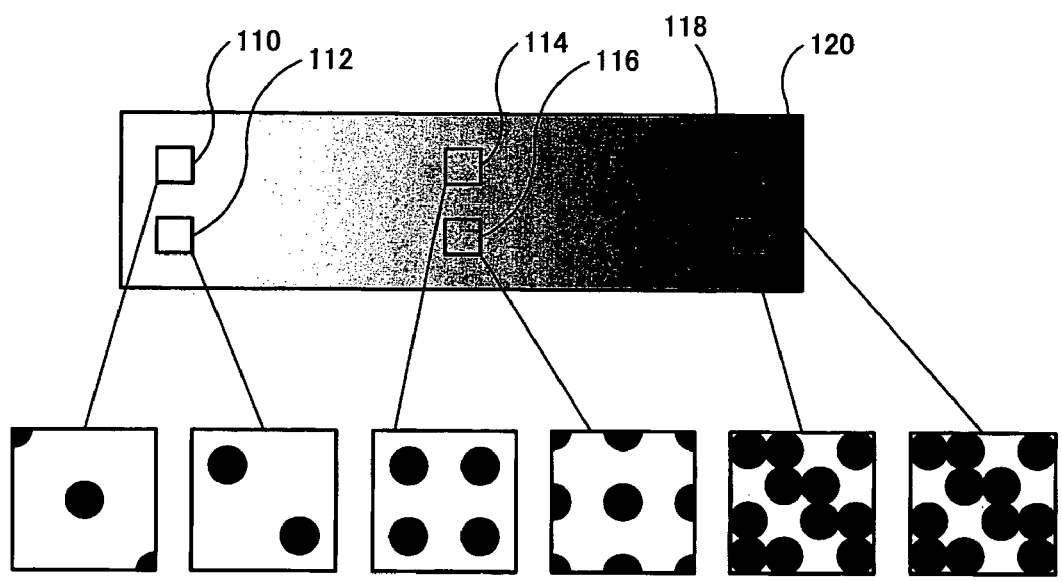
FIG. 60 is a schematic diagram of one embodiment of the present invention.
Figure 61:
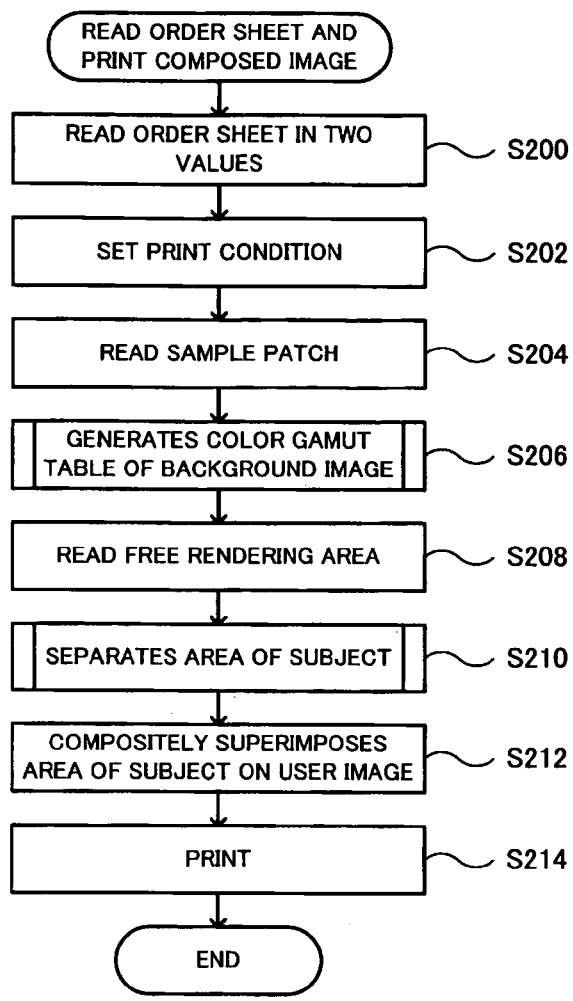
FIG. 61 is a flowchart of one embodiment of the present invention.
Figure 62:
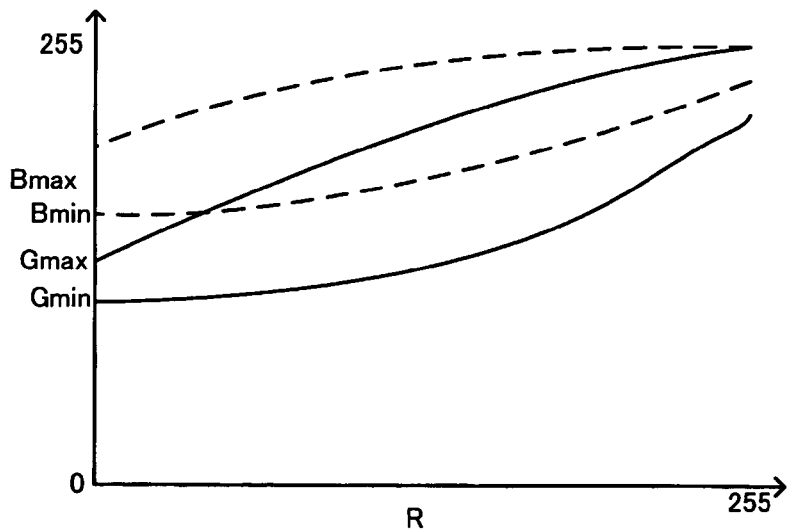
FIG. 62 is a schematic diagram of one embodiment of the present invention.
Figure 63:
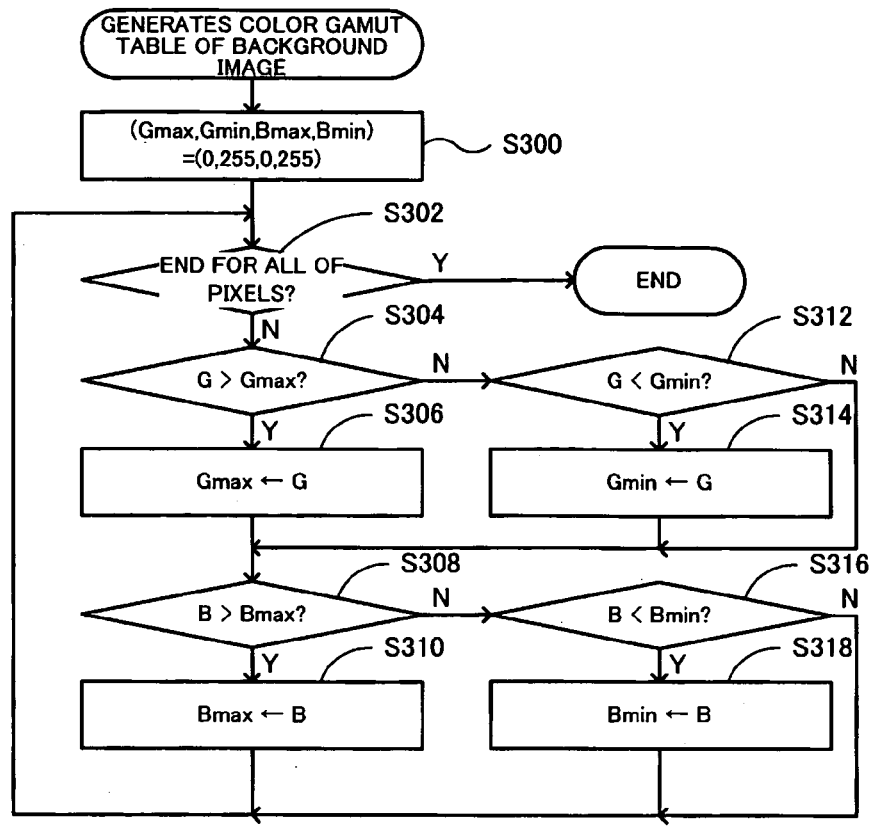
FIG. 63 is a flowchart of one embodiment of the present invention.
Figure 64:
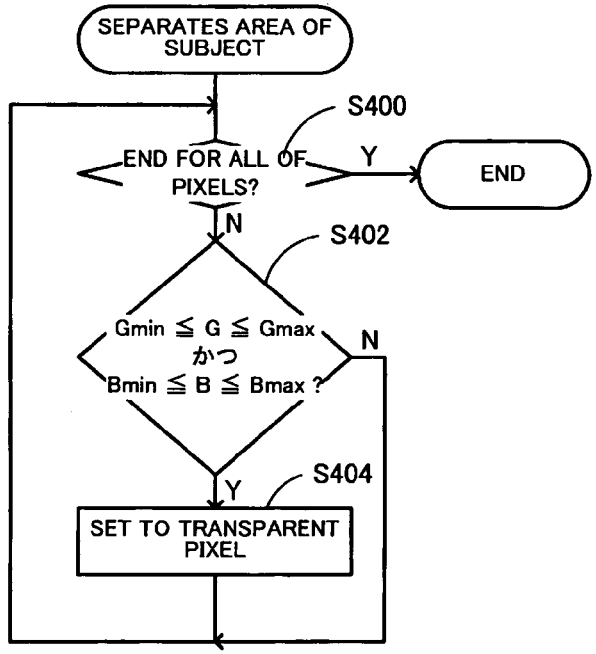
FIG. 64 is a flowchart of one embodiment of the present invention.
Figure 65:
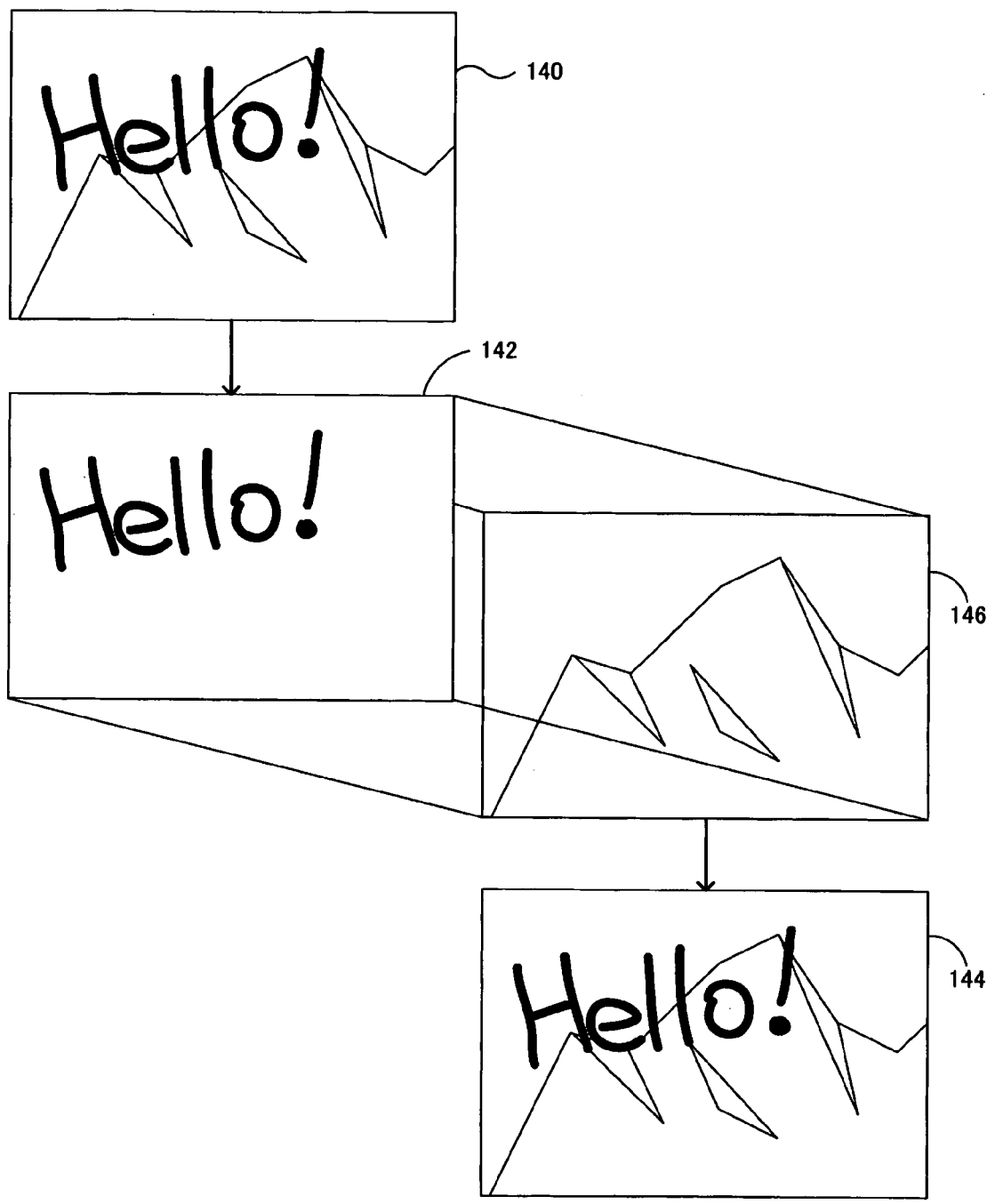
FIG. 65 is a schematic diagram of one embodiment of the present invention.
Figure 66:
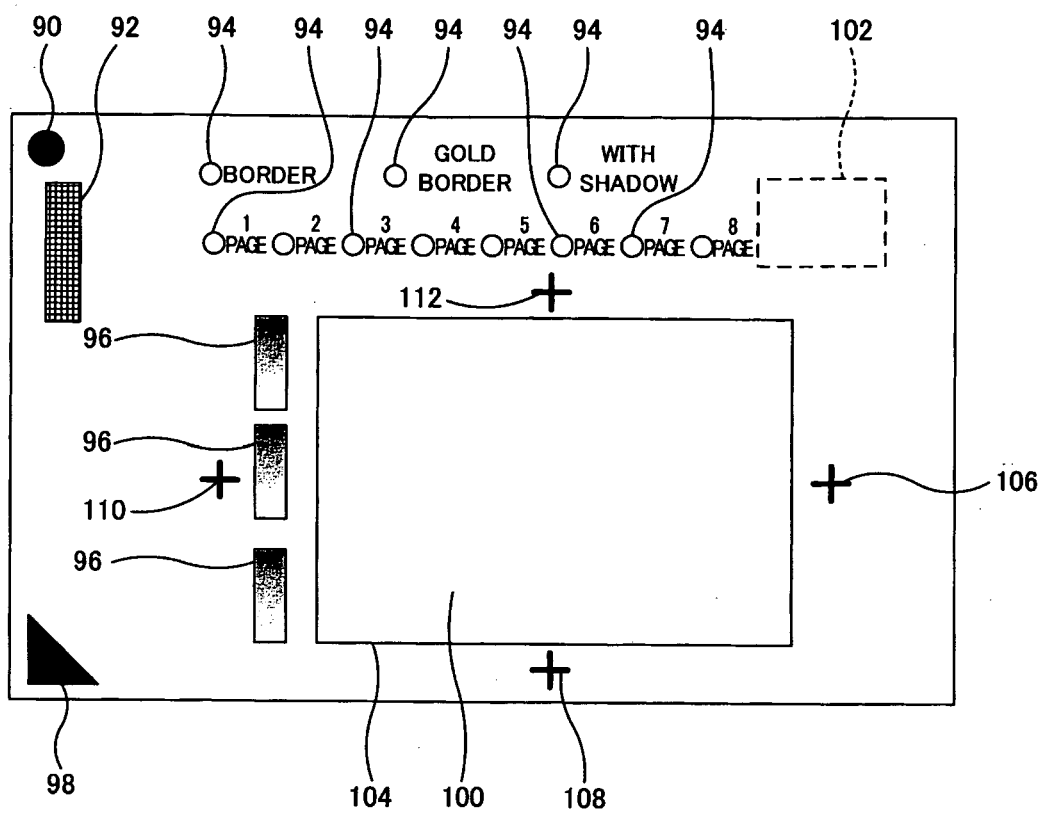
FIG. 66 is a schematic diagram of one embodiment of the present invention.
Figure 67:
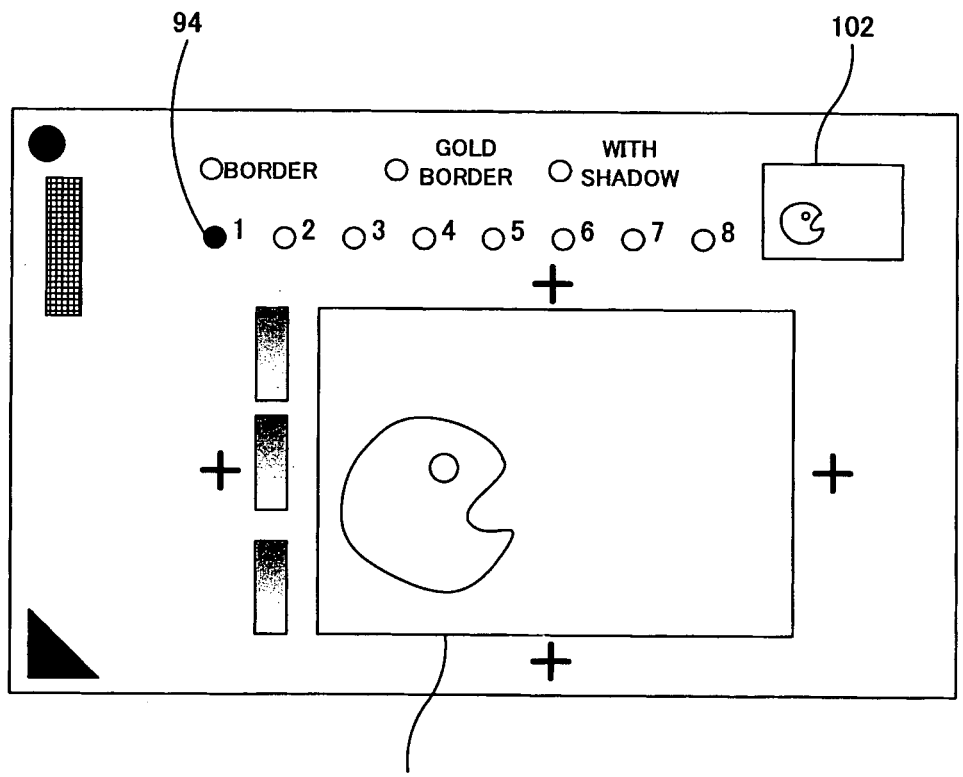
FIG. 67 is a schematic diagram of one embodiment of the present invention.
Figure 68:
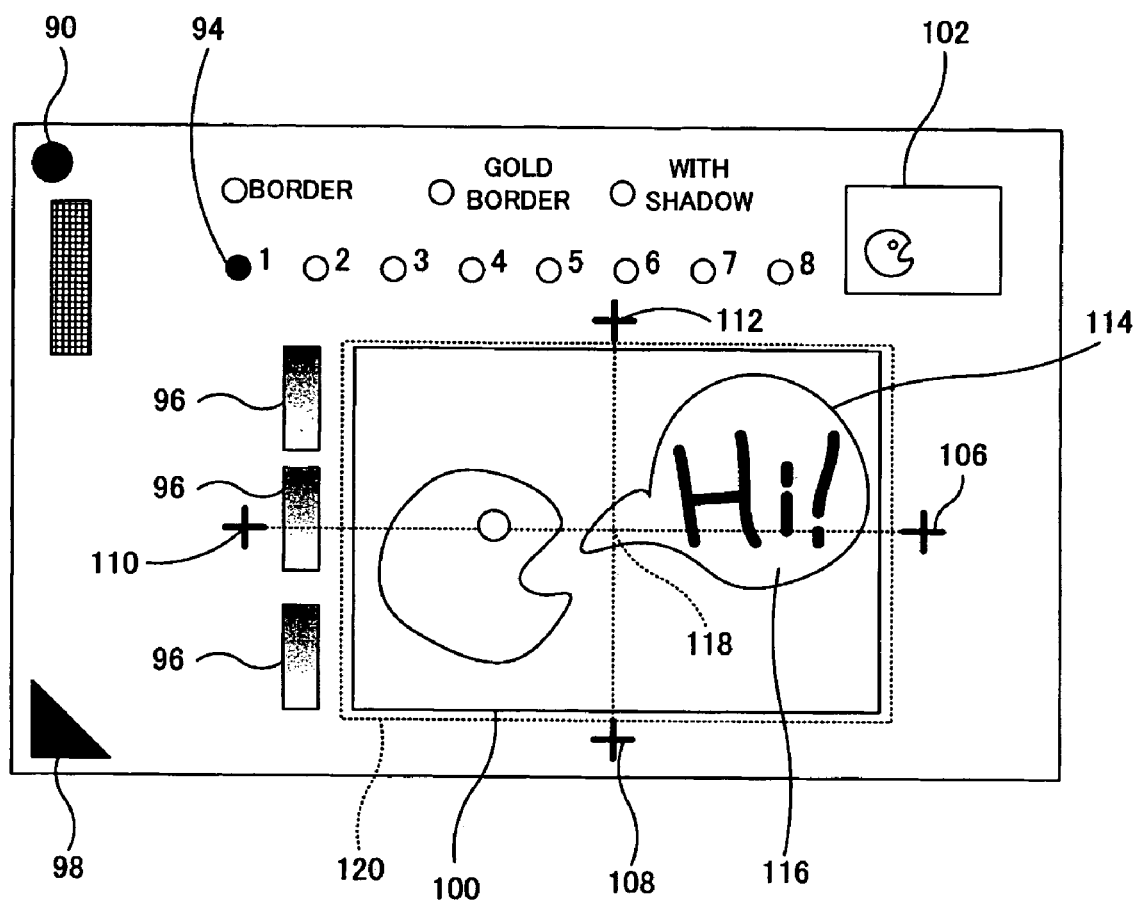
FIG. 68 is a schematic diagram of one embodiment of the present invention.
Figure 69:
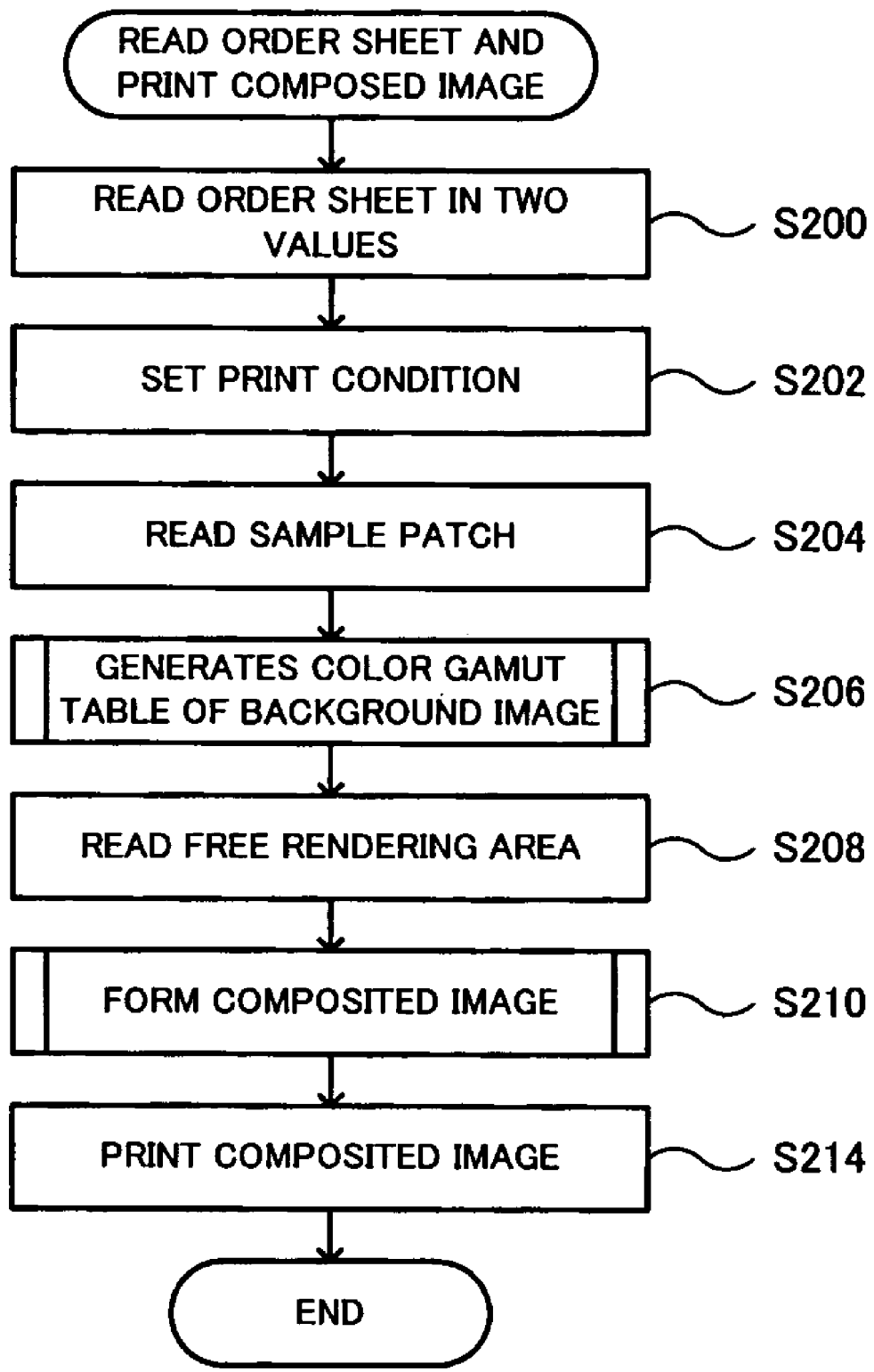
FIG. 69 is a flowchart of one embodiment of the present invention.
Figure 70:
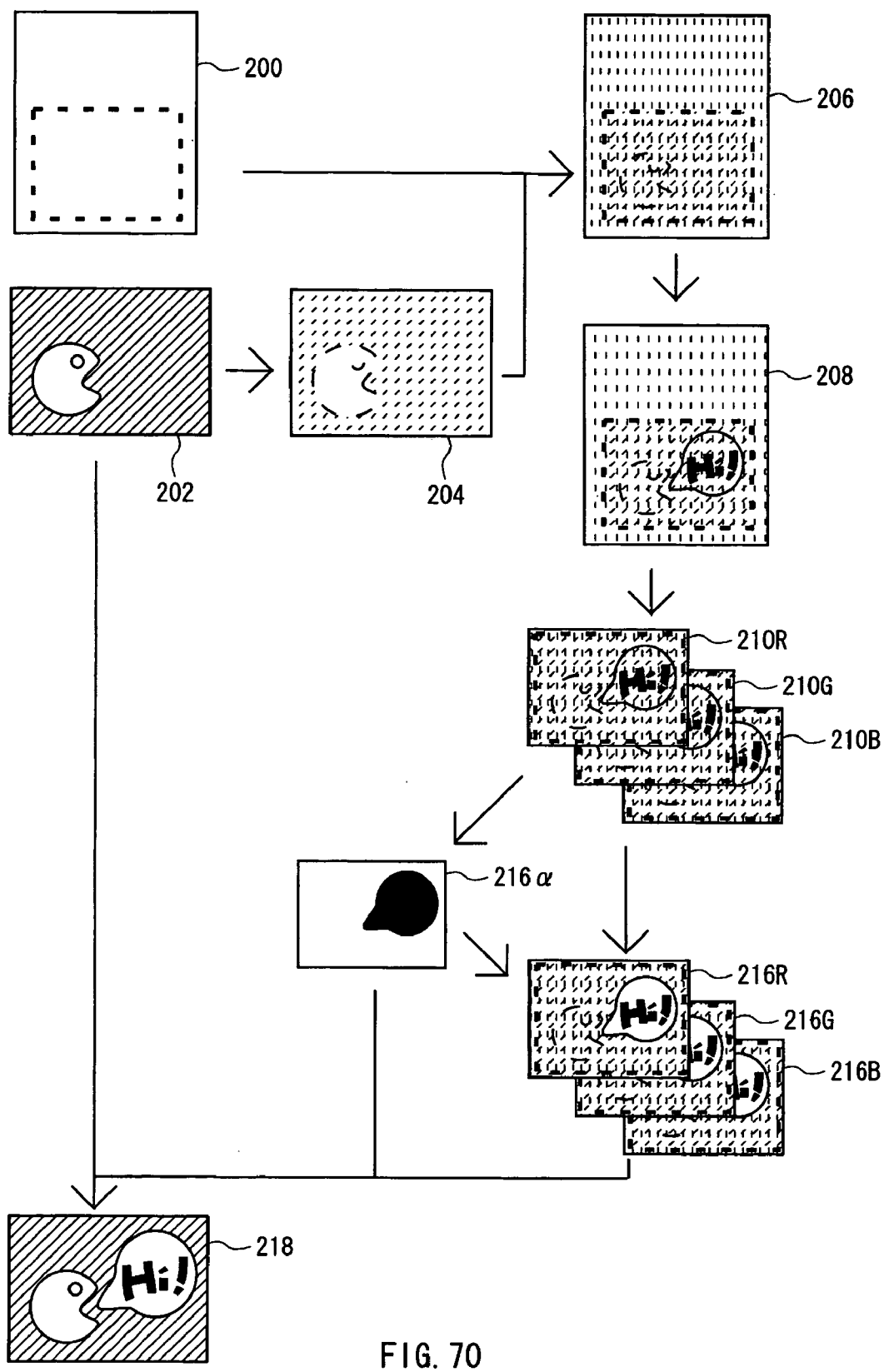
FIG. 70 is a schematic diagram of one embodiment of the present invention.
Figure 71:
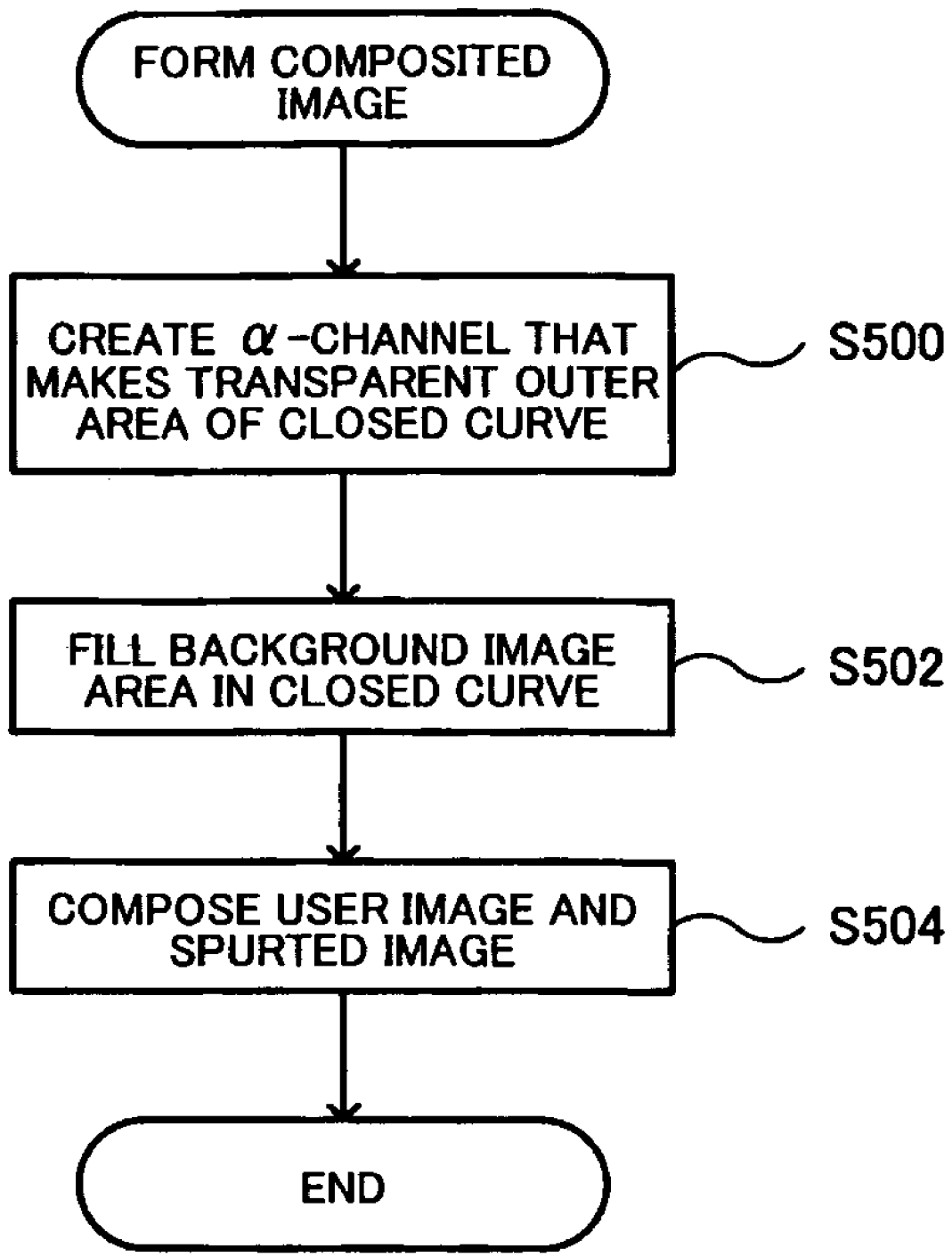
FIG. 71 is a flowchart of one embodiment of the present invention.
Figure 72:
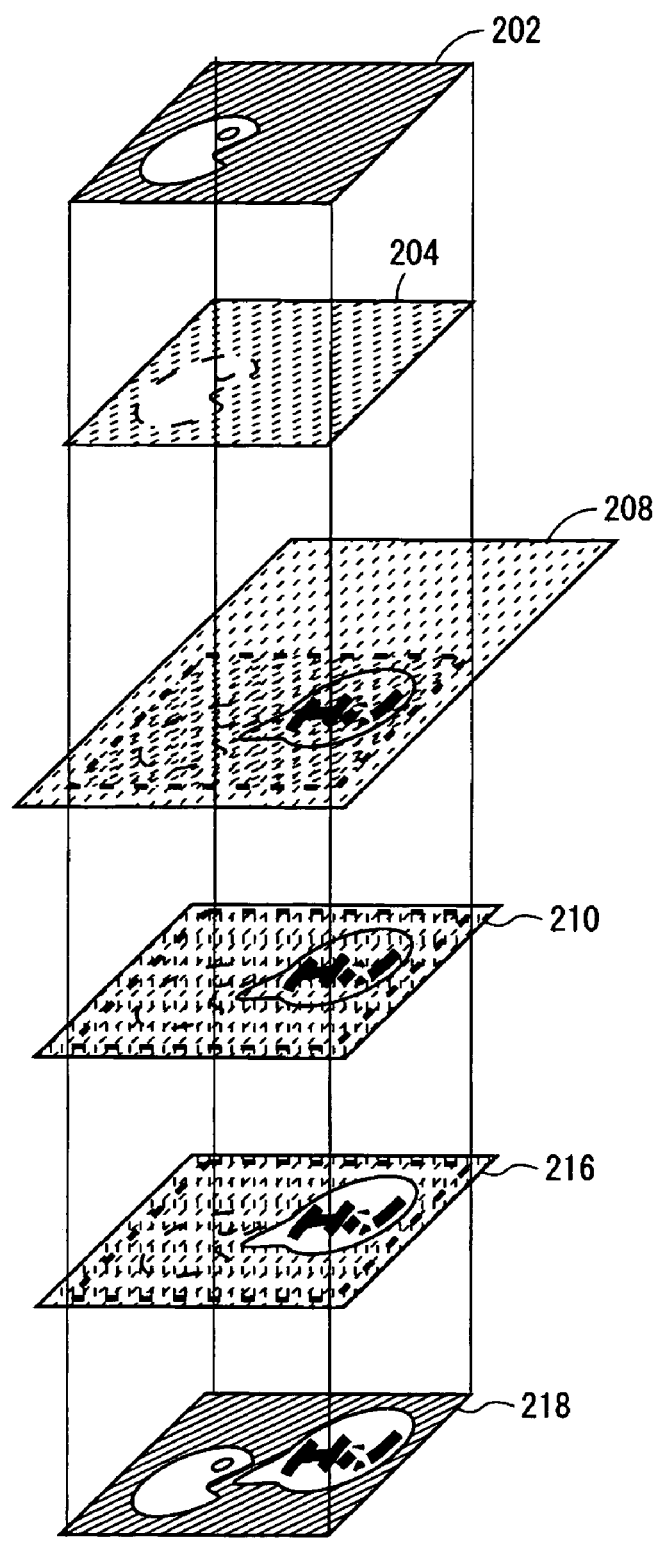
FIG. 72 is a schematic diagram of one embodiment of the present invention.
Figure 73:
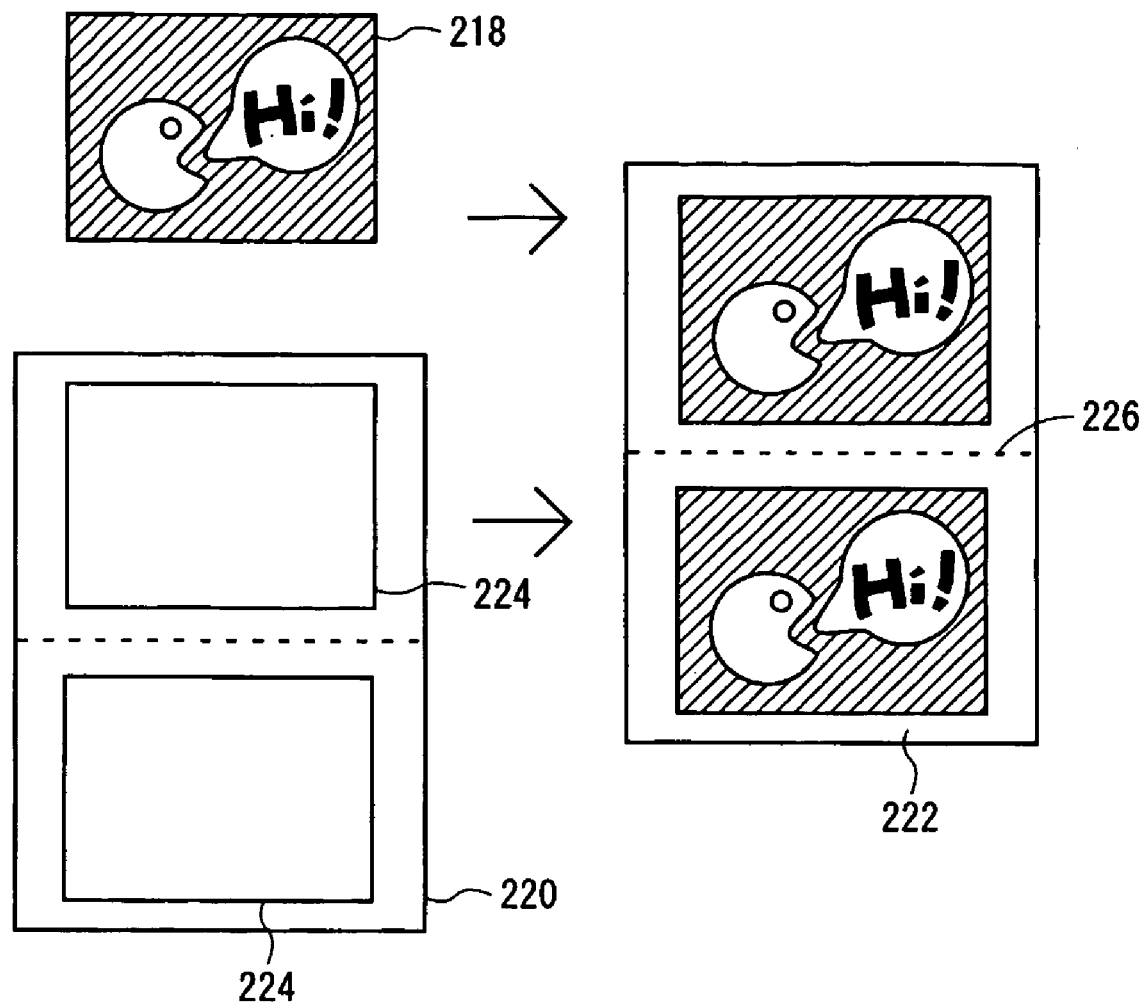
FIG. 73 is a schematic diagram of one embodiment of the present invention.

What is claimed is:

1. An image processing system, comprising:
    first receiving unit that receives an order-sheet request;
    print control unit that causes a printer unit to print an area notation indicating a free rendering area on an order sheet in accordance with the order-sheet request;
    second receiving unit that receives a scan request;
    read control unit that causes a scan unit to read the order sheet on which a hand written character is recorded in the free rendering area in accordance with the scan request; and
    composition unit that composites an image of the hand written character in the free rendering area read by the scan unit in accordance with the scan request and other stored image or images to form a composited image including the hand written character and the other stored image or images,
    wherein the order sheet shows a relative position between the hand written character and the other stored image or images that the composited image will have.

2. An image processing system according to claim 1, wherein the print control unit causes the printer unit to print an identifier notation on the paper; and
    the composition unit composites the image of the free rendering area and the other image or images read by the scan unit based on the identifier notation read by the scan unit.

3. An image processing system according to claim 1, further comprising image selection command receiving unit that receives a command for selecting one or more of accessible images,
    wherein the other image is the selected image.

4. An image processing system according to claim 3, wherein the print control unit causes the printer unit to print the image selected by the image selection command receiving unit on the paper.

5. An image processing system according to claim 4,
    wherein the print control unit causes the printer unit to print, on the paper, an image showing a composite result of composition of the selected image and a sample image of the image of the free rendering area under a first composite condition; and
    the composition unit composites the selected image and the image of the free rendering area under a second composite condition corresponding to the first composite condition.

6. An image processing system according to claim 5, further comprising composite condition command receiving unit that receives a command for selecting, as the first composite condition, one of multiple different composite conditions for compositing the selected image and the image of the free rendering area,
    wherein the print control unit causes the printer unit to print, on the paper, multiple images showing the multiple composite results of composition under different composite conditions receivable by the composite condition command receiving unit.

7. An image processing system according to claim 5, wherein the print control unit causes the printer unit to print the other image, the area notation and the image showing a composite result in one page.

8. An image processing system according to claim 1, wherein the print control unit causes the printer unit to print, on the paper, an image notation indicating an accessible image,
    the system further comprising image selection mark recognizing unit that recognizes the image indicated by the image notation pointed by an image selection mark recorded on the paper based on the image read by the scan unit,
    wherein the other image or images is or are an image or images each indicated by the image notation pointed by the image selection mark.

9. An image processing system according to claim 8,
    wherein the image selection mark recognizing unit recognizes the multiple images indicated by the multiple image notations pointed by the image selection mark; and
    the composition unit composites the image of the free rendering area and the other multiple images.

10. An image processing system according to claim 8, wherein the read control unit causes the scan unit to read the image selection mark at a lower resolution than that for the free rendering area.

11. An image processing system according to claim 1, further comprising composite condition command receiving unit that receives a command for a composite condition for compositing the image of the free rendering area and the other image or images,
    wherein the print control unit causes the printer unit to print, on the paper, the area notation indicating the free rendering area in a form in accordance with the commanded composite condition; and
    the composition unit composites the image of the free rendering area and the other image or images in accordance with the commanded composite condition.

12. An image processing system according to claim 1,
    wherein the print control unit causes the printer unit to print, on the paper, multiple composite condition notations indicating different composite conditions for compositing the image of the free rendering area and the other image or images;
    the system further comprising composite condition recognizing unit that recognizes the composite condition indicated by the composite condition notation pointed by the composite condition mark recorded on the paper based on the image read by the scan unit,
    wherein the composition unit composites the image of the free rendering area read by the scan unit and the other image or images in accordance with the composite condition indicated by the composite condition notation pointed by the composite condition mark.

13. An image processing system according to claim 11, wherein the read control unit causes the scan unit to read the composite condition mark at a first resolution and causes the scan unit to read the free rendering area at a higher second resolution than the first resolution.

14. An image processing system according to claim 12, wherein the composite condition includes an overlap composite condition.

15. An image processing system according to claim 14, wherein the overlap composite condition includes a border processing condition for two images to be composited one over another.

16. An image processing system according to claim 14, wherein the overlap composite condition includes transparencies of two images to be composited one over another.

17. An image processing system according to claim 1, wherein the print control unit causes the printer unit to print a reference mark on the paper; and the read control unit recognizes the free rendering area based on the reference mark.

18. An image processing system according to claim 1, further comprising area extracting unit that extracts an area of a subject recorded in the free rendering area from the image of the free rendering area read by the scan unit, the composition unit compositely superimposes the area of the subject of the image of the free rendering area and the other image or images.

19. An image processing system according to claim 18, wherein the area extracting unit recognizes the base color of the paper based on an image of a margin area excluding the free rendering area read by the scan unit and recognizes the area of the subject based on the base color of the paper.

20. An image processing system according to claim 1, further comprising the printer unit and the scan unit.

21. An image processing system according to claim 1, further comprising an interface that connects the printer unit and the scan unit.

22. An image processing system according to claim 1, wherein the print control unit causes the printer unit to print the other image and the area notation in one page in such a manner that a composite layout of these can be recognized.

23. An image processing system according to claim 22, wherein the print control unit causes the printer unit to print the other image and the area notation in such a manner that they may be adjacent to each other.

24. An image processing system according to claim 1, the print control unit causes the printer unit to print a character or an image in the free rendering area.

25. An image processing system according to claim 1, wherein the read control unit separates the hand written character from the free rendering area.

26. An image processing method, comprising:
receiving an order-sheet request;
causing a printer unit to print an area notation indicating a free rendering area on an order sheet in accordance with the order-sheet request;
receiving a scan request;
causing a scan unit to read the order sheet on which a hand-written character is recorded in the free rendering area in accordance with the scan request; and
compositing an image of the hand written character in the free rendering area read by the scan unit in accordance with the scan request and other stored image or images to form a composited image including the hand written character overlapped on the other stored image or images,
wherein the order sheet shows a relative position between the hand written character and the other stored image or images that the composited image will have.

27. An image processing method according to claim 26, comprising:
when causing the printer unit to print the area notation, causing the printer unit to print an identifier notation on the paper; and
when composing the other image and an image of the free rendering area, composing the other image or images and the image of the free rendering area read by the scan unit based on an image of the identifier notation read by the scan unit.

28. An image processing method according to claim 26, further comprising receiving a command for selecting one or more of accessible images,
wherein the other image is the selected image.

29. An image processing method according to claim 28, when causing the printer unit to print the area notation, causing the printer unit to print the selected image on the paper.

30. An image processing method according to claim 29, when causing the printer unit to print the area notation, causing the printer unit to print an image showing a composite result of composition of the selected image and a sample image of the image of the free rendering area under a first composite condition; and
when compositing the image of the free rendering area and the other image, compositing the selected image and the image of the free rendering area under a second composite condition corresponding to the first composite condition.

31. An image processing method according to claim 26, further comprising extracting an area of a subject recorded in the free rendering area from the image of the free rendering area read by the scan unit,
when compositing the image of the free rendering area and the other image, compositely superimposing the area of the subject of the image of the free rendering area and the other image or images.

32. An image processing method according to claim 31, when extracting the area of the subject, recognizing the base color of the paper based on an image of a margin area excluding the free rendering area read by the scan unit and recognizing the area of the subject based on the base color of the paper.

33. An image processing method according to claim 26, when causing the printer unit to print the area notation, causing the printer unit to print the other image and the area notation in one page in such a manner that a composite layout of these can be recognized.

34. An image processing method according to claim 33, when causing the printer unit to print the area notation, causing the printer unit to print the other image and the area notation in such a manner that they may be adjacent to each other.

35. An image processing method according to claim 26, when causing the printer unit to print the area notation, causing the printer unit to print a character or an image in the free rendering area.

* * * * *